United States Patent
Rath

(10) Patent No.: US 10,248,704 B2
(45) Date of Patent: *Apr. 2, 2019

(54) SYSTEM AND METHOD FOR LOG CONFLICT DETECTION AND RESOLUTION IN A DATA STORE

(71) Applicant: Amazon Technologies, Inc., Reno, NV (US)

(72) Inventor: Timothy Andrew Rath, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1013 days.

This patent is subject to a terminal disclaimer.

(21) Appl. No.: 14/270,323

(22) Filed: May 5, 2014

(65) Prior Publication Data
US 2014/0244581 A1 Aug. 28, 2014

Related U.S. Application Data

(63) Continuation of application No. 13/352,334, filed on Jan. 17, 2012, now Pat. No. 8,719,225.

(51) Int. Cl.
*G06F 17/30* (2006.01)

(52) U.S. Cl.
CPC .. *G06F 17/30575* (2013.01); *G06F 17/30368* (2013.01); *G06F 17/30578* (2013.01)

(58) Field of Classification Search
CPC ......... G06F 17/30575; G06F 17/30377; G06F 17/30371; G06F 17/30091; G06F 17/3012; G06F 17/30212; G06F 17/30368
See application file for complete search history.

(56) References Cited

U.S. PATENT DOCUMENTS 7,500,020 B1 * 3/2009 Kabra ............... G06F 17/30165
707/999.201
8,732,517 B1 5/2014 Stefani et al.
(Continued)

OTHER PUBLICATIONS

Terry, Douglas B., et al. "Managing update conflicts in Bayou, a weakly connected replicated storage system." ACM SIGOPS Operating Systems Review. vol. 29. No. 5. ACM, 1995.*
(Continued)

*Primary Examiner* — Nan Hutton
(74) *Attorney, Agent, or Firm* — Robert C. Kowert; Meyertons, Hood, Kivlin, Kowert & Goetzel, P.C.

(57) ABSTRACT

A system that implements a data storage service may store data on behalf of storage service clients. The system may maintain data in multiple replicas that are stored on respective computing nodes in the system. Updates to the stored data and to the membership of replica groups are propagated as replicated log records. A replica receiving a log record may compare metadata in the received log record to corresponding metadata in a log record that was previously appended to its log to determine a response. The metadata may include a sequence number, a lock generation identifier, an epoch identifier, or an indication of an epoch change. The replica may append the received log record to its log, drop the received log record, or cache the received log record for future use. If a log conflict indicates an invalid log stream branch, one or more log records may be deleted.

20 Claims, 37 Drawing Sheets

(56) References Cited

U.S. PATENT DOCUMENTS

| | | | |
|---|---|---|---|
| 2003/0220935 A1 | 11/2003 | Vivian et al. | |
| 2008/0301200 A1* | 12/2008 | Doty | G06F 11/004 |
| 2009/0119346 A1 | 5/2009 | Lu et al. | |
| 2009/0138531 A1 | 5/2009 | Horii | |
| 2010/0005124 A1 | 1/2010 | Wagner | |
| 2010/0106813 A1 | 4/2010 | Voutilainen et al. | |
| 2011/0099342 A1* | 4/2011 | Ozdemir | G06F 11/2066 711/162 |
| 2012/0101991 A1* | 4/2012 | Srivas | G06F 17/30194 707/623 |
| 2012/0330954 A1 | 12/2012 | Sivasubramanian et al. | |

OTHER PUBLICATIONS

Pacitti, Esther, and Eric Simon. "Update propagation strategies to improve freshness in lazy master replicated databases." the VLDB Journal 8.3-4 (2000): 305-318.*

"Windows Azure Table", Jai Haridas, et al., May 2009, pp. 1-42.

"Windows Azure Storage—Essential Cloud Storage Services", Professional Developers Conference, 2008, Brad Calder, pp. 1-64.

Dynamo: Amazon's Highly Available Key-value Store, G. DeCandia, D. Hastorun, M. Jampani, G. Kakulapati, A. Lakshman, S. Sivasubramanian, P. Vosshall, and W. Vogels, in SOSP '07, pp. 205-220.

U.S. Appl. No. 13/352,334, filed Jan. 17, 2012, Timothy Andrew Rath.

Rabinovich, Michael, Narain Gehani, and Alex Kononov. "Scalable update propagation in epidemic replicated databases." Advances in Database Technology-EDBT'96. Springer Berlin Heidelberg, 1996. 205-222.

Bhide, Anupam, et al. "An efficient scheme for providing high availability." ACM SIGMOD Record. vol. 21. No. 2. ACM, 1992.

Kumar, Puneet. "Coping with conflicts in an optimistically replicated file system." Management of Replicated Data, 1990. Proceedings., Workshop on the. IEEE, 1990.

U.S. Appl. No. 13/352,326, filed Jan. 17, 2012, Timothy A Rath, et al.

U.S. Appl. No. 13/352,060, filed Jan. 17, 2012, Timothy A Rath, et al.

U.S. Appl. No. 13/352,075, filed Jan. 17, 2012, Timothy A Rath, et al.

U.S. Appl. No. 13/352,097, filed Jan. 17, 2012, Timothy A Rath.

U.S. Appl. No. 13/352,113, filed Jan. 17, 2012, Timothy A Rath, et al.

* cited by examiner

SYSTEM AND METHOD FOR LOG CONFLICT DETECTION AND RESOLUTION IN A DATA STORE

This application is a continuation of U.S. application Ser. No. 13/352,334, filed Jan. 17, 2012, now U.S. Pat. No. 8,719,225.

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

Database systems managing large amounts of data on behalf of users may distribute and/or replicate that data across two or more machines, often in different locations, for any of a number of reasons, including security issues, disaster prevention and recovery issues, data locality and availability issues, etc. These machines may be configured in any number of ways, including as a shared resource pool.

Interaction between client applications and database servers typically includes read operations (read-only queries), write operations (to store data), and update operations that can be conceptualized using a read-modify-write workflow.

Figure 1A:
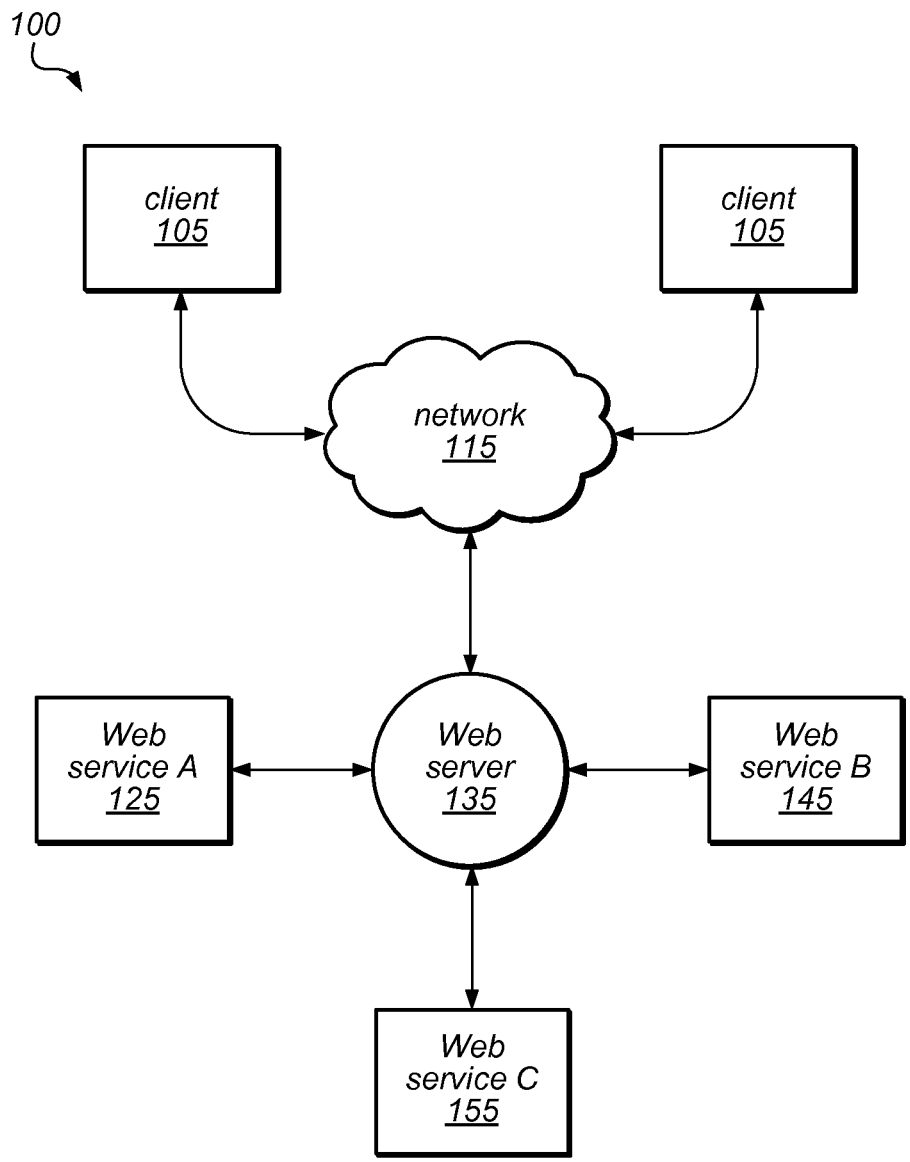
FIG. 1A is a block diagram illustrating one embodiment of a system that provides various Web-based services to clients.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

The systems and methods described herein may be employed in various combinations and in various embodiments to implement a Web-based service that provides data storage services to storage service clients (e.g., user, subscribers, or client applications that access the data storage service on behalf of users or subscribers). The service may in some embodiments support the seamless scaling of tables that are maintained on behalf of clients in a non-relational data store, e.g., a non-relational database. The service may provide a high level of durability and availability through replication, in some embodiments.

In some embodiments, the service may support automatic live repartitioning of data in response to the detection of various anomalies (e.g., failure or fault conditions, hot spots, or increases in table size and/or service request throughput), and/or explicit (e.g., pro-active and/or subscriber-initiated) live repartitioning of data to support planned or anticipated table size and/or throughput increases. In other words, the service may in some embodiments initiate the re-sizing (scaling) and/or repartitioning of a table in response to receiving one or more requests to store, retrieve, modify, or delete items in the scalable table.

The service described herein may in various embodiments support a flexible schema, a plurality of available consistency models, a variety of service level and/or business model options, multiple indexing options, and/or multiple query types. In some embodiments, storage service clients (e.g., users, subscribers or client applications) may interact with the service through a Web service interface using a relatively small (and relatively simple) set of APIs, such that clients of the service are largely relieved from the burden of database administration. The service may exhibit low latency in servicing requests. Unlike in some prior data storage services, the service may offer predictable performance at a low cost, while supporting multi-tenancy and automatic heat management.

In various embodiments, the data storage service described herein may provide an application programming interface (API) that includes support for some or all of the following operations on the data in a table maintained by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. The amount of work required to satisfy service requests that specify these operations may vary depending on the particular operation specified and/or the amount of data that is accessed and/or transferred between the storage system and the client in order to satisfy the request.

In some embodiments, the service (and/or the underlying system that implements the service) may support a strong consistency model, in addition to supporting eventually consistent read operations. In some embodiments, service requests made via the API may include an indication of one or more user preferences, such as a preferred consistency model, a preferred service request throughput level, or a service request throughput level for which a guarantee is requested. In other embodiments, some or all of these user preferences may be specified when a table is created, or may be client-specific, account-specific, specific to various table types, or specified by system-wide default values, rather than being specified on a per-request basis. The API may support extreme scaling and/or more predictable performance than that provided by prior data storage systems and services.

In some embodiments, the service (and/or the underlying system) may impose an upper bound on the size of an individual item, e.g., to allow the service to store the entire contents of an item in a single partition in the underlying data storage system. This may, in turn, facilitate performing atomic updates to an item without dramatically reducing throughput, and may make it easier to maintain item contents in a stable working set. In other words, limiting the size of an individual item may facilitate both strong consistency and high performance in the system, in some embodiments.

In various embodiments, systems described herein may store data in replicated partitions on multiple storage nodes (which may be located in multiple data centers) and may implement a single master failover protocol. In some embodiments, membership in various replica groups may be adjusted through replicated changes, and membership and other updates in the system may be synchronized by synchronizing over a quorum of replicas in one or more data centers at failover time using a replicated quorum version. In some embodiments, a mechanism for splitting a partition may utilize failover quorum synchronization, external master locks, and/or various methods for detecting and resolving log conflicts, including log snipping (e.g., deleting log records that are on invalid branches). The systems described herein may implement a fault-tolerant log shipping based replication mechanism that includes such log conflict detection and resolution. In some embodiments, log branching may be avoided through post-failover rejoins.

In some embodiments, a data storage system may employ an external service or manager (e.g., an external lock service or lock manager) to select a master replica for a replica group. The master replica may employ a quorum based mechanism for performing replicated write operations that are directed to the replica group (or a corresponding data partition stored by the replica group), and a local lease mechanism for determining the replica authorized to perform consistent reads directed to the replica group (or corresponding data partition), even when the external service/manager is unavailable. The master replica may propagate local leases to replica group members as replicated writes. If another replica assumes mastership for the replica group, it may not begin servicing consistent read operations that are directed to the replica group until the lease period for a current local lease expires.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 1A illustrates a block diagram of a system that provides various Web-based services to clients, according to one embodiment. In this example, system 100 includes one or more clients 105. In this example, the clients 105 may be configured to interact with a Web server 135 via a communication network 115.

As illustrated in this example, the Web server 135 may be configured to process requests from clients 105 for various services, such as Web service A (125), Web service B (145), and Web service C (155), and to return results to the clients 105. Each of the web services may provide clients with one or more of: computational resources, database services, data storage services (e.g., maintaining data in one or more tables on behalf of a client), or any other types of services or shared resources.

Figure 1B:
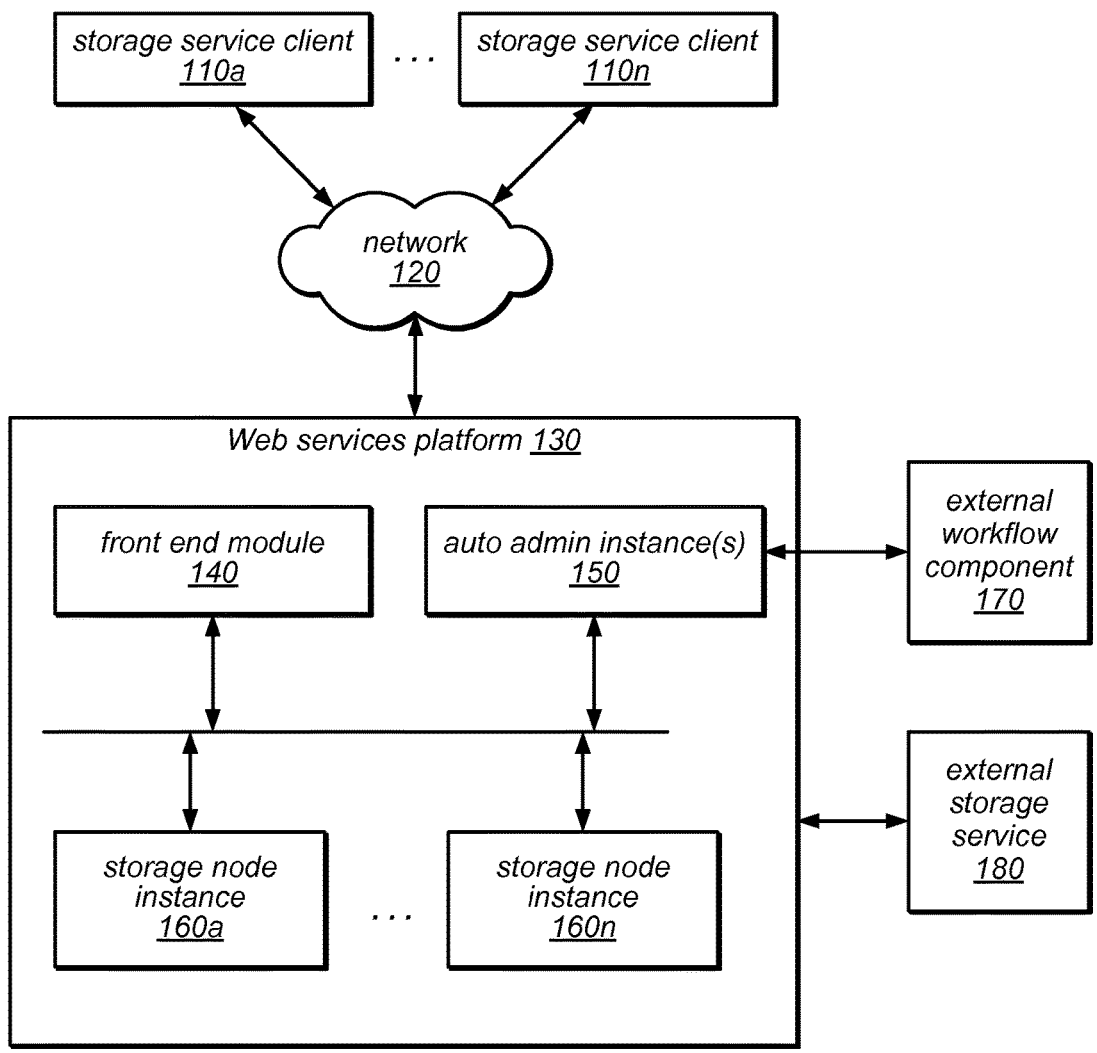
FIG. 1B is a block diagram illustrating one embodiment of a system architecture that is configured to implement a web services-based data storage service.

One embodiment of a system architecture that is configured to implement a Web services-based data storage service such as that described herein is illustrated in FIG. 1B. It is noted that where one or more instances of a given component may exist, reference to that component herein below may be made in either the singular or the plural. However, usage of either form is not intended to preclude the other. In various embodiments, the components illustrated in FIG. 1B may be implemented directly within computer hardware, as instructions directly or indirectly executable by computer hardware (e.g., a microprocessor or computer system), or using a combination of these techniques. For example, the components of FIG. 1B may be implemented by a distributed system including a number of computing nodes (or simply, nodes), such as the computer node embodiment illustrated in FIG. 35 and discussed below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 110a-110n may encompass any type of client configurable to submit web services requests to Web services platform 130 via network 120. For example, a given storage service client 110 may include a suitable version of a web browser, or a plug-in module or other type of code module configured to execute as an extension to or within an execution environment provided by a web browser to provide storage service clients (e.g., client applications, users, and/or subscribers) access to the data storage services provided by Web services platform 130. Alternatively, a storage service client 110 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 110 may be an application configured to interact directly with Web services platform 130. In various embodiments, storage service client 110 may be configured to generate web services requests according to a Representational State Transfer (REST)-style web services architecture, a document- or message-based web services architecture, or another suitable web services architecture.

In some embodiments, storage service client 110 may be configured to provide access to web services-based storage to other applications in a manner that is transparent to those applications. For example, storage service client 110 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 130 may be coordinated by storage service client 110 and the operating system or file system on behalf of applications executing within the operating system environment.

Storage service clients 110 may convey web services requests to and receive responses from Web services platform 130 via network 120. In various embodiments, network 120 may encompass any suitable combination of networking hardware and protocols necessary to establish web-based communications between clients 110 and platform 130. For example, network 120 may generally encompass the various telecommunications networks and service providers that collectively implement the Internet. Network 120 may also include private networks such as local area networks (LANs) or wide area networks (WANs) as well as public or private wireless networks. For example, both a given client 110 and Web services platform 130 may be respectively provisioned within enterprises having their own internal networks. In such an embodiment, network 120 may include the hardware (e.g., modems, routers, switches, load balancers, proxy servers, etc.) and software (e.g., protocol stacks, accounting software, firewall/security software, etc.) necessary to establish a networking link between given client 110 and the Internet as well as between the Internet and Web services platform 130. It is noted that in some embodiments, storage service clients 110 may communicate with Web services platform 130 using a private network rather than the public Internet. For example, clients 110 may be provisioned within the same enterprise as the data storage service (and/or the underlying system) described herein. In such a case, clients 110 may communicate with platform 130 entirely through a private network 120 (e.g., a LAN or WAN that may use Internet-based communication protocols but which is not publicly accessible).

Generally speaking, Web services platform 130 may be configured to implement one or more service endpoints configured to receive and process web services requests, such as requests to access tables maintained on behalf of clients/users by a data storage service, and/or the items and attributes stored in those tables. For example, Web services platform 130 may include hardware and/or software configured to implement various service endpoints and to properly receive and process HTTP-based web services requests directed to those endpoints. In one embodiment, Web services platform 130 may be implemented as a server system configured to receive web services requests from clients 110 and to forward them to various components that collectively implement a data storage system for processing. In other embodiments, Web services platform 130 may be configured as a number of distinct systems (e.g., in a cluster topology) implementing load balancing and other request management features configured to dynamically manage large-scale web services request processing loads.

As illustrated in FIG. 1B, Web services platform 130 may include a front end module 140 (which may be configured to receive, authenticate, parse, throttle and/or dispatch service requests, among other things), one or more administrative components, or auto admin instances, 150 (which may be configured to provide a variety of visibility and/or control functions, as described in more detail herein), and a plurality of storage node instances (shown as 160a-160n), each of which may maintain and manage one or more tables on behalf of clients/users or on behalf of the data storage service (and its underlying system) itself. Some of the functionality provided by each of these types of components is described in more detail herein, according to various embodiments.

In various embodiments, Web services platform 130 may be configured to support different types of web services requests. For example, in some embodiments, platform 130 may be configured to implement a particular web services application programming interface (API) that supports a variety of operations on tables that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments Web services platform 130 may implement various client management features. For example, platform 130 may coordinate the metering and accounting of client usage of web services, including storage resources, such as by tracking the identities of requesting clients 110, the number and/or frequency of client requests, the size of tables and/or items stored or retrieved on behalf of clients 110, overall storage bandwidth used by clients 110, class of storage requested by clients 110, and/or any other measurable client usage parameter. Platform 130 may also implement financial accounting and billing systems, or may maintain a database of usage data that may be queried and processed by external systems for reporting and billing of client usage activity. In some embodiments, platform 130 may include a lock manager and/or a bootstrap configuration (not shown).

In various embodiments, a data storage service may be implemented on one or more computing nodes that are configured to perform the functionality described herein. In some embodiments, the service may be implemented by a Web services platform (such as Web services platform 130 in FIG. 1B) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other Web services or applications, in some embodiments).

In some embodiments, the external resources with which the system interacts to provide the functionality described herein may include an external workflow component, illustrated in FIG. 1B as external workflow component 170. External workflow component 170 may provide a framework through which other components interact with the external workflow system. In some embodiments, Web services platform 130 may include an access API built on top of that framework (not shown). This interface may allow the system to implement APIs suitable for the usage patterns expected to be experienced by the data storage service. In some embodiments, components or modules of the system that use external workflow component 170 may include these interfaces rather than interfacing directly to the interfaces provided by external workflow component 170. In some embodiments, the Web services platform 130 may rely on one or more external resources, such as an external storage service 180, and/or other external (and in some cases shared) external resources, in addition to external workflow component 170. In some embodiments, external workflow component 170 may be used to perform distributed operations, such as those that extend beyond a particular partition replication group.

Figure 2A:
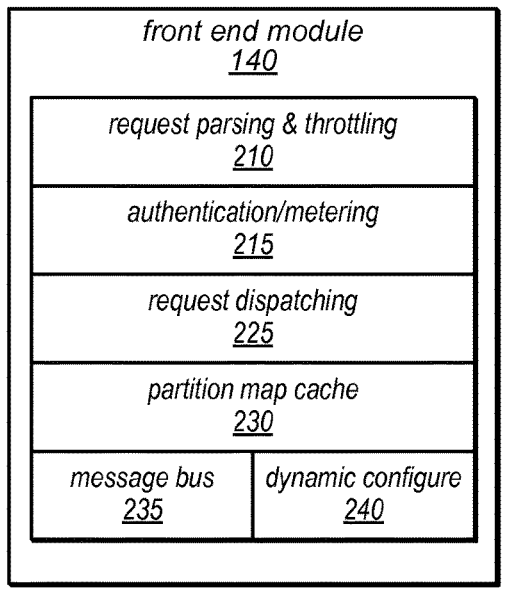
FIGS. 2A-2C are block diagrams illustrating various components of a Web services platform, according to one embodiment.
Figure 2B:
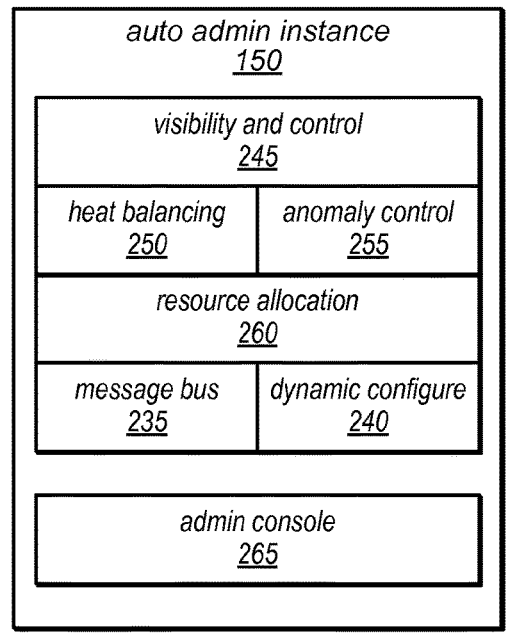
Figure 2C:
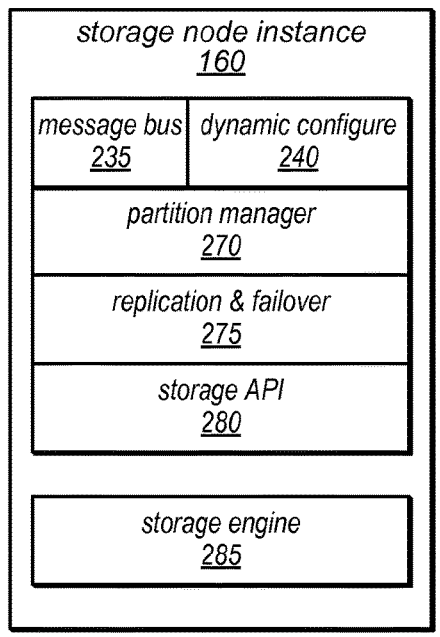

FIGS. 2A-2C illustrate various elements or modules that may be included in each of the types of components of Web services platform 130, according to one embodiment. As illustrated in FIG. 2A, front end module 140 may include one or more modules configured to perform parsing and/or throttling of service requests (shown as 210), authentication and/or metering of service requests (shown as 215), dispatching service requests (shown as 225), and/or maintaining a partition map cache (shown as 230). In addition to these component-specific modules, front end module 140 may include components that are common to multiple types of computing nodes that collectively implement Web services platform 130, such as a message bus (shown as 235) and/or a dynamic configuration module (shown as 240). In other embodiments, more, fewer, or different elements may be included in front end module 140, or any of the elements illustrated as being included in front end module 140 may be included in another component of Web services platform 130 or in a component configured to interact with Web services platform 130 to provide the data storage services described herein.

As illustrated in FIG. 2B, auto admin instance 150 may include one or more modules configured to provide visibility and control to system administrators (shown as 245), or to perform heat balancing (shown as 250), and/or anomaly control (shown as 255), resource allocation (shown as 260). Auto admin instance 150 may also include an admin console 265, through which system administrators may interact with the data storage service (and/or the underlying system). In some embodiments, admin console 265 may be the primary point of visibility and control for the data storage service (e.g., for configuration or reconfiguration by system administrators). For example, admin console 265 may be implemented as a relatively thin client that provides display and control functionally to system administrators and/or other privileged users, and through which system status indicators, metadata, and/or operating parameters may be observed and/or updated. In addition to these component-specific modules, auto admin instance 150 may also include components that are common to the different types of computing nodes that collectively implement Web services platform 130, such as a message bus (shown as 235) and/or a dynamic configuration module (shown as 240). In other embodiments, more, fewer, or different elements may be included in auto admin instance 150, or any of the elements illustrated as being included in auto admin instance 150 may be included in another component of Web services platform 130 or in a component configured to interact with Web services platform 130 to provide the data storage services described herein.

As illustrated in FIG. 2C, storage node instance 160 may include one or more modules configured to provide partition management (shown as 270), to implement replication and failover processes (shown as 275), and/or to provide an application programming interface (API) to underlying storage (shown as 280). As illustrated in this example, each storage node instance 160 may include a storage engine 285, which may be configured to maintain (i.e. to store and manage) one or more tables (and associated table data) in storage 280 (which in some embodiments may be a non-relational database) on behalf of one or more clients/users. In addition to these component-specific modules, storage node instance 160 may include components that are common to the different types of computing nodes that collectively implement Web services platform 130, such as a message bus (shown as 235) and/or a dynamic configuration module (shown as 240). In other embodiments, more, fewer, or different elements may be included in storage node instance 160, or any of the elements illustrated as being included in storage node instance 160 may be included in another component of Web services platform 130 or in a component configured to interact with Web services platform 130 to provide the data storage services described herein.

The systems underlying the data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

In some embodiments, the systems described herein may employ a somewhat limited indexing and/or query model in order to provide massive (i.e. virtually unlimited) scaling, predictability, and simplicity for users/subscribers or client applications. For example, in some embodiments, data may be indexed and partitioned (e.g., partitioned in the underlying database) by a primary key only. In such embodiments, the primary key to be used for indexing data in a user table may be specified by the user at the time that the table is created on the user's behalf. Thereafter, the partitioning of the user's data may be handled by the system, and abstracted from the user. In some embodiments, the primary key used for indexing data may consist of a single attribute hash key. In other embodiments, the primary key used for indexing and/or partitioning data may be a composite key comprising a hash key component and another component, sometimes referred to herein as a range key component. In various embodiments, queries may be supported against indexed attributes, and a full table scan function may be provided (e.g., to support troubleshooting). In some embodiments, users may define secondary indexes for a table based on one or more attributes other than those of the primary key, and then may query for items using the indexes they have defined. For example, in some embodiments the system may support the creation of creating secondary indexes on-the-fly (e.g., using a createIndex API), and these secondary indexes may scale automatically based on storage requirements (e.g., increasing or decreasing data volume) and/or read/write traffic. In some embodiments, such secondary indexes may be asynchronously updated as items in the table are updated.

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited.

Figure 3A:
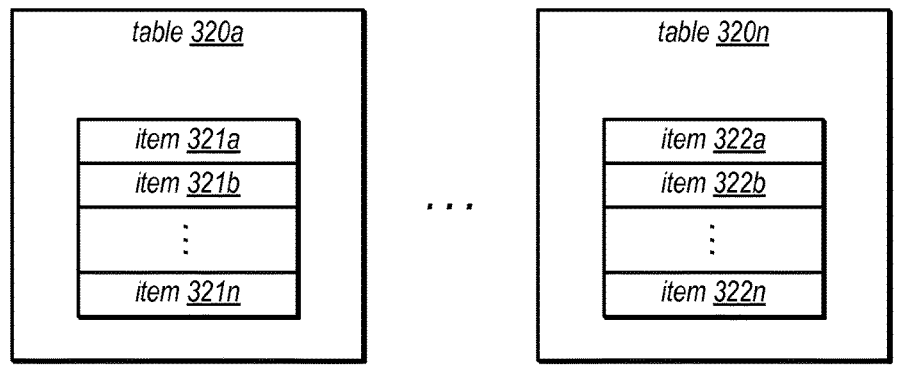
FIGS. 3A and 3B are block diagrams illustrating the storing of data as items in a plurality of tables, according to one embodiment.
Figure 3B:
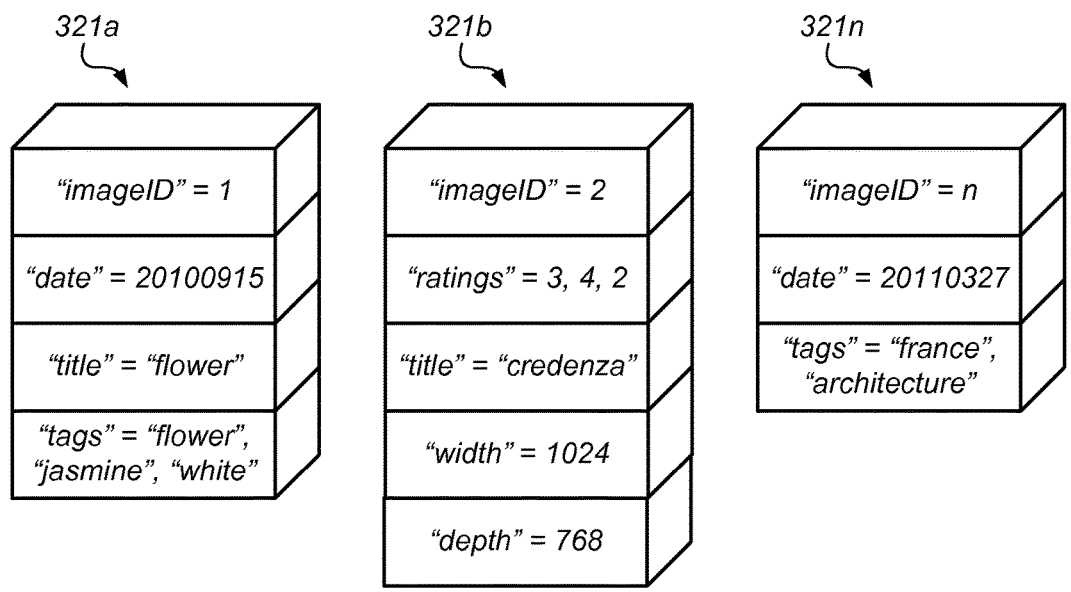

FIGS. 3A and 3B illustrate the storing of data in a plurality of tables, according to one embodiment. As illustrated in FIG. 3A and described above, each of a plurality of tables (shown as tables 320a-320n) may store a plurality of items. In the illustrated example, table 320a stores items 321a-321n, and table 320n stores items 322a-322n. As illustrated in FIG. 3B, each of the items stored in a table may include a plurality of attributes, and each of the attributes may include an attribute name and a scalar or set type value. In this example, item 321a (stored in table 320a) includes a numeric "imageID" attribute whose value is 1, a numeric "date" attribute whose value is 20100915, a sting attribute named "title" whose value is "flower", and a string attribute named "tags" whose value is the set containing the strings "flower", "jasmine", and "white". In this example, item 321b (which is also stored in table 320a) includes a numeric "imageID" attribute whose value is 2, a numeric attribute named "ratings" whose value is the set containing the numeric values 3, 4, and 2, a string attribute named "title" whose value is "credenza", a numeric "width" attribute whose value is 1024, and a numeric "depth" attribute whose value is 768. In this example, item 321n (which is also stored in table 320a) includes a numeric "imageID" attribute whose value is n, a numeric "date" attribute whose value is 20110327, and a string attribute named "tags" whose value is the set containing the strings "france" and "architecture". Note that even though items 321a, 321b, and 321n are all stored in the same table (table 320a), they do not all include the same set of attributes. Instead, each item includes a sparse set of attributes from among all the attributes that have been specified for the collection of items stored in table 320a. In some embodiments, tables such as those described herein may be used to store and manage system metadata in addition to user data. In various embodiments, the tables maintained by the systems described herein may not have fixed schemas. As such, items may not include placeholders (i.e. empty elements) for attributes that are not included therein, and attributes (and their values) may be added to one or more items without having to add them to all other items.

In some embodiments, a table maintained by the data storage service on behalf of a client/user may have a primary key that identifies its items. The primary key may be defined over one attribute (and may be single valued, as described above) or over several attributes (i.e. it may be a composite primary key, as described above), in various embodiments. The key attributes may be immutable, may have a fixed type, and may be mandatory for every item, as they uniquely identify an item within a table. In some embodiments, the primary key is the only part of the table that is indexed, and the index type may be specified when a table is created. For example, when a table of items is created, an attribute may be designated as the primary key attributes for the table (or two attributes may be designated for a composite primary key). All items in the table must include the attribute(s) designated for the primary key and the data storage service (and/or underlying system) may ensure that the value (or combination of values) for those attribute names is unique for each item in the table. For example, if an attempt is made to add a new item that has the same primary key value as an existing item, the new item may replace the existing item in the table.

As noted above, the data storage service (and/or the underlying system) may create an index based on the primary key. The type of index may be dependent on the whether the table uses a simple primary key or a composite primary key. For example, the data storage service may index the primary key either as a hash index or a hash-and-range index, as follows:

Hash—A hash may be a string or a number. Simple primary keys may have one index value: a hash index (which may be a string or a number).

Range—A range may be a string or a number. A range may allow table items to be sorted so that data queries can refine results based on the range. Composite primary keys may contain two values for the index: a hash index (sometimes referred to herein as the hash key value) and a range index (sometimes referred to herein as the range key value).

A simple primary key may be sufficient for data collection and infrequent scanning of table data (e.g., using the scan API described below). A composite primary key may allow table data to be organized more precisely, and may allow the use of a Query API (such as that described below) for more efficient data retrieval. The following address table (Table 1) illustrates the use of a single attribute as the primary key to uniquely identify each item in the table.

TABLE 1 uses a simple primary key (string)

| Primary Key | Other Attributes |
|---|---|
| UserID = Jennifer | street = 100 Pine, city = Seattle, state = WA |
| UserID = Bob | street = 24 Freemont Ave, zip = 95112 |
| UserID = Harold | street = 20104 N. 4$^{th}$ St., suite = 35, city = Columbus, state = OH |

In this example, the primary key, an attribute called UserID, is required in every item and its type ("string") is fixed for every item. However, each item may also include any combination of additional attributes. The data storage system may in some embodiments be configured to ensure that the value of UserID is unique for each item in the table. As noted above, in some embodiments, attribute values cannot be null or empty. In such embodiments, an attribute does not exist in the table until/unless it has a value associated with it.

The data storage service described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes. These APIs may be called relatively infrequently (when compared to data plane APIs). In some embodiments, the control plane APIs provided by the service may be used to create tables, delete tables, and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API). In some embodiments, a common use model may be for a client to request an action (e.g., using a CreateTable API), and then to poll on its completion via the corresponding description API (e.g., DescribeTables).

In various embodiments, a CreateTable API may be used to create a table having a specified primary index (i.e. a primary key). In some embodiments, in response to receiving a request to create a table on behalf of a storage service client via this API, the service may trigger (and/or the underlying system implementing the service may invoke) an asynchronous CreateTable workflow that returns immediately (i.e. without waiting for the workflow to be completed). In such embodiments, the success of the workflow may be subsequently determined by checking the status of the table via a DescribeTables API. For example, each table being managed by the service on behalf of a client/user may be in one of the following table states, and an indication of the state of each table may be returned in a response to a DescribeTables request:

Creating—in which the table is being created
Active—in which the table exists
Deleting—in which the table is being deleted In some embodiments, in response to receiving a request to create a table on behalf of a storage service client/user (e.g., using a CreateTable API), the data storage service (and/or the underlying system) may in some embodiments generate metadata to be associated with the table and invoke an asynchronous CreateTable workflow to create the table. In some embodiments, there may be multiple tables storing and/or maintaining metadata associated with table creation, and one or more of these tables may be updated with when a new table is created. For example, the system may maintain metadata in any or all of the following types of tables, or may maintain metadata in other types and numbers of tables, in various embodiments:

- Tables Table: This table may maintain a list of every table in the system, along with the current state of the table (e.g., Creating, Active, Deleting, etc). The primary key for this table may in some embodiments include a SubscriberId attribute (which may be used to identify the user on whose behalf the table will be maintained) and a TableName attribute (which may specify the name of the table that will be created). When an entry is created for the new table, the table status may be set to "Creation Pending", which may indicate that the table has been accepted for creation, but that a workflow has not yet been invoked to create the table.
- Subscribers Table: This table may maintain a count of the total number of tables being maintained on behalf of a single client (i.e. user/subscriber or client application), and may also indicate how many of them are in each of the states Active, Creating, and/or Deleting. The primary key for this table may in some embodiments include a SubscriberId attribute, as described above. In some embodiments, this table may be treated as a secondary index to the Tables table. The count of the total number of tables and/or the count of the number of tables in the Creating state may be incremented in response to the invocation of a CreateTable workflow.
- Partitions Table: This table may maintain a list of all partitions for a particular table, and may indicate their locations. The primary key for this table may in some embodiments include a TableId attribute and a PartitionId attribute.
- Nodes Table: This table may maintain a list of nodes, and may indicate the partitions that are hosted on each of them. The primary key for this table may in some embodiments include a NodeId attribute. In some embodiments, this table may be treated as a secondary index to the Partitions table.

Figure 4:
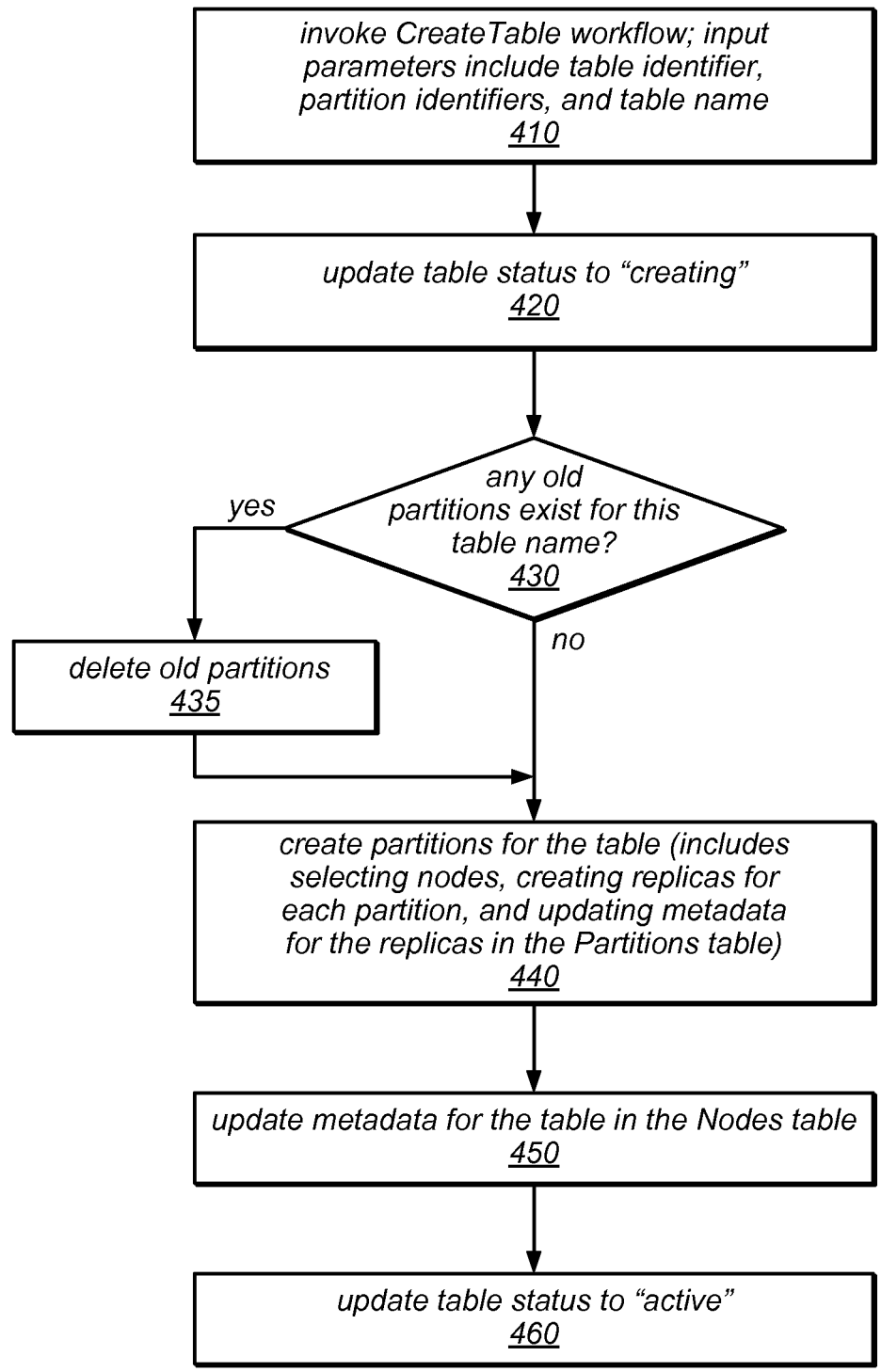
FIG. 4 is a flow diagram illustrating one embodiment of a workflow for creating a table.

As previously noted, a system that is configured to implement the data storage service described herein may rely on one or more workflows that are executed using an external workflow service. FIG. 4 illustrates one embodiment of such a workflow for creating a table. As illustrated at 410, the method may include invoking the CreateTable Workflow (e.g., in response to a request to create a table, and subsequent to generating metadata for the new table). As illustrated in this example, in some embodiments, the table name, table identifier, and/or partition identifiers may all be passed to the CreateTable workflow as inputs to that process. Note that this (and/or any other service requests described herein) may include an input parameter identifying a particular subscriber, such as an accountID parameter. In such embodiments, the value of this input parameter may be passed to any workflows invoked in response to receiving the service request (e.g., the CreateTable workflow).

In some embodiments, a CreateTable workflow may allocate one or more partitions for a new table, create two or more replicas each for the partitions, and update the appropriate metadata in response to creating the table. One embodiment of such a workflow is illustrated by the flow diagram in FIG. 4. The workflow may be intended to be self-healing, in some embodiments. In such embodiments, if the process fails before completion, the whole workflow may be rerun one or more times until it succeeds. For example, each of the operations illustrated in FIG. 4 may be retried again and again in response to a failure. Note that in this example, it is assumed that the workflow is invoked only after determining that no active table exists that has the specified table name.

As illustrated in this example, the workflow may include updating the status of the table to "Creating" to reflect the fact that a workflow is currently working to create the table, as in 420. In some embodiments, the table status may be atomically updated to "Creating". In such embodiments, if multiple workflows attempt to perform this same table creation operation, only one will succeed, thus allowing the system to avoid a race condition, in this case. The workflow may also include determining whether any old partitions exist that include the table name specified for the new table, as in 430. For example, if a creation operation specifying this table name has been attempted (and failed) in the past, there may be remnant partitions remaining in the system that should be deleted before proceeding with the rest of the CreateTable workflow. In some embodiments, the workflow may include querying metadata (e.g., the Tables table) for any partitions associated with this table name. For example, there may be remnants of a previous failed attempt to create a table with this table name in the system, including metadata for the table in one or more metadata tables. For each partition found, there may be multiple replicas, and each of these replicas may be physically deleted from the storage nodes on which they reside, as in 435.

If no partitions associated with the specified table name are found (e.g., if this table creation operation has not been previously attempted and failed), shown as the negative exit from 430, or once such remnants have been deleted, the workflow may create one or more partitions for the new table, as in 440. As previously described, in some embodiments, the number of partitions created may be based on user input, historical data, and/or system-wide, client-specific, or application-specific defaults. As illustrated in FIG. 4, creating partitions for the new table may include selecting nodes on which to store multiple replicas of each of the partitions, creating the multiple replicas, and updating the partition metadata (e.g., updating the Partitions table to include the newly created replicas and to indicate their locations). In some embodiments, selecting the nodes on which to store the replicas may include querying metadata to discover healthy nodes on which replicas can be stored, and allocating replicas to various ones of the healthy nodes using any of a variety of suitable allocation algorithms. In some embodiments, the system may support two or more flexible and/or pluggable allocation algorithms, including, but not limited to, selecting the nodes that have the most available storage space, selecting the nodes experiencing the lightest workload (e.g., the nodes receiving the fewest service requests), or selecting nodes at random (which may minimize a herding effect in which all new partitions go to the most lightly loaded nodes).

As illustrated in FIG. 4, the CreateTable workflow may include updating node related metadata for the newly created table (e.g., in the Nodes table), as in 450. For example, the workflow may include reading all of the node locations of the newly created replicas from the Partitions table (which was updated in 440), and adding each of the newly created replicas to the appropriate entries of the Nodes table. Once the table's partitions (and their replicas) have been created, and the appropriate metadata has been updated to reflect the creation of the new table, the workflow may include updating the status of the newly created table to "Active", as in 460. In some embodiments, updating the status of the newly created table to "Active" may include decrementing a count of the number of tables that are in the Creating state in the Subscribers table described above.

As noted above, in some embodiments, if any of the operations illustrated in FIG. 4 fail, they may be retried up to a pre-determined maximum number of attempts. For example, in one embodiment, any CreateTable workflow step that is unsuccessful may be retried up to ten times, and may employ an exponential back-off between attempts. In some embodiments, if the workflow step is not successfully completed after the maximum number of attempts, the state of the table being created may be reset to Creation Pending to indicate that no workflow is currently working on creating the table. In such cases, the system may or may not perform cleanup of any residual replicas created during the unsuccessful attempts. For example, in some embodiments, this cleanup may be left for a subsequent CreateTable workflow. In some embodiments, a sweeper workflow may run periodically (e.g., once every 30 minutes), and may scan the Tables table to determine if there are any tables currently in state Creation Pending. If so, and if the state of this table has not been updated since the last time the Tables table was scanned by the sweeper workflow, the sweeper workflow may assume that the creation of this table failed, and may invoke a new CreateTable workflow in an attempt to create the table.

In various embodiments, a DeleteTable API may be used to delete a table and all of its indexes. In some embodiments, if a table that is the target of a DeleteTable API is in a Creating state when the request to delete to that table is received on behalf of a storage service client, the service may return an indication of an error (e.g., a 400 "ResourceInUse" error indication). If the table is in an Active state when the request is received, the service may trigger (and/or the underlying system implementing the service may invoke) an asynchronous DeleteTable workflow that returns immediately (i.e. without waiting for the workflow to be completed). In such embodiments, the success of the workflow may be subsequently determined by checking the status of the table via a DescribeTables API. In various embodiments, a DescribeTables API may be used to enumerate (e.g., list) information about tables belonging to a given storage service client. For example, in response to receiving a request on behalf of a user to describe tables belonging to that user, the data storage system may return primary key information and/or the status of any tables specified in the request or (if none are specified) all tables that belong to that user. If the indication of the state of the table that is returned in a response to a DescribeTables request is "Deleting" then the delete operation may be in progress. In some embodiments, no error indication would be returned in this case. Once the delete process is complete, the response to a DescribeTables request may no longer include an entry for the deleted table.

As noted above, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

In some embodiments, a PutItem API may be used to insert a new (single) item in a table. In some embodiments, this API may be used to perform a conditional put operation. For example, it may be used to insert an item in a table if it does not already exist in that table (according to the specified value of the primary key), or to replace an existing single item in a table if it has certain attribute values (e.g., a specified primary key). More specifically, in some embodiments this API may be used to completely replace all of the attributes of an existing item (except the primary key) with new attributes to create a "new" item. In such embodiments, the data storage system may guarantee that this replacement operation is performed atomically. In other words, the system may perform the replacement operation in a way that guarantees that the item is observable only with all of its new attributes or with all of its previous attributes, and is not observable in an interim state (e.g., with a mix of previous and new attributes). In some embodiments, the PutItem API may be an idempotent API if a conditional put operation is not specified. In other words, a request made using a non-conditional form of the PutItem API may insert a specified new item in a table exactly once, even if it is called multiple times with the same input parameter values.

In various embodiments, a DeleteItem API may be used to delete a single item in a table, where the item is identified by its primary key. In some embodiments, this API may be used to perform a conditional delete operation. For example, it may be used to delete an item if it exists, or if it has certain attribute values (e.g., particular attribute values other than the specified primary key). In some embodiments, the DeleteItem API may be an idempotent API if a conditional put operation is not specified. In other words, a request made using a non-conditional form of the DeleteItem API may cause the system to delete a specified new item in a table exactly once, even if it is called multiple times with the same input parameter values. In these and other embodiments, attempting to delete a non-existent item may not result in an error condition, and may not cause an error indication to be returned.

In various embodiments, a GetItem or GetItems API may be used to retrieve one or more items (i.e. to return one or more attributes of those item), given their primary keys. In some embodiments, the number of items that can be retrieved in response to a single GetItems request may be limited and/or the items retrieved must all be stored in the same table. For example, in one embodiment, attributes for a maximum of eight items may be returned in response to a single GetItems request. In some embodiments, multiple items may be retrieved from a table in parallel, which may minimize latency. The data storage service (and/or the underlying system) may support projection and/or consistent reads (without a latency penalty), in various embodiments. In some embodiments, the system may support an eventual consistency model by default, which may result in higher throughput for servicing requests. In some embodiments in which multiple items are requested in a single GetItems request, items that do not exist in the targeted table will not be returned. In this case, there may or may not be any error messages returned to indicate that one or more of the requested items were not returned.

In various embodiments, an UpdateItem API may be provided by the data storage service (and/or the underlying system). This API may be used to insert an item if it does not already exist, or to manipulate an existing item at the attribute level (e.g., to modify the values of one or more of its attributes). For example, updating an item may include inserting, replacing, and/or deleting various attributes of an existing item. In some embodiments, updating an item may include atomically incrementing or decrementing the value of an attribute having a number type. While the PutItem API described above may be used to replace all of the attribute values of an existing item, the UpdateItem API described herein may provide a more granular replacement operation. In other words, this API may be used to modify a subset of the attribute values of an existing item, and/or to modify the set of attributes that are defined for an existing item.

In various embodiments, an UpdateItem API provided by the data storage service (and/or the underlying system) may perform a conditional update. In such embodiments, this API may be used to conditionally insert an item (e.g., to create an item if it does not already exist), or to conditionally replace (i.e. update) an item (e.g., only if its attributes match any specified expected values). Updating an item may include inserting, updating, and/or deleting various attributes of an existing item. In some embodiments, the data storage system may optionally return the old attribute values for an item that is replaced/updated using this API.

Figure 5:
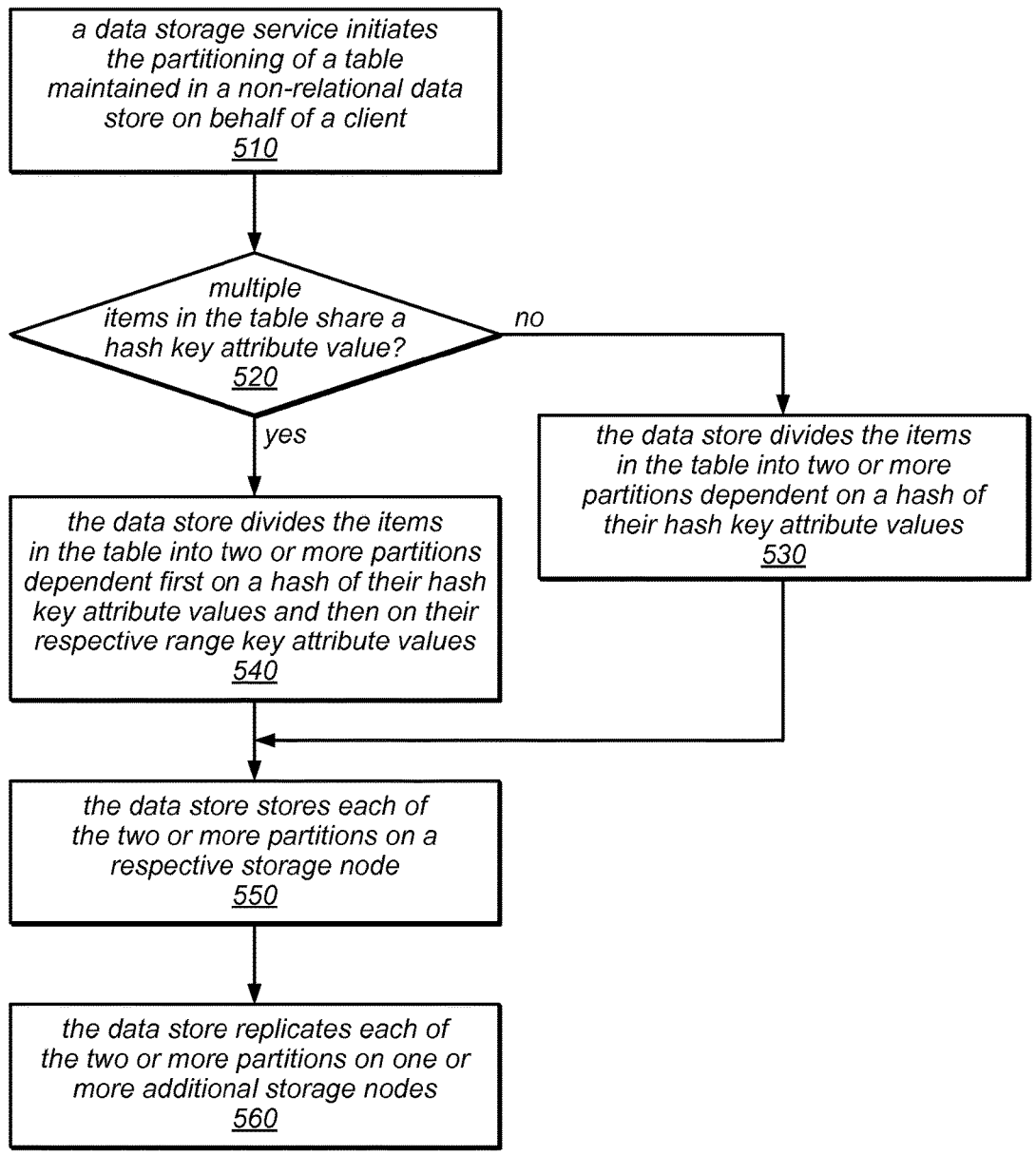
FIG. 5 is a flow diagram illustrating one embodiment of a method for partitioning a table maintained in a non-relational data store.

As previously noted, in embodiments in which the primary key is a simple key, the item in a table being maintained on behalf of a storage service client may be partitioned using a hash of the primary key value of each of the items, while in embodiments in which the primary key is a composite key, the data may be partitioned first by a hash of the hash key component, and then by the range key component. FIG. 5 illustrates one embodiment of a method for partitioning table data using simple and/or composite keys, according to one embodiment. As illustrated at 510, in this example, the method may include a data storage service (or a component of the underlying system that implements a data store, such as a storage node instance or administrative component) initiating the partitioning of a table maintained in a non-relational data store on behalf of a storage service client.

If multiple items in the table share a hash key attribute value, shown as the positive exit from 520, the method may include the data store dividing the items in the table that have a given hash key attribute value into two or more partitions (e.g., database partitions) dependent first on a hash of their range key attribute values, and then on their range key attribute values, as in 540. In other words, if the primary key for the table is a composite key that includes hash key component whose values may be used to identify a group of items and a range key component whose values may be used to order items having the same hash key attribute values and uniquely identify each of those items, both the hash key attribute value and the range key attribute value may be used to partition the items in the table. For example, for a group of items that have the same hash key attribute value, the first n items in the group (when ordered by their respective range key attribute values) may be assigned to one partition, the next m items in the group may be assigned to a second partition, and so on. Note that in some embodiments, each partition may include a portion of the items sharing one hash key attribute value and may also include other items having other hash key attribute values.

If none of the items in the table share a hash key attribute value, shown as the negative exit from 520, the method may include the data store dividing the items in the table into two or more partitions dependent on a hash of their respective hash key attribute values, as in 530. For example, if the primary key for the table is a simple key that includes hash key component whose values may be used to uniquely identify each of the items in the table, the items in the table may be partitioned (i.e. assigned to one of a plurality of partitions) dependent a hash of the hash key attribute value, but not dependent on any other item attribute values. In some embodiments, if the primary key is a composite key, but none of the items in the table share a hash key attribute value (i.e. if each item has a unique hash key attribute value), the data store may partition the items as if the primary key were a simple key (i.e. it may partition the items in the table using the hash key attribute value alone).

Once the data store has assigned all of the items to a partition, the data store may store each of the partitions on a respective storage node (e.g., a respective computing node or storage device), as in 550. In some embodiments, each partition of a single table may be stored on a different storage node, while in other embodiments two or more of the partitions may be maintained on the same storage node. In various embodiments, each of the resulting partitions may be replicated one or more times in the data storage system, as in 560. Note that in some embodiments, the number of partitions into which the items of a given table are partitioned may be pre-determined (e.g., it may be based on user input/preferences, or historical data for a client, account, or table type), while in other embodiments, the number of partitions into which the items of a given table are partitioned may be determined as the partitioning operation progresses, e.g., based on the number of items in each range of hash results and/or the number of items in each range of range key attribute values. Note also that because the partitioning is based on a hash result, the order in which groups of items may be assigned and distributed among the available partitions may be somewhat randomized. In some cases, e.g., if some items are accessed much more frequently than others or some groups of items include a higher number of items than others, an initial partitioning may result in hot spots. In such cases, a repartitioning operation may be performed in order to more evenly distribute the items among the available partitions (e.g., with respect to data volume and/or service request traffic). Note also that in some embodiments, the items in a table may be partitioned using a single hash key component and two or more range key components.

Table 2 below illustrates an example of the partitioning of items in table using a method similar to that illustrated in FIG. 5. In this example, the hash key attribute is a "User name" attribute, and the range key attribute is a "Message ID" attribute. The table stores multiple messages associated with each of three user names (Bob, Sue, and Phil). As illustrated in Table 2, some partitions of a given table may include only items having the same hash key attribute value. In this example, a partition identified by a Partition ID value of A stores only messages having the hash key attribute value "Bob". Note that this partition does not store all of Bob's messages, only messages having Message ID values (i.e. range key attribute values) 1-199. Another group of Bob's messages (those with range key attribute values 200-299) are stored in a partition identified by a Partition ID value of B. This partition also stores messages having a hash key attribute value of "Sue", specifically, those messages having range key values of 1-50. Yet another group of Bob's messages (those with range key attribute values 300-399) are stored in a partition identified by a Partition ID value of C. This partition also stores messages having a hash key attribute value of "Phil", specifically, those messages having range key values of 1-100.

TABLE 2

| User name | Message ID | Partition ID |
|---|---|---|
| Bob | 1 | A |
| Bob | 2 | A |
| ... | | |
| Bob | 199 | A |
| Bob | 200 | B |
| ... | | |
| Bob | 299 | B |
| Bob | 300 | C |
| ... | | |
| Bob | 399 | C |
| Sue | 1 | B |
| Sue | 2 | B |
| ... | | |
| Sue | 50 | B |
| Phil | 1 | C |
| Phil | 2 | C |
| ... | | |
| Phil | 100 | C |

In the example above, a request to retrieve all of Bob's messages may retrieve messages 1-199 from partition A (which may be maintained on a particular storage node), messages 200-299 from partition B (which may be maintained on a different storage node), and messages 300-399 from partition C (which may be maintained on yet another storage node). As described in more detail herein, in some embodiments, a request to retrieve all of these messages may be terminated early (e.g., if response limit is reached), and the remaining messages may be retrieved in response to a subsequent request.

In some embodiments, the data storage service (and/or underlying system) described herein may provide two different APIs for searching the data maintain in tables on behalf of storage service clients: a Scan API and a Query API. In some embodiments, the Scan API may be used to request an operation that scans an entire table. A Scan request may specify one or more filters to be applied to the results of the scan operation, e.g., to refine the values returned to the requestor following the complete scan. In some embodiments, the service (and/or underlying system) may impose a limit on the scan results, and the limit may be applied before the results are filtered. For example, in some embodiments, the system may use pagination (e.g., dividing a scan or query process into distinct pieces having a pre-determined maximum size in terms of the number of items evaluated or returned, or in terms of the amount of data scanned or returned) in order to respond to scans and/or queries quickly. For example, in order to scan a table that is larger than the pre-determined maximum size (e.g., 1 MB) or for which the resulting data set is larger than a pre-determined maximum size (e.g., 1 MB), multiple scan or query operations may need to be performed to scan the entire table, in 1 MB increments. It may be possible for a scan operation to return no results, if no table data meets the specified filter criteria.

In some embodiments, the Query API may support comparison operations to limit the search process to the data that matches the supplied query conditions (e.g., conditions on the attributes of the items). For example, a Query request may be used to find all the data in a table that matches the parameters specified in the request, up to a pre-defined limit (if such a limit is imposed by the system). In some embodiments, a Query request may always returns results, but the system may return empty values if the query conditions (i.e. the attribute filter criteria) does not match any of the results. In various embodiments, a Query API may be used to query a table that is maintained on behalf of a storage service client (e.g., a user, customer, subscriber, or client application) for information stored in that table. In some embodiments, the query may be performed based on a primary index (according to a specified hash key and, in some cases, a single range key value that satisfies a specified range key predicate). In other embodiments a primary key may include a single hash key component and two or more range key components.

Figure 6:
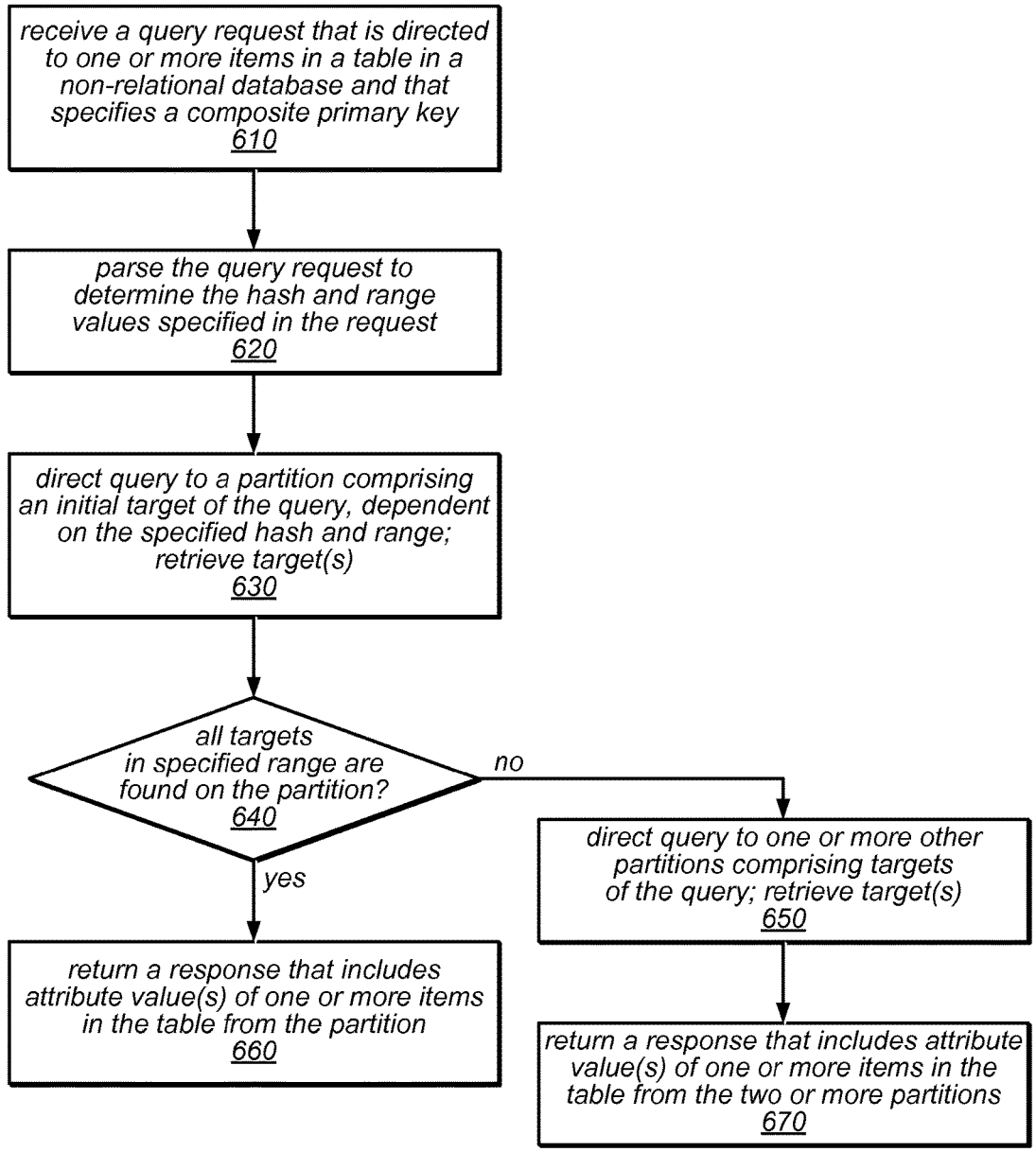
FIG. 6 is a flow diagram illustrating another embodiment of a method for performing a query.

A more detailed example of a method for performing a query, as specified by the API described herein, is illustrated by the flow diagram in FIG. 6, according to one embodiment. As illustrated at 610, in this example, the method may include receiving a service request to perform a query that is directed to one or more items in a table in a non-relational database (e.g., a table maintained on behalf of a data storage service client). As in previous examples, the request may include a table name (which may identify the table that is the target of the query), and a primary key value. In this example, the specified primary key value is a composite key value (i.e. the primary key for the identified table is a composite primary key dependent on a hash key value and a range key value), and the query may target multiple items that match the hash key value and range key condition specified in the request, as described herein. As illustrated at 620, the method may include parsing the request to determine the hash and range values specified in the request.

The method may include directing the query to a partition that comprises an initial target of the query, dependent on the specified hash and range values, and retrieving information about one or more targets of the query (e.g., attribute values of the items targeted by the query) from that partition, as in 630. For example, in some embodiments, the items matching a particular hash key value may be ordered in the table by their range key values. In such embodiments, the combination of the specified hash key value and the first range key value that matches the specified range key condition may uniquely identify the first item in the table that matches the query conditions. In such embodiments, a query may first be directed to the partition that contains the item identified by this combination. In some cases, one or more additional items matching the specified hash key value and the specified range key condition may be present on the first partition to which the query is directed, and all of these targets (i.e. the items themselves and/or a specified subset of their attribute values) may be returned in response to the query.

In some cases, some of the items matching both the specified hash key value and the specified range key condition may be stored on one or more partitions of the table other than the first partition to which the query was directed. If so, shown as the negative exit from 640, the query may be directed to the one or more other partitions, and these additional query targets may be retrieved, as in 650. For example, the number of items matching both the specified hash key value and the specified range key condition may be larger than the number of items stored in each partition of the table. In another example, because of the order in which items are sorted and stored in the table and/or assigned to various partitions (e.g., in embodiments in which items are sorted in a particular order and assigned to a particular partition according their range key values), the targeted items may cross a partition boundary. In these and other cases, the method may include returning a response that includes one or more attribute values of one or more items matching both the hash key value and the range key condition, as in 670, where some of the one or more items matching both the hash key value and the range key condition may be retrieved from different partitions (and, in some cases, different physical computing nodes or storage devices).

As illustrated in FIG. 6, however, if all of the items matching both the specified hash key value and the specified range key condition are stored on the first partition to which the query was directed, shown as the positive exit from 640, the method may include returning a response that includes one or more attribute values of one or more items matching both the hash key value and the range key condition, as in 660, where all of the one or more items matching both the hash key value and the range key condition are retrieved from the initially targeted partition (and, thus, a single physical computing node or storage device).

In various embodiments, a Scan API may be used to retrieve one or more items and attributes stored in a table on behalf of a storage service client by performing a full scan across the table. The items returned may be limited by specifying a filter. In some embodiments, the Scan API may support richer semantics than the Query API described above. For example, it may support comparison operators such as "CONTAINS", "IS NULL", "IN", etc.

Note that in some embodiments, the following error indications may be returned by any of the APIs supported by the service, while others may be returned by specific ones of these APIs.

Figure 7:
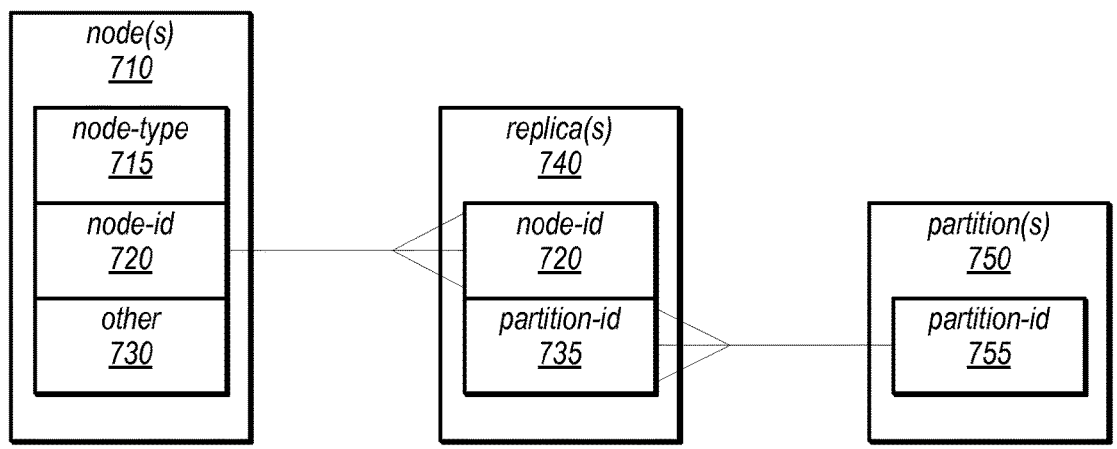
FIG. 7 is a block diagram illustrating a portion of a data model for a system that provides data storage services, according to one embodiment.

InvalidParameterValue
   MissingParameterValue
   InternalFailure
   ServiceUnavailable In some embodiments, any or all of the metadata described herein as being used in maintaining and managing tables on behalf of a data storage service client (including any of the metadata tables described herein) may be stored in the same scalable data store (e.g., the same non-relational database) as that in which the client/user tables are stored. In such embodiments, the system may include or employ one or more bootstrapping mechanisms to assist with initialization of the data storage service (and/or the underlying system that implements a data storage service), some of which are described herein. FIG. 7 illustrates a portion of a data model for such a system, according to one embodiment. In this example, various computing nodes (represented in the data model simply as "nodes 710") may store user data (e.g., in tables maintained on behalf of a user) and/or system data, including metadata used by the data storage service, such as that described above. Therefore, each node 710 of the data model may include an indicator of the type of the node, shown as node-type 715. For example, in one embodiment, each node may be designated as a "storage node", a "request router", an "auto-admin" node, or a "staging" node. In some embodiments, a "storage node" may store user data in one or more tables maintained by the data storage service, but metadata (e.g., data stored in one or more of a Tables Table, a Subscribers Table, a Partitions Table, or a Nodes Table) may be hosted on other types of nodes (e.g., "auto admin" nodes and/or "staging" nodes). In other embodiments, such metadata may be stored on one or more "storage nodes", some of which may also store user data. As illustrated in FIG. 7, each node 710 may also include an identifier of the node (shown as node-id 720), and one or more other elements (shown as 730).

As illustrated in FIG. 7, information about each replica may be represented in the data model as a replica 740. Each replica 740 in the data model may include an identifier of the node on which the replica is hosted (shown again as node-id 720), and one or more partition identifiers (shown as partition-id 735) indicating the partitions included in those replicas. In this example, each partition may be represented in the data model as a partition 750 and may include its partition-id 755. As illustrated in FIG. 7 by various one-to-many mappings, each node may host multiple replicas, and each partition may be included in multiple replicas.

In some embodiments, the systems described herein may support seamless scaling of user tables in a "fully shared nothing" type architecture. For example, in some embodiments, each partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. As described herein, in some embodiments, live repartitioning (whether programmatic/automatic or explicitly initiated) may be employed to adapt to workload changes. In other words, in some embodiments, repartitioning (including partition moving, partition splitting, and other repartitioning operations) may be performed while service requests directed to the affected partitions continue to be received and processed (i.e. without taking the source partition off-line).

In different embodiments, the data storage service (and/or underlying system) may support a variety of service offerings and/or throughput models. For example, in some embodiments, the service may support a committed throughput offering and/or a best effort offering. In some embodiments, a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table.

In various embodiments, there may be situations in which a partition (or a replica thereof) may need to be copied, e.g., from one machine to another. For example, if there are three replicas of a particular partition, each hosted on a different physical or logical machine, and one of the machines fails, the replica hosted on that machine may need to be replaced by a new copy (replica) of the partition on another machine. In another example, if a particular machine that hosts various replicas of multiple partitions of one or more tables experiences heavy traffic, one of the heavily accessed partition replicas may be moved (e.g., using a copy operation followed by an operation to redirect traffic) to a machine that is experiencing less traffic in an attempt to more evenly distribute the system workload and improve performance. In some embodiments, the data storage service (and/or underlying system) described herein may perform replica moves and/or replica copying using a physical copying mechanism (e.g., a physical file system mechanism) that copies an entire partition replica from one machine to another, rather than copying a snapshot of the partition data row by row (as in a traditional logical database partition copying operation). As described in more detail herein, in some embodiments, all write operations may be logged before being applied to a particular partition (and/or various replicas thereof), and they may be applied to the partition (i.e. to the replicas thereof) periodically (e.g., in batches). In such embodiments, while a partition replica is being copied, write operations targeting the partition may be logged. During the copy operation, these logged write operations may be applied to the partition at periodic intervals (e.g., at a series of checkpoints). Once the entire partition has been copied to the destination machine, any remaining logged write operations (e.g., any write operations performed since the last checkpoint, or any write operations that target portions of the partition that were copied to the destination prior to those write operations being logged) may be performed on the destination partition replica by a final catch-up process. In some embodiments, the catch-up process may examine the sequentially ordered write operations in the log to determine which write operations have already been applied to the destination partition replica and which, if any, should be applied to the destination partition replica once the physical copying of the partition data is complete. In such embodiments, unlike with traditional partition copying or moving mechanisms, the data in the destination partition replica may be consistent following the completion of the operation to move/copy the partition replica.

Figure 8:
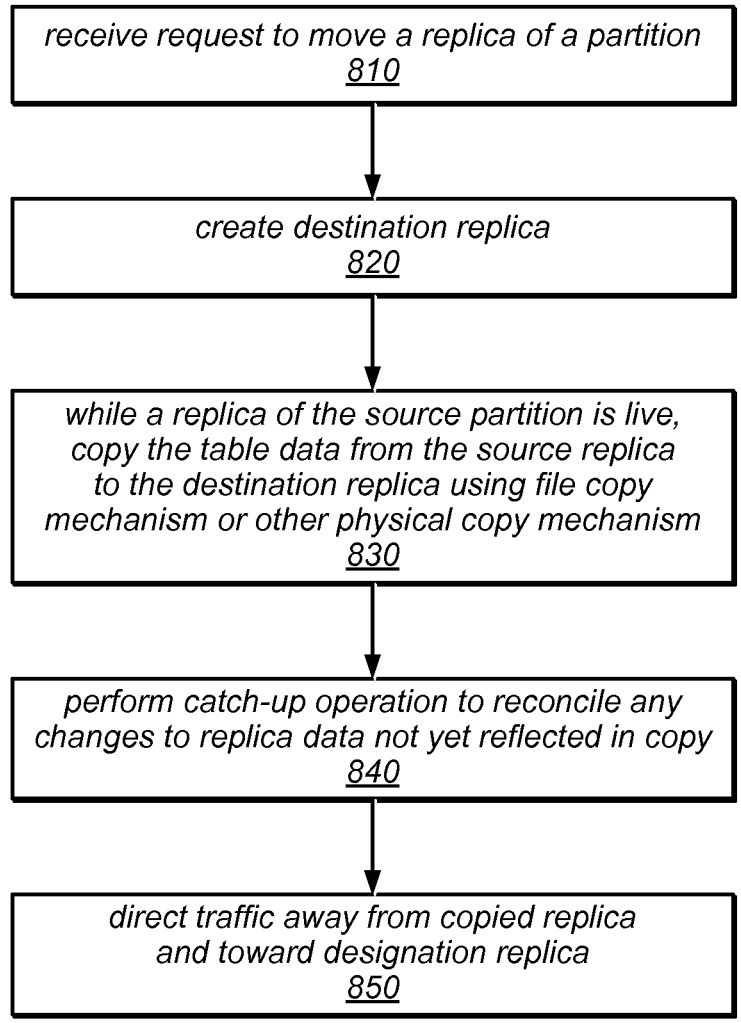
FIG. 8 is a flow diagram illustrating one embodiment of a method for moving a replica of a partition of a table being maintained by a data storage service on behalf of a storage service client while the partition is "live".

One embodiment of a method for moving (or copying) a replica of a partition of a table being maintained by a data storage service on behalf of a storage service client while the partition is "live" is illustrated by the flow diagram in FIG. 8. In this example, the method may include a component of the system that implements the data storage service receiving a request to move a replica of a partition, as in 810. For example, the system may receive an explicit request to move a replica from a client/user or system administrator, or such a request may be automatically generated in the system in response to detecting an anomaly (as described in more detail herein). As illustrated at 820, in response to receiving the request to move the partition, the system may be configured to create a new replica (which may be referred to as a destination replica), while the partition is live (i.e. while one or more replicas of the partition continue to accept and service requests directed to the partition). In some embodiments, creating a destination replica may include selecting a computing node or storage device on which to create the destination replica, allocating memory on the computing node or storage device for the destination replica, creating or updating metadata associated with the partition and/or the destination replica, and/or performing other functions appropriate for creating the destination replica.

As illustrated in this example, the method may include the system copying table data from the replica being moved (or from another source replica storing the same table data as the replica being moved) to the destination replica using a file copy mechanism or another physical copy mechanism while one or more replicas of the partition are live, as in 830. In other words, the replica may be copied to the new destination replica using an operation that copies the physical locations of the replica data, rather than using a logical copying operation (e.g., one that reads and copies table data on a row-by-row basis). As illustrated at 840, after performing the physical copying operation, the method may include the system performing a catch-up operation to reconcile any changes to the replica data that were made during the copy operation but that are not yet reflected in the new copy. This catch-up operation is described in more detail below. Once the destination replica has been created and populated, the method may include directing traffic away from copied replica and toward the new designation replica, as in 850. For example, the system may configure the new destination replica to receive and service requests targeting table data that was maintained on the particular partition replica and some or all service requests targeting the partition may be directed away from the source replica and toward the new destination replica.

Figure 9:
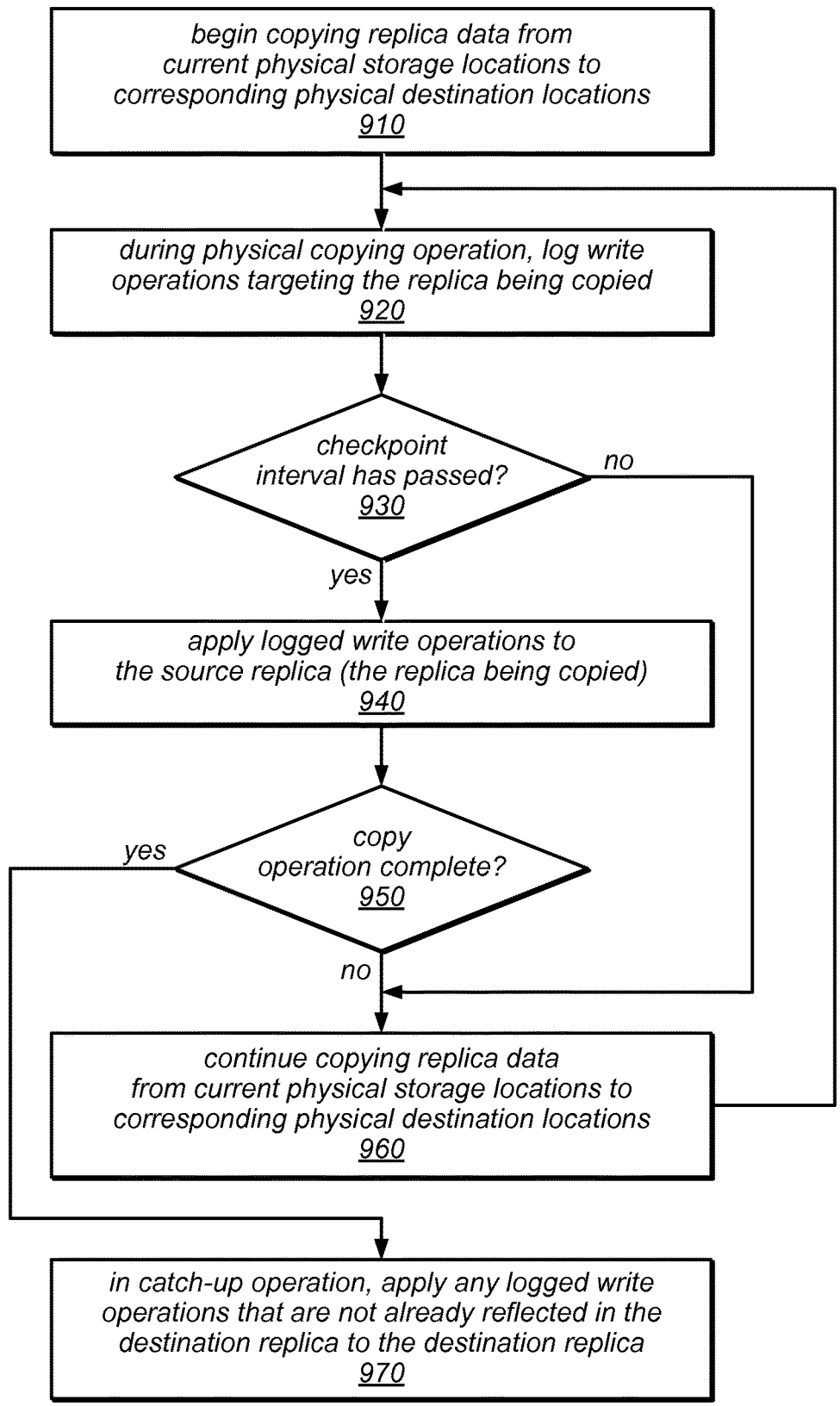
FIG. 9 is a flow diagram illustrating one embodiment of a method for copying a replica using a physical copy mechanism.

In some embodiments, the storage engine for the underlying data store of a data storage service (e.g. a non-relational database) may store replica data in database files, and each replica (and database file) may be associated with a recovery log. In such embodiments, when a service request to modify the replica data is received, it may be logged in the recovery log before being applied to the replica. In the case of a node failure or system crash, the changes logged in the recovery log may be reapplied to a previous snapshot or checkpoint of the replica data to recover the contents of the replica. As noted above, in some embodiments, the data storage service (and its underlying system) may support a replica move operation and/or a replica copying operation that employs a physical copy mechanism. In some such embodiments, the physical copy mechanism may employ such a log, which may ensure that the replica data that is moved to a new destination is consistent. FIG. 9 illustrates one embodiment of a method for copying a replica using a physical copy mechanism, as described above. In this example, the method begins copying replica data from its current physical storage locations to corresponding physical destination locations, as in 910. In some embodiments, the physical copy operation may include copying pages from one physical storage device (e.g., disk storage) to a destination storage device over a network.

As illustrated at 920, during the physical copying operation, write operations targeting the partition whose replica is being copied may be logged before being applied to the replica being copied, as described above. In various embodiments, each logged write operation (or group of write operations) may be assigned a log sequence number. In some embodiments, the logged changes may be applied to the replica being copied (and/or to other replicas that store the same table data) at periodic checkpoint intervals. In the example illustrated in FIG. 9, when a pre-determined checkpoint interval passes, shown as the positive exit from 930, all of the modifications (e.g., write operations) logged since the last checkpoint may be applied to the replica being copied (e.g., the source replica) and/or to other replicas that store the same table data. Because these updates are applied while the source replica is being copied, some of these modifications will be reflected in the destination replica as a result of the copying operation (e.g., modifications that were applied to a given portion of the replica data before that portion of the data was copied to the destination). Other modifications may not be reflected in the destination replica following the copying operation (e.g., modifications that were applied to a given portion of the replica data after that portion of the data was copied to the destination).

As illustrated in FIG. 9, the method may include continuing to copy replica data from current physical storage locations to corresponding physical destination locations while it is not complete (shown as the negative exit from 950, element 960, and the feedback to 920). The method may include continuing to log write operations (as in 920) and to apply logged write operations to the source replica, i.e., the replica being copied, (as in 940) each time the checkpoint interval passes (shown as the positive exit from 930). Once the physical copy operation is complete (shown as the positive exit from 950), the method may include performing a catch-up operation, in which any logged write operations that are not already reflected in the destination replica are applied to the destination replica, as in 970. Thereafter, if the copying of the partition was performed as part of an operation to move the partition replica, some or all accesses targeting the partition whose replica was copied may be directed away from the source replica and directed toward the new destination replica. For example, any write operations targeting the partition may be logged in a recovery log for the destination replica, and subsequently applied to the destination replica (e.g., at the next periodic checkpoint). In some embodiments, following the copying of the replica to a new destination (e.g., as part of a move operation), the log in which modifications to the source replica were logged may be copied (or used directly) for the recovery log for the destination replica.

In some embodiments, the replica copying process described above may be employed in partition splitting operations. For example, a partition may be split because it is large (e.g., because it is becoming too big to fit on one machine) and/or in order to keep the partition size small enough to quickly rebuild the partitions hosted on a single machine (using a large number of parallel processes) in the event of a machine failure. A partition may also be split when it becomes too "hot" (i.e. when it experiences a much greater than average amount of traffic as compared to other partitions). For example, if the workload changes suddenly and/or dramatically for a given partition, the system may be configured to react quickly to the change. In some embodiments, the partition splitting process described herein may be transparent to applications and clients/users, which may allow the data storage service to be scaled automatically (i.e. without requiring client/user intervention or initiation).

Note that in some embodiments, moving (or copying) a replica of a partition in a cluster may be quicker than splitting a partition, because the system may take advantage of the file copying process described above for replica copying. Splitting a partition, on the other hand, may require logically dividing the partition data in one underlying data structure (e.g., one B-tree) into two such data structures (e.g., two B-trees), which is generally less efficient than moving an entire replica, as described above. Therefore, in some embodiments, a partition splitting process may include creating additional replicas of the partition, and thereafter managing only a portion of the partition data on each replica. For example, if there are three replicas of a given partition that is to be split, the partition splitting process may include creating three additional copies of the entire partition (e.g., using the partition copying process described above). These resulting six replicas may be split into two new replica groups of three replicas, each of which may be configured to be responsible for handling service requests directed to half of the original partition data by invoking an operation to split the responsibilities between the replica groups. For example, following the operation to split the responsibilities, service requests directed to data in a designated portion of the original partition may be accepted and serviced by replicas of a given replica group, while service requests targeting the remaining data of the original partition may be rejected by that replica. In some embodiments, the partition data for which a given replica is not responsible may eventually be removed (e.g., so that the memory allocated to the replica for data it no longer supports may be subsequently used to store new items in the replica), or the memory in which it was stored may be reclaimed by the system (e.g., so that the memory allocated to the replica for data it no longer supports may be subsequently used by another partition). Removal of unsupported data or reclamation of memory may be performed by background tasks without affecting the performance of the data storage system, and may be transparent to clients/users.

In some embodiments, each partition may be identified by a partition ID, which may be a unique number (e.g., a GUID) assigned at the time the partition is created. A partition may also have a version number that is incremented each time the partition goes through a reconfiguration (e.g., in response to adding or removing replicas, but not necessarily in response to a master failover). When a partition is split, two or more new partitions may be created, each of which may have a respective new partition ID, and the original partition ID may no longer be used. In some embodiments, a partition may be split by the system using a split tool or process in response to changing conditions. For example, a scheduled task of an auto admin instance may monitor partition sizes and "heat" (e.g., traffic directed to each partition), and may apply policies that determine when to use the splitting tool/process to perform a split. In some embodiments, the splitting tool and auto admin instance may avoid attempting two splits at the same time by employing a lock manager.

In some embodiments, the monitoring component may provide a list of partitions that meet the split criteria to the splitting tool/process. The criteria may be based on partition size and heat, where heat may be tracked by internally measured metrics (such as IOPS), externally measured metrics (such as latency), and/or other factors. In some embodiments, the splitting tool/process may receive a request to split a partition from the monitoring component that includes a partition ID and a version number for the partition to split, and a list of machines (e.g., machines in the same cluster or storage silo that are known to be lightly loaded) for the location(s) of the new partitions/replicas. Including the version number as an input to the splitting tool/process may ensure that the splitting tool/process does not attempt to split a partition that has already gone through one or more reconfigurations since the last time it was evaluated against the split criteria, as the splitting tool/process may reject the request if version number does not match.

Figure 10:
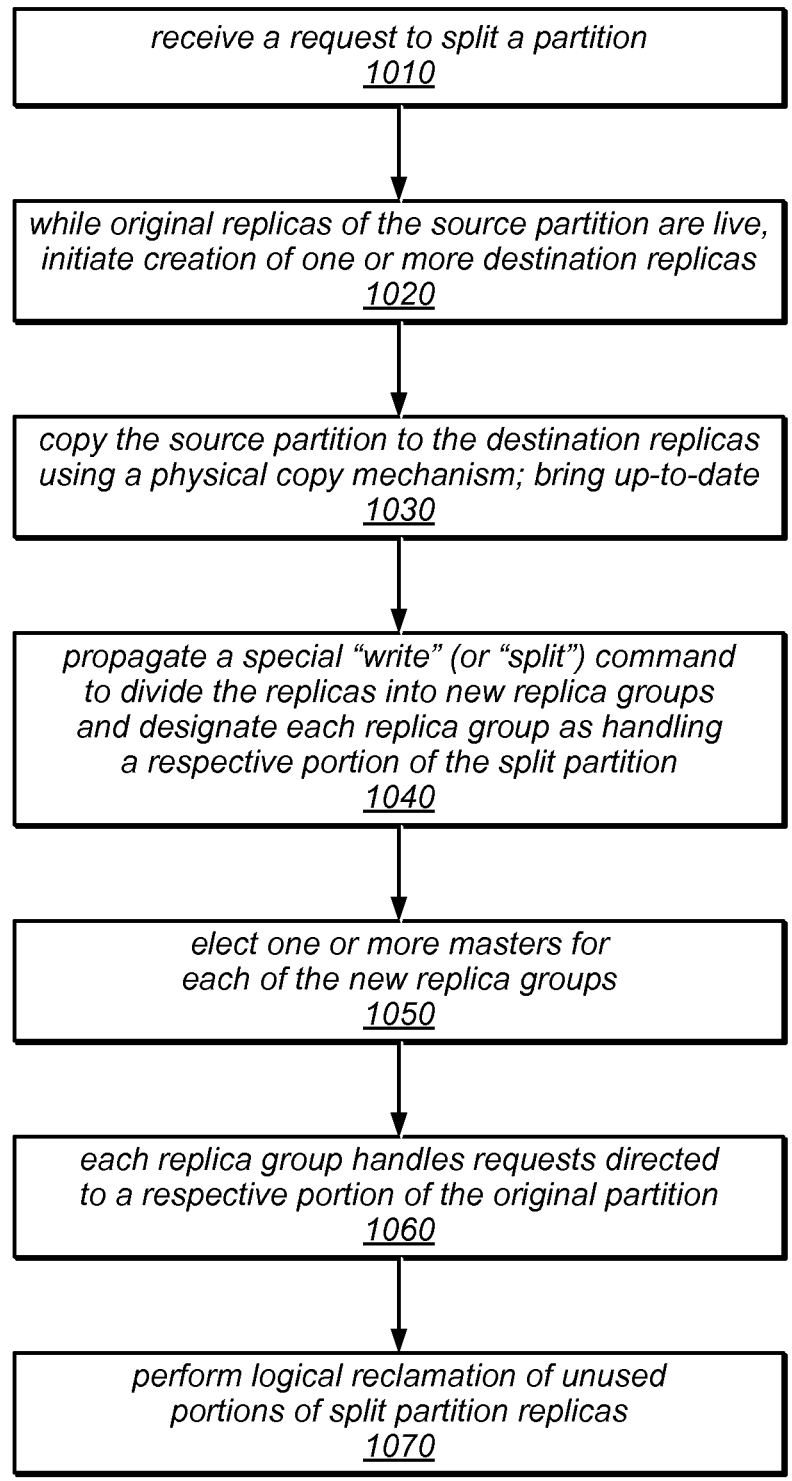
FIG. 10 is a flow diagram illustrating one embodiment of a method for splitting a partition of a table being maintained by a data storage service in response to a request to do so.

One embodiment of a method for splitting a partition of a table being maintained by a data storage service on behalf of a storage service client is illustrated by the flow diagram in FIG. 10. In this example, the method may include a component of the system that implements the data storage service receiving a request to split a partition, as in 1010. For example, the system may receive an explicit request to split the partition from a client/user or system administrator, or such a request may be automatically generated in the system in response to detecting an anomaly (as described in more detail herein). As described above, in some embodiments, splitting a partition may involve creating additional replicas of the partition, dividing the resulting collection of partition replicas into two or more new replica groups, and then designating each of the replica groups as managers of a respective portion of the original partition. Therefore, as illustrated at 1020, in response to receiving the request to split the partition, the system may be configured to initiate creation of the one or more new partition replicas (which may be referred to as destination replicas), while one or more of the original replicas of the source partition are live (i.e. while one or more of these replicas continue to accept and service requests directed to the partition). As illustrated at 1030, the method may include copying data from one or more source partition replicas to the destination replicas using a physical copy mechanism (such as that described above). For example, the system may be configured to copy the table partition data from one (or more) of the original replicas of the partition to one or more of the destination replicas using a file copy mechanism, in some embodiments. The method may also include bringing the new replicas (once populated) up-to-date (e.g., by performing a catch-up operation, as described above).

As illustrated in this example, the method may include propagating a special "write" command (i.e. a "split" command) to split the partition by dividing the resulting collection of replicas into two or more new replica groups and designating (and/or configuring) each replica group as handling service requests directed to a respective portion of the split partition, as in 1040. In some embodiments, the system may take the source replicas out of use briefly while the command to split the partition replicas is propagated to the storage nodes on which the resulting collection of replicas are hosted. In other words, the system may not accept other service requests directed to the partition being split while the split command is operating to configure the new replica groups to receive subsequent service requests. In an example in which a partition is being split into two new partitions, the split command may instruct the replicas resulting from the copy operation to split in half by designating each replica as belonging to the first half of the range or the second half of the range, thus forming two new replica groups. In other embodiments, the split command may designate each replica as belonging to one of more than two replica groups. Note that in some embodiments, the special "split" command may not require any special durability, while in others it may require the same durability as any other replicated write operation, or may have a different durability requirement than other replicated write operations.

As illustrated in this example, once the "split" command has been propagated and the new replica groups have been established, if the system is a single master system or a multi-master system, the method may include each of the new replica groups electing one or more masters for the replica group, as in 1050. Subsequently, the replicas in each of the new replica groups for the split partition (e.g., a replica group made up of the original replicas, a replica group made up of the destination replicas, or a replica group made up of any other subset of the resulting replicas for the split partition) may handle requests directed to a respective portion of the original partition, as in 1060. For example, each of the replicas may reject requests for the table data that is now out of its new smaller range, and may return an indication that the replica (or the node on which the replica is hosted) no longer hosts that data. As described above, in some embodiments, the system may be configured to perform a logical reclamation of the unused portions of the resulting split partition replicas, as in 1070. For example, as requests to store new items in the partition are received, these new items may be stored in locations in the table that (following the replica copying operation) held items stored in the original partition, but that are now being managed as part of a different partition (i.e. one of the two or more new partitions created by the split). In some embodiments, the system may employ a background process to logically free up space within each of the resulting partition replicas, but that space may be consumed later if more items are added to the table that are assigned to the new partition replicas according to their hash key attribute values and/or range key attribute values. In some embodiments, a physical memory reclamation operation may be performed, which may return a portion of the memory that was previously allocated to a large partition replica prior to the split to the operating system. In such embodiments, a de-fragmentation operation may also be performed.

As noted above, the partition moving process illustrated in FIG. 8 and described above may be initiated automatically (e.g., programmatically) in response to detection of an anomaly in a system that implements a data storage service, in some embodiments. One embodiment of a method for moving a partition of a table being maintained by a data storage service on behalf of a storage service client in response to detecting an anomaly is illustrated by the flow diagram in FIG. 11. As illustrated at 1110, in this example, the method may include a component of the system detecting a failure or fault on a physical computing node or storage device that is hosting a replica of a partition of the table. In some embodiments, if the partition replica hosted on the node on which a fault or failure was detected was a master for its replica group, the method may include electing a new master for the replica group, as in 1120. In this example, the method may include the system initiating creation of a replacement partition replica while a source partition replica is live (i.e. while one or more of the replicas of the source partition continue to accept and service requests directed to the partition), as in 1130.

As illustrated in this example, the method may include copying a source partition replica to the newly created replacement partition replica using a physical copy mechanism (as in 1140), and performing a catch-up operation to reconcile any changes to the partition data that are not yet reflected in the newly created replacement partition replica (as in 1150). For example, the source partition replica may be copied to the replacement partition replica using an operation that copies the physical locations of the partition data, rather than using a logical copying operation (e.g., one that reads and copies table data on a row-by-row basis). In various embodiments, the partition replica on the faulty machine may be used as the source partition replica, or one or more other replicas for same partition (e.g., a replica in the same replica group that is hosted on a working machine) may be used as the source partition replica, e.g., depending type and/or severity of the detected fault.

As noted above, the partition moving process described above and illustrated in FIGS. 8 and 9, and the partition splitting process illustrated in FIG. 10 and described above may be initiated automatically (e.g., programmatically) in response to detection of an anomaly in a system that implements a data storage service, in some embodiments. For example, if a hot spot develops on a particular computing node or storage device in the system underlying the data storage service, the system may be configured to split a hot partition for which a replica is stored on that computing node or storage device and/or move one or more partition replicas stored on that computing node or storage device to another computing node or storage device.

In some embodiments, the data storage service (and/or underlying system) may be configured to detect anomalies in the system while servicing requests from one or more storage service clients. In some embodiments, the system may be configured to automatically (e.g., programmatically) respond to the detection of various types of anomalies, such as by scaling tables, moving partitions, splitting partitions, and/or taking other actions not described herein. For example, if a failed or faulty node (e.g., a computing node or storage device) has been detected, the system may be configured to replace the failed or faulty node with a new node and/or to move any or all partitions that are hosted on the failed or faulty node to the new node. As described herein, such a move may in some embodiments be performed using a physical copy operation. As previously noted, if a failed or faulty node hosted a partition replica that was a master for its replica group, the system may also be configured to elect a new master for the replica group subsequent to copying the partition to the new node.

If a hot spot or increasing table/partition size is detected, the system may be configured to add one or more new partitions and corresponding replicas (e.g., on computing nodes or storage devices other than the one on which the hot spot was detected), and to move and/or split data that was hosted on the heavily loaded computing node or storage device in one or more of the new partitions or replicas. Similarly, if the system has detected that a best effort throughput target (or another user preference) is not being met or is in danger of not being met due to increasing traffic or if the data volume is increasing beyond a targeted capacity for the table, the system may be configured to throttle incoming service requests while attempting to correct the situation. Again, the system may be configured to add one or more new partitions and corresponding replicas (e.g., on computing nodes or storage devices other than the one on which the hot spot was detected), and to move and/or split data that was hosted on the heavily loaded computing node or storage device in one or more of the new partitions or replicas. Similarly, if a live repartition is explicitly requested (e.g., by a table owner), the system may be configured to add or remove one or more partitions and corresponding replicas accordingly, or to move and/or split data that was hosted on a heavily loaded computing node or storage device in one or more partitions or replicas.

In general, once an anomaly has been detected and the system has responded to and/or returned an indicator of that anomaly, the system may resume (or continue) servicing incoming requests. In some embodiments, the system may be configured to continue operation (e.g., to continue servicing incoming service requests) until or unless additional anomalies are detected. If any additional anomalies are detected, any or all of the operations described above for resolving such anomalies may be repeated by the system in order to maintain and manage tables on behalf of data storage service clients. Note that in some embodiments, any or all of the operations described above for resolving such anomalies may be performed pro-actively (and automatically) by background tasks while the data storage service is in operation, and may not necessarily be performed in response to receiving any particular service requests.

In various embodiments, the systems described herein may provide storage services to clients, and may maintain data on behalf of clients in partitions that are replicated on multiple storage nodes. In some embodiments, these storage systems may implement a single master failover protocol. In some embodiments, membership in various replica groups may be adjusted through replicated changes, and membership and other updates in the system may be synchronized by synchronizing over a quorum of replicas in one or more data centers at failover time using a replicated quorum version. In some embodiments, a mechanism for splitting a partition may utilize failover quorum synchronization, external master locks, and/or various methods for detecting and resolving log conflicts, including log snipping (e.g., deleting log records that are on invalid branches). The systems may implement a fault-tolerant log shipping based replication mechanism that includes such log conflict detection and resolution. In some embodiments, log branching may be avoided through post-failover rejoins. These and other replication related techniques are described in more detail below.

In some embodiments, the fault tolerant failover protocol of the replicated state machine (distributed database) in the systems described herein may include various mechanisms for synchronizing the read/write quorum. In some embodiments, the failover may include a 'state gathering' phase. During this step, the read quorum may be filled out in a manner that ensures that everything that satisfies the write quorum will be found (e.g., user data writes). Note that the read quorum may also be referred to as the 'failover quorum' since it is the required quorum for proceeding with a failover sync-up.

The replication and failover processes described herein may be implemented by various modules and/or sub-modules of the storage node instances in the system. For example, a log manager may manage the state machine for updates that are in the process of being replicated. As noted above, in some embodiments, the system may implement a single master log shipping based replication approach. In some such embodiments, updates may begin as log records. These log records may be replicated in the system, and then (once they are geographically durable) they may be committed and later applied to the schema. This may be thought of as a replication stream in which all replicated updates are serialized through the stages in strictly increasing order (according to associated log sequence numbers). In some embodiments, the state machine may track the latest log sequence number (or the log record that includes the latest log sequence number) to reach each of the states rather than tracking each log sequence number (or its associated log record) individually. The state machine may also allow for batching, and may not be concerned with missed state notifications, since (for example) if a log record with log sequence number L reaches state S, this always implies that all log records with log sequence numbers less than L have also reached state S.

As used herein, the following sequence terminology may be assumed:

Strictly Increasing: this term refers to a sequence that is always increasing, i.e. a sequence in which every new instance of the sequence has a higher value than the previous instance.

Monotonically Increasing: this term refers to a sequence that is never decreasing, i.e. a sequence in which every new instance of the sequence has an equal or higher value than the previous instance.

Dense: this term refers to a sequence that does not contain holes, i.e. there are no missing members of the sequence. For example, 1, 2, 3, 4, 5, . . . .

Sparse: this term refers to a sequence that may contain holes, possibly a large number of holes (some of which may be large). For example, 1, 2, 7, 9, 1000, . . . .

Various replication and failover techniques may be described herein using some or all of the following terms:

LSN: "Log Sequence Number". In various embodiments, an LSN may include a sequence number, an indication of a master epoch, and a lock generation identifier. These values for a given LSN may in some cases be denoted by sequence(LSN), epoch(LSN), and lock (LSN), respectively.

LSN Sequence: As used herein, this term may refer to the dense, strictly increasing integer sequence of LSNs that define the log stream. This sequence may be defined solely by the sequence(LSN) of each log record. In some embodiments, each partition may have one LSN sequence that defines the order of events for its replicated state machine.

Log Stream: As used herein, this term may refer to the stream of events defined by the LSN Sequence. In some embodiments, outside of the split operation, there may be only one valid log stream such that if sequence $(LSN_1)$=sequence$(LSN_2)$, then epoch$(LSN_1)$=epoch $(LSN_2)$ and lock$(LSN_1)$=lock$(LSN_2)$. In some embodiments, if this is not true for two LSNs with the same sequence number, then only one of those LSNs exists in the valid log stream. In such embodiments, the other LSN exists in an invalid stream branch that must be snipped out of existence (e.g., during failover). In some embodiments, the LSN in the invalid stream branch cannot possibly have been committed based on the system's quorum semantics.

Stream Branch: As used herein, this term may refer to a point in the Log Stream where two LSNs succeed the previous LSN, which may also be referred to as a branching point in the log stream. These two LSNs may have the same sequence number, but may differ in their lock generation identifiers, and (in some cases) in their epoch identifiers. Following these two LSNs there may be two LSN sequences defining two log streams. Each of these log streams may be referred to as a "stream branch". In some embodiments, only one of these branches will survive to become part of the final committed Log Stream. As described herein, a branching point may be created by a failover operation that does not find one or more uncommitted LSNs, where those uncommitted LSN sequence numbers are redefined by the "just failed over to" new master replica.

Master Replica: As used herein, this term may refer to the replica that defines (i.e. creates) new LSNs. In some embodiments, there may always be zero or one master replica at any given time, and this may be guaranteed by the requirement that a master replica must hold an external advisory lock.

Master Reign: A master replica may act as (i.e. perform the role of) the master for its replica group until it loses or releases the external lock. A single master reign may be defined from the time when the master replica becomes master (i.e. the time when a replica assumes the role of master replica for its replica group) until the time that it loses, or otherwise releases, the external lock that allows its mastership. During the master reign, the LSN epoch and the LSN lock may remain fixed.

LSN Epoch: In some embodiments, this term may refer to the dense, strictly increasing integer sequence of master reigns (where a reign is the time during which a replica serves as the master replica). In some embodiments, when a replica becomes master, the epoch is increased by one, and the first LSN produced by the new master replica may be marked as an epoch change LSN. In the LSN sequence, the epoch may be monotonically increasing.

LSN Lock: In some embodiments, a master replica must have a single valid lock while serving a reign as master (including while performing the failover steps to become master). The LSN lock may be a unique integer associated with a single lock acquisition. In some embodiments, only one reign as master (i.e. one epoch) may be associated with a single lock generation. Lock generation identifiers for a single lock may in some embodiments comprise a sparsely increasing sequence. In some embodiments, an external lock manager or lock service may generate the locks, and the value of lock(LSN) may represent the time of the lock acquisition transaction.

Epoch Change LSN: In some embodiments, the first LSN of a brand new master epoch may be marked as an "epoch change LSN". This convention may be utilized during log conflict detection to distinguish seemingly valid epoch changes from invalid branches.

Valid LSN: As used herein, this term may refer to an LSN that is not superseded by another LSN in a different branch.

Committed LSN: As used herein, this term may refer to an LSN that is guaranteed to survive. Note that in some embodiments, a committed LSN may never become invalid. In the replication protocol described herein, an LSN may be committed when it (or an LSN that follows it on the same branch) becomes durable while no other LSN in existence has higher credentials (e.g., a greater LSN lock value).

Invalid LSN: As used herein, this term may refer to an LSN that is superseded by another LSN in a different branch. In some embodiments, an LSN may become invalid at precisely the moment that another LSN with the same sequence but a different lock value becomes committed. Note that, in some embodiments, an Invalid LSN will never become committed, and may be doomed to eventually be snipped. In some embodiments, during log conflict detection, if two LSNs have the same sequence, the LSN with the higher lock value may be taken as the valid LSN, and the LSN with the lower lock value may be considered invalid. Note that in some embodiments, LSNs may only be invalidated by the current master committing another LSN with the same sequence. In some embodiments, a master can only commit LSNs that it produced. Therefore, in some edge case scenarios an LSN may become invalid by virtue of a later LSN (in sequence) being committed when the LSN sequence leading up to the newly committed LSN is on a different stream branch. In these cases, an invalid LSN may have a higher lock value than the valid LSN of the same sequence.

Invalid Branch: As used herein, this term may refer to an LSN stream that follows the fork of a Stream Branch that contains only invalid LSNs.

Log Snip: In some embodiments, Invalid Branches may always (eventually) be snipped, leaving only the valid log stream.

Figure 12:
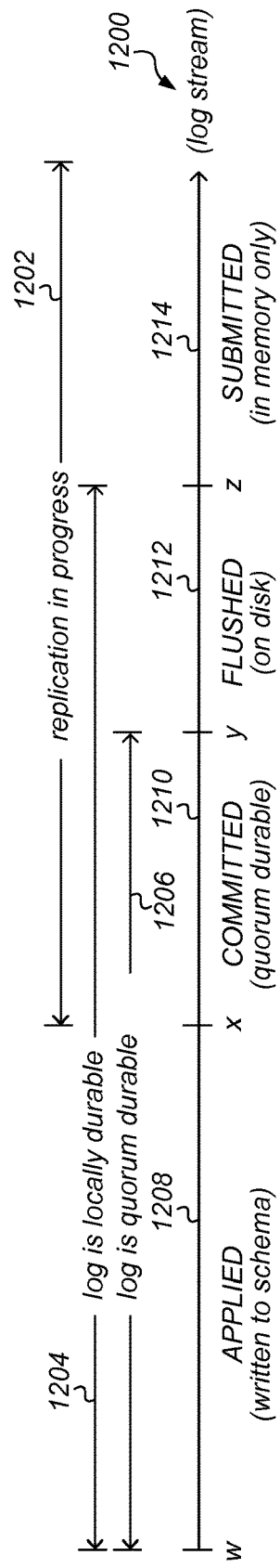
FIG. 12 illustrates various states in a log sequence while undergoing a replication process, according to one embodiment.

As noted above, log records may advance through a series of replication phases. For example, log records may be submitted, may become flushed, may be committed, and may then be applied (e.g., to the schema). FIG. 12 illustrates various states in a log sequence (e.g., on a master or slave replica in a replica group) while undergoing a replication process, according to one embodiment. In this example, log records are added to the log stream 1200 on the right and advance through the various states moving from right to left. For example, when a log record is first submitted (shown as 1214), it resides only in local memory (e.g., RAM). While replication is in progress (during the period labeled 1202), the log record moves (at point z) to the flushed state (shown as 1212), after it is flushed to disk. Once the log record has been flushed to disk, it is considered to be locally durable (during the period labeled 1204). Subsequently (at point y), the log record is committed. Once in the committed state (during the period labeled 1210), the log record is considered to be quorum durable (shown as 1206). For example, being quorum durable may include being durable in a pre-determined number of data centers (e.g., in one data center or in another pre-determined number of data centers). Finally, the log record is written to the schema (at point x), and is considered to be in the applied state (shown as 1208).

In some embodiments, log records (sometimes referred to herein simply as "logs") may be committed once they provably meet the definition of a committed log. In some embodiments, the definition of "committed" may be based on survivability. In other words, a commit of a log record may intrinsically happen once the log record is ensured to survive. In fact, once a log record meets this definition, it may be effectively committed regardless of whether the software recognizes this fact yet or not. It is this point in time that matters in the failover protocol, not the actual time at which the master proclaims that the log is committed. In some embodiments, the intrinsic definition of commit may be that described below.

In some embodiments, an LSN (log record) may be committed when it or an LSN that follows it on the same branch becomes durable while no other LSN in existence has higher credentials (e.g., a greater lock value.) In such embodiments, a master may commit a log record only when it has determined that this definition has been met for the log. By meeting this definition, the replication and failover scheme described herein may ensure that the log will survive. In some embodiments, the failover scheme described herein may ensure that under any single fault scenario, any durable log that has the current highest set of credentials is guaranteed to be included in the valid log stream (i.e. in the surviving stream of log records). With this, replication may just need to follow one simple golden rule: a master should only commit log records that it produced during its current master reign. In some embodiments, any log record that the master produced during its current master reign will have the highest set of credentials (e.g., the highest lock value). In such embodiments, if the master has determined that the log has become durable, it may infer that the failover protocol will ensure its survival.

The log replication mechanism described herein may be a two-phase commit scheme (e.g., a 2PC scheme) that requires a quorum of replication group (a.k.a. replica group) members to durably persist the log and report back to the master before the commit occurs. At that point, a successful response may be returned the caller (or requestor), since the durability requirement has been fulfilled. In various embodiments (e.g., depending on the strategy for offering consistent operations that is in effect), the success response may occur as soon as durability allows, or it may be postponed until the data is applied to the schema on the master.

Figure 13:
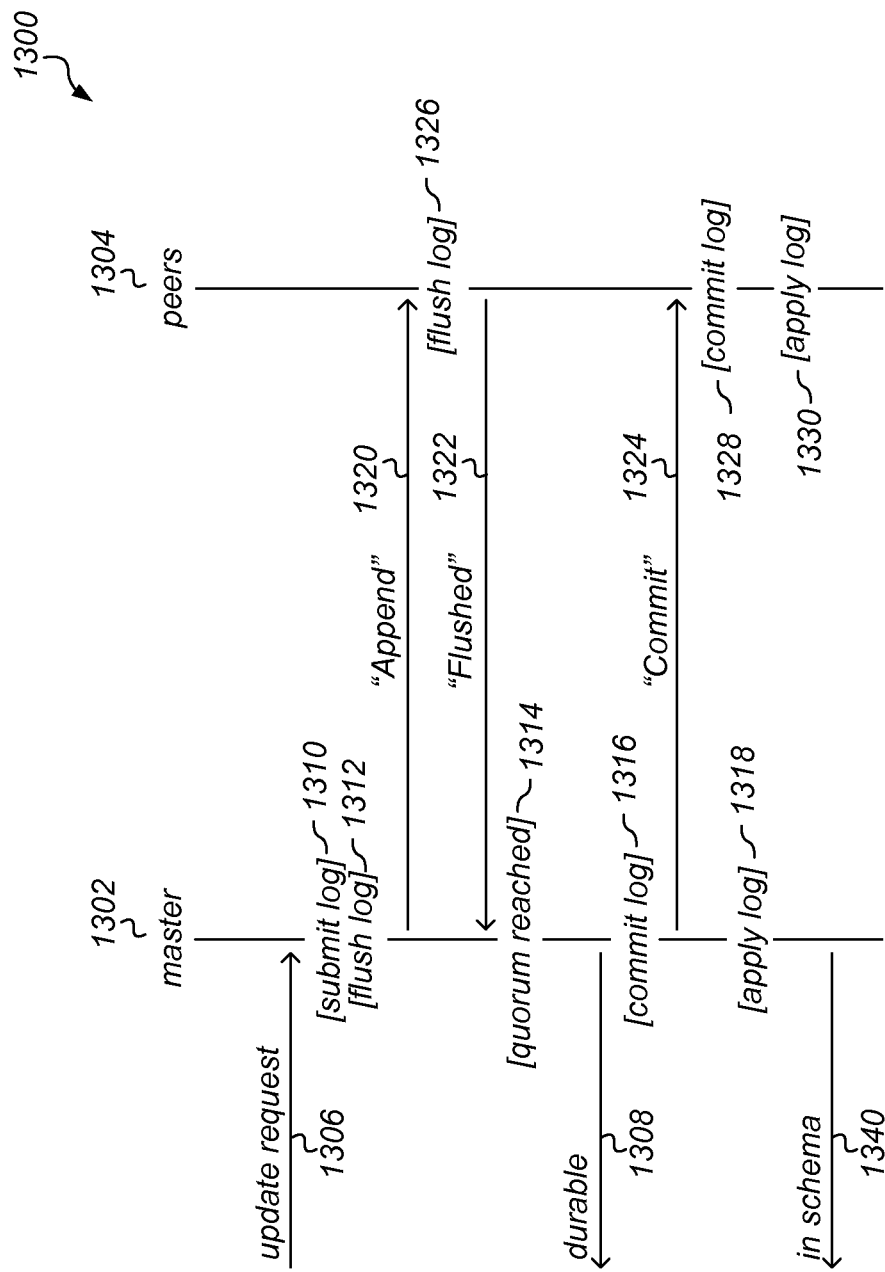
FIG. 13 illustrates a commit flow for a log replication mechanism, according to one embodiment.

One embodiment of a commit flow 1300 for a log replication mechanism is illustrated in FIG. 13. As illustrated in this example, the replica in a replica group that has assumed the role of master for the replica group (shown as master replica 1302 in FIG. 13) performs different tasks than the other replicas in the replica group (shown as peers 1304 in FIG. 13). In this example, the commit flow may begin in response to the master replica (1302) receiving an update request 1306. The master 1302 may submit a corresponding log record to local memory (as in 1310), and then flush the log record (as in 1312). In some embodiments, a log sequence number (or LSN) may be assigned to the log record during the submit phase. Note that flushing the log record (as in 1312) may include durably writing the log record to disk.

As illustrated in FIG. 13, after flushing the log record to disk, the master (1302) may then send an "Append" message (1320) to one or more of the peers (1304). Each peer 1304 may flush the log record to disk (as in 1326), and may reply to the master (1302) with a "Flushed" message (1322) indicating that the log record has been flushed by that peer (1304). If the master (1302) receives "Flushed" messages (1322) from an appropriate number of peers 1304 (e.g., from enough peers in enough data centers) to satisfy the write quorum for the system (shown as 1314), the master may return an indication to the user who requested the update that the update is considered durable (shown as 1308).

Once the log record is considered durable (e.g., when a quorum of "Flushed" responses indicating that the log has been replicated is reached), the master (1302) may commit the log record (as in 1316), and may send a "Commit" message (1324) to the peers (e.g., to all of the replicas in the replica group or to the replicas making up the quorum) to inform them that the log record is durable and can be committed and/or applied. The master (1302) may then apply the log record (as in 1318) to the schema, at which point it is reflected in (and discoverable in) the schema (as indicated at 1340). After receiving the "Commit" message (1324) from the master (1302), a peer (1304) may commit the log record (as in 1328) and apply the log(as in 1330). Note that applying the log may include applying updated data to the schema, and that this may be done as a background process, in some embodiments.

In some embodiments, a module or system component that is configured to implement the replication and failover processes described herein (e.g., module 275 shown within storage node instance 160 in FIG. 2C) may include a collection of sub-modules, each of which performs different ones of these processes. For example, a RequestManager sub-module may coordinate between a QueryUpdateManager/ChangeManager component and a LogManager component locally, and also between a master replica and remote replica nodes. In some embodiments, a ChangeManager sub-module may be responsible for all disk operations, while a QueryUpdateManager may receive the initial update request. The RequestManager may be passed the request, and may handle all replication communication. In some embodiments, a LogManager may manage the state machine for log entries as they move through the "submitted", "flushed", and "committed" states.

Figure 14:
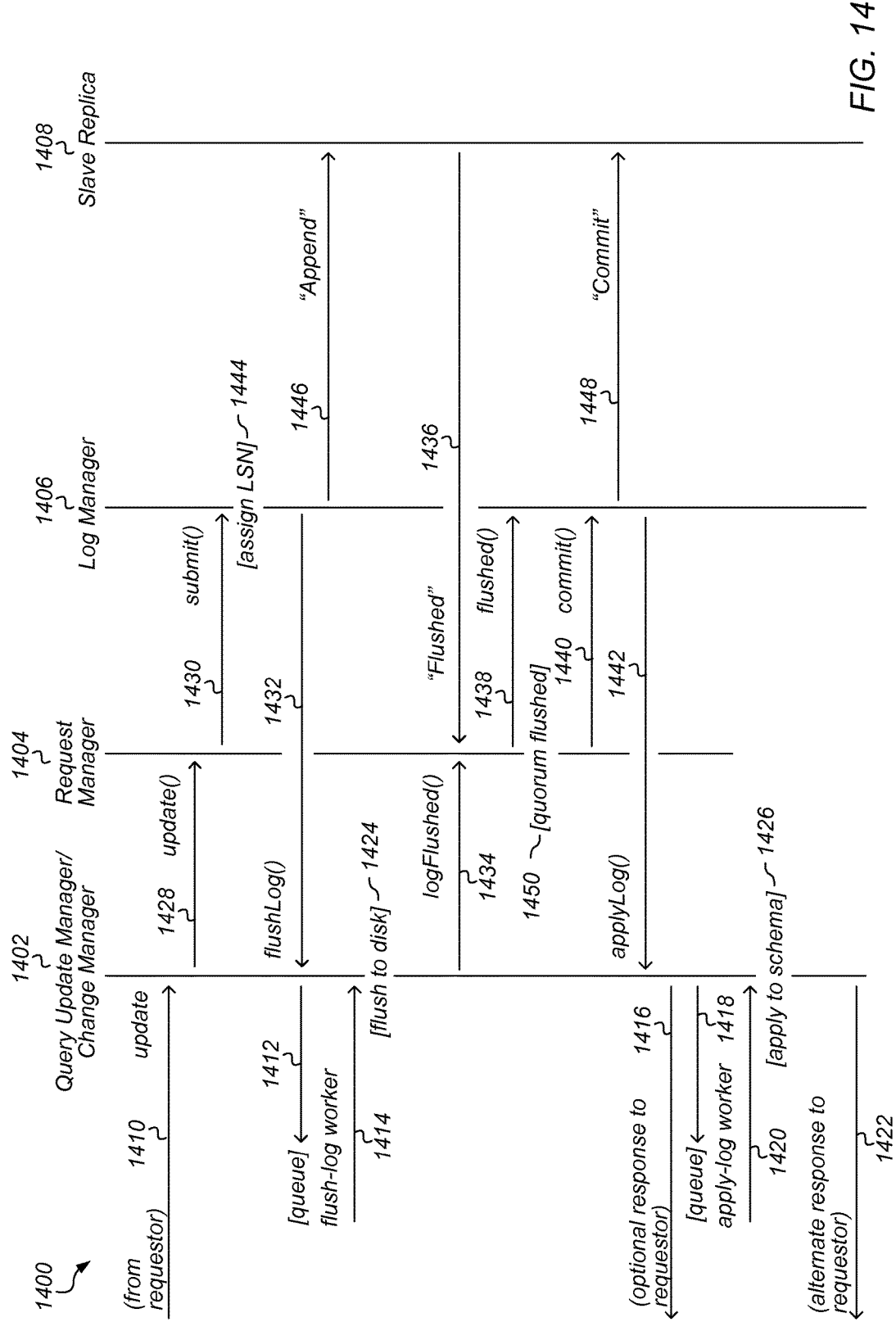
FIG. 14 illustrates a data replication flow from the perspective of a master replica for a replica group, according to one embodiment.

FIG. 14 illustrates a data replication flow from the perspective of a master replica for a replica group, according to one embodiment. In this example, a component of the master replica that implements both a Query Update Manager and Change Manager (shown as 1402) may receive an update from a requestor (shown as 1410). In various embodiments, this update may represent a data update, a membership update, or an update indicating another special state or operation to be performed. In response, the component 1402 may invoke an update method (at 1428) of a Request Manager (1404) of the master replica. The Request Manager (1404) may invoke a method of a Log Manager (1406) of the master replica (shown as 1430) to submit a corresponding log record. The Log Manager (1430) may assign an LSN to the log record (at 1444), and send an "Append" message to a Slave Replica (1408), which may be one of two or more other replicas in the replica group.

Meanwhile (in this example), at any time after the log record has been submitted and its LSN assigned, the Log Manager (1406) may invoke a method of the Query Update Manager/Change Manager (1402) to flush the log record (shown as 1432). The Query Update Manager/Change Manager (1402) may then place the log record in a queue for subsequent flushing (as in 1412). For example, a flush-log worker (e.g., a workflow that is configured to flush log records and that is executing on the master replica and/or for the benefit of the master replica) may be configured to retrieve the log record from the queue and flush the log record (as in 1414) to disk (as in 1424). Once the log record has been flushed to disk, the Query Update Manager/Change Manager (1402) may invoke a method of the Request Manager (as in 1434) that is configured to indicate that the master replica has flushed the log record to disk. The Slave Replica (1408) may also generate and send a "Flushed" message (1436) back to the Request Manager (1404) indicating that it has also flushed the log record to disk. The Request Manager (1404) may then invoke a method (at 1438) of the Log Manager (1406) to indicate that the log record has been flushed.

As illustrated in this example, once a quorum of the replicas in the replica group have indicated that they have flushed the log record (as in 1450), the Request Manager (1404) may invoke a commit method (as in 1440) of the Log Manager (1406), and the Log Manager (1406) may send a "Commit" message (1448) to the Slave Replica (1408) indicating that the log record can be committed and/or applied to the schema. The Log Manager (1406) may also invoke a method (1442) of the Query Update Manager/Change Manager (1402) that is configured to apply the log record to the schema on the master replica. In some embodiments, invoking this method may cause the Query Update Manager/Change Manager (1402) to return a response to the requestor (as in 1416) and/or to add the log record to a queue for subsequent application to the schema (shown as 1418). Thereafter, an apply-log worker (e.g., a workflow that is configured to apply log records to the schema and that is executing on the master replica and/or for the benefit of the master replica) may be employed to apply the log record to the schema (as in 1420). In some embodiments, an additional (or alternate) response may be provided to the requestor once the log record has been applied to the schema (shown as 1422), e.g., indicating that the requested update has been made.

Note that in some embodiments, the timing of the response to the request router may be based on a "data access" layer policy. Such a policy may be dependent on how the system has implemented consistent reads and/or other modes of efficiency (which may be based on user request patterns or instructions). In various embodiments, the response may happen immediately after the commit, or not until after the corresponding update is applied in the system.

Figure 15:
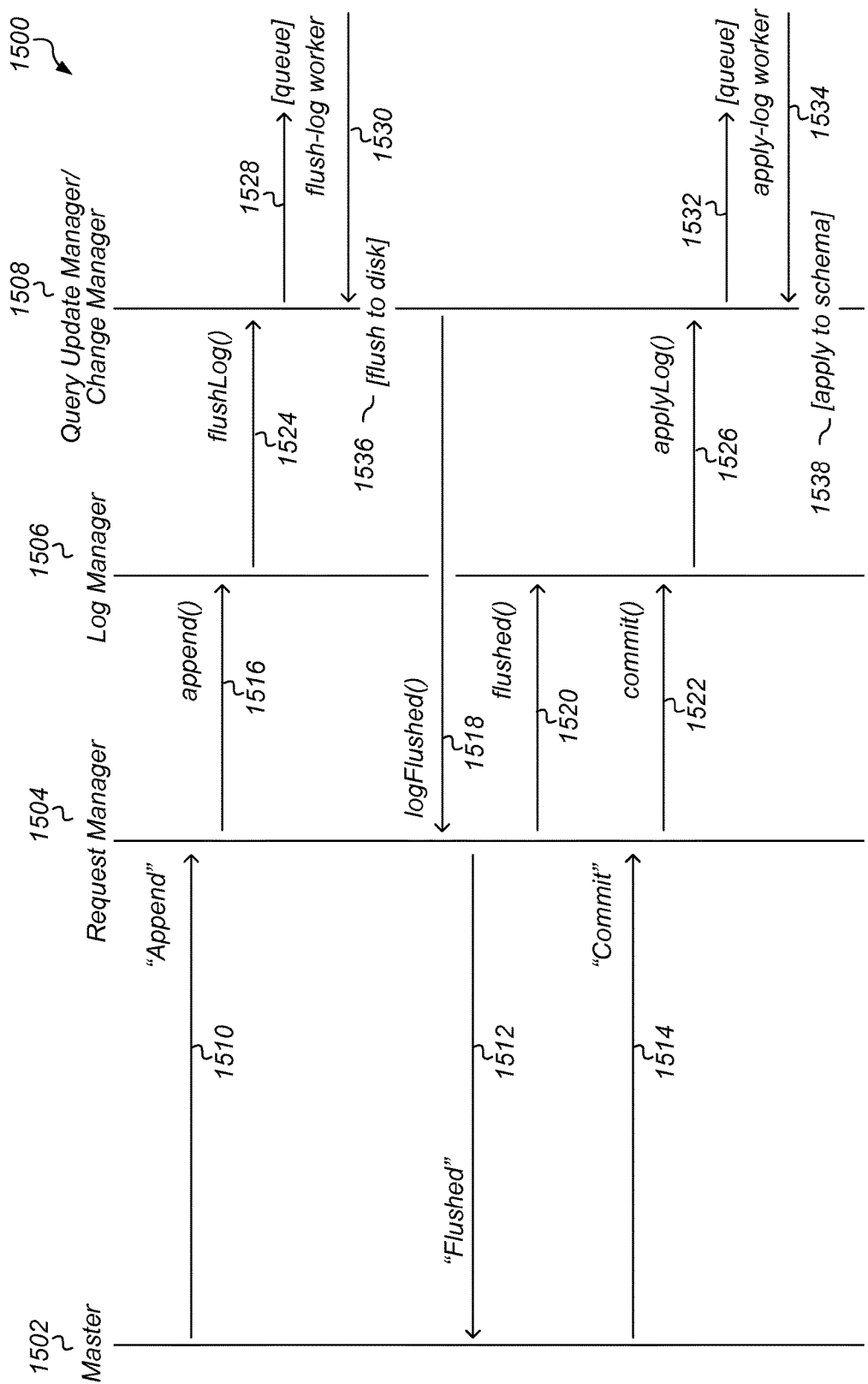
FIG. 15 illustrates a data replication flow from the perspective of a slave replica in a replica group, according to one embodiment.

FIG. 15 illustrates a data replication flow from the perspective of a slave replica in a replica group, according to one embodiment. In this example, a Request Manager (1504) of the slave replica may receive an "Append" message (1510) from the Master replica (1502) of a replica group to which it belongs. For example, the "Append" message (1510) may include a log record to be appended to the log stream on the slave replica. In various embodiments, this log record may represent a data update, a membership update, or an update indicating another special state or operation to be performed. In response, the Request Manager (1504) may invoke a method of a Log Manager (1506) of the slave replica (shown as 1516). The Log Manager (1506) may then invoke a method of a Query Update Manager/Change Manager (1508) of the slave replica (shown as 1524) and the Query Update Manager/Change Manager (1508) may place the log record in a queue (as in 1528), after which a flush-log worker (e.g., a workflow that is configured to flush log records and that is executing on the slave replica and/or for the benefit of the slave replica) may be configured to retrieve the log record from the queue and flush the log record (as in 1530) to disk (as in 1536).

Once the log record has been flushed to disk, the Query Update Manager/Change Manager (1508) may invoke a method of the Request Manager (as in 1518) that is configured to indicate that the slave replica has flushed the log record to disk. The Request Manager (1504) may generate and send a "Flushed" message (1512) back to the Master replica (1502) indicating that the slave replica has flushed the log record to disk. The Request Manager (1504) may then invoke a method (at 1520) of the Log Manager (1506) to indicate that the log record has been flushed.

At some point (assuming the log record achieves durability at the appropriate number of replicas and/or data centers), the Request manager (1504) of the slave replica may receive a "Commit" message (shown as 1514) from the Master replica (1502) indicating that the log record can be committed and/or applied to the schema (e.g., if the applicable write quorum has been reached). In response to receiving the "Commit" message, the Request manager (1504) may invoke a method of the Log Manager (1506) that is configured to commit the log record (shown as 1522). The Log Manager (1506) may then invoke a method of the Query Update Manager/Change Manager (1508) to apply the log record to the schema (shown as 1526). The Query Update Manager/Change Manager (1508) may then place the log record in a queue for subsequent application (as in 1532). As illustrated in this example, an apply-log worker (e.g., a workflow that is configured to apply log records to the schema and that is executing on the master replica and/or for the benefit of the master replica) may be employed (as in 1534) to apply the log record to the schema (as in 1538).

In some embodiments, the replication failover protocol may be designed to be fault-tolerant with a geographically aware durability requirement, and may support online membership changes, replication group splitting, and/or geographic replica migration. As previously noted, the system may utilize a single-master log shipping replication scheme that uses a data-center-centric quorum scheme. The quorum scheme described herein may ensure that all updates that could possibly have been reported back to the user as being successful will be found during a failover. The write quorum logic may be implemented in a WriteQuorum class, while another class may implement the read quorum (which may also be referred to as the 'failover' quorum).

In some embodiments, the quorum logic may be implemented according to the following criteria:
- A replication group may be defined to exist in N data centers.
- A write may be considered durable if it has been persisted in K data centers, where K<=N.
- A failover may be guaranteed to find all durable writes if and only if the new master syncs with all members in each of N−K+1 data centers.
- In some embodiments, the system may be configured with N=3 and K=2.

According to these assumptions, all writes can be found, and failover can succeed following any single replica failure provided that replicas exist in all N data centers prior to the failure.

Figure 16:
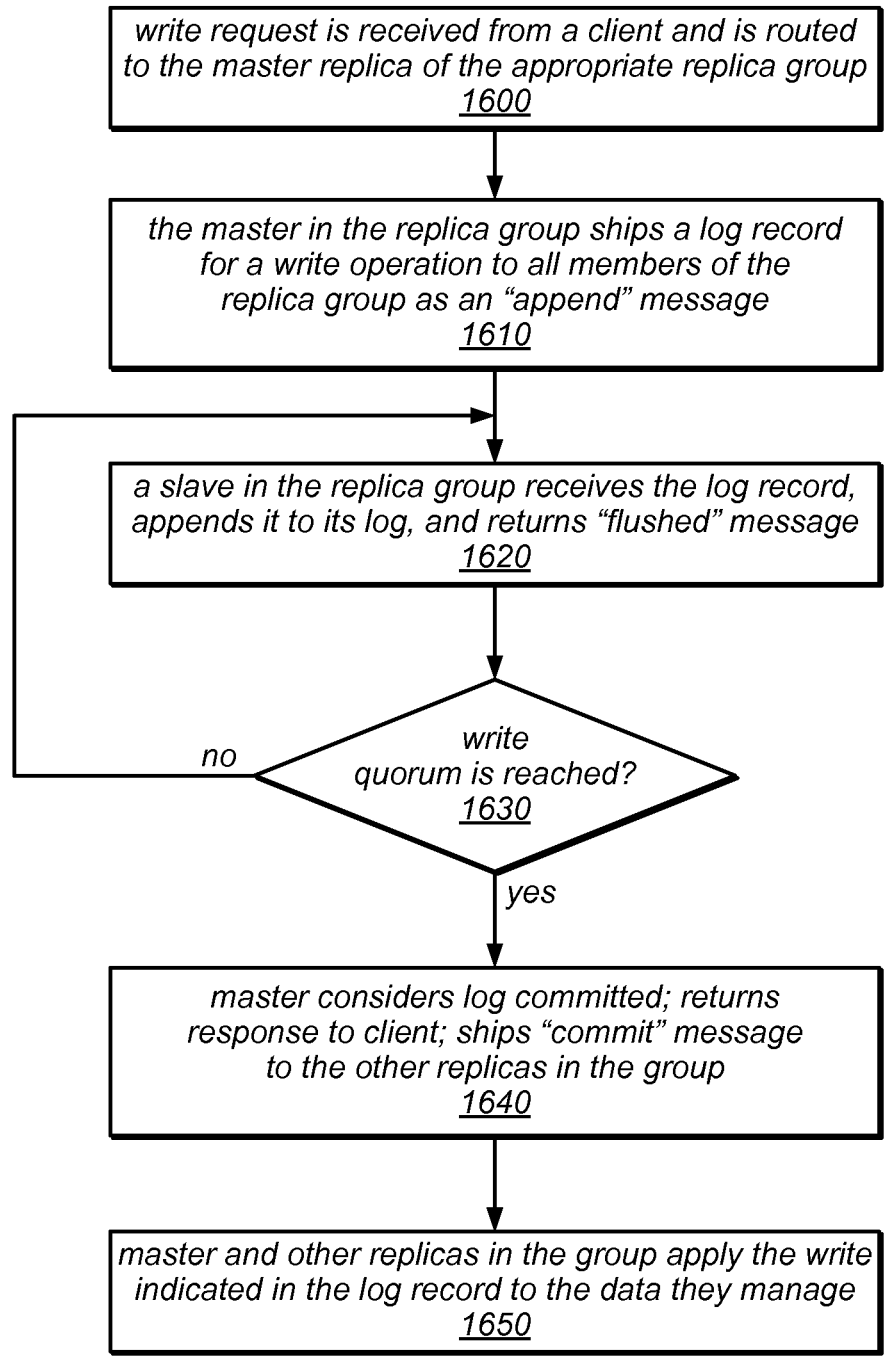
FIG. 16 is a flow diagram illustrating one embodiment of a method for replicating a write operation in a data storage system.

One embodiment of a method for replicating a write operation in a data storage system is illustrated by the flow diagram in FIG. 16. As illustrated in this example, the method may include receiving a write request from a client and routing that write request to the master replica of the appropriate replica group (as in 1600). For example, in response to a client issuing a write operation using a "PutItem" API, a "DeleteItem" API, an "UpdateItem" API, or any other mechanism for initiating a write operation (i.e. a state modifying or data modifying operation) targeting the data storage system, a write operation may be initiated by the master replica. The method may include the master replica in the replica group shipping a log record for the write operation to all members of the replica group as an "append" message, as in 1610. The method may include a slave replica in the replica group receiving the log record, appending it to its log, and returning a "flushed" message back to the master replica, as in 1620.

If the write quorum is not reached, shown as the negative exit from 1630, the operations illustrated as 1620-1630 may be repeated until a write quorum is reached, in this example. For example, other slave replicas may receive the log record, append it to their logs, and return "flushed" messages back to the master replica, and the master replica may continue to monitor those messages until a quorum is reached (e.g., until at least one replica from each of K data centers responds with a "flushed" message). Once a write quorum is achieved (shown as the positive exit from 1630), the master replica may consider the log committed, as in 1640. The master replica may then return a response to the requestor of the write operation (i.e. the client, in this example), and may ship a "commit" message to the other replicas in the group. As illustrated in this example, the master replica and the other replicas in the group may then apply the write operation indicated in the committed log record to the data they manage, as in 1650. Note that in other embodiments, the operations illustrated at 1620-1630 may not be repeated indefinitely in an attempt to meet a write quorum, but the attempt may be abandoned if a timeout expires prior to establishing a quorum or once it is clear that there are not enough replicas remaining in the replica group for a quorum to be established. In such embodiments, if the write quorum is not reached, the system may not return a response to the client, and the client may (or may not) re-issue the write operation.

Figure 17A:
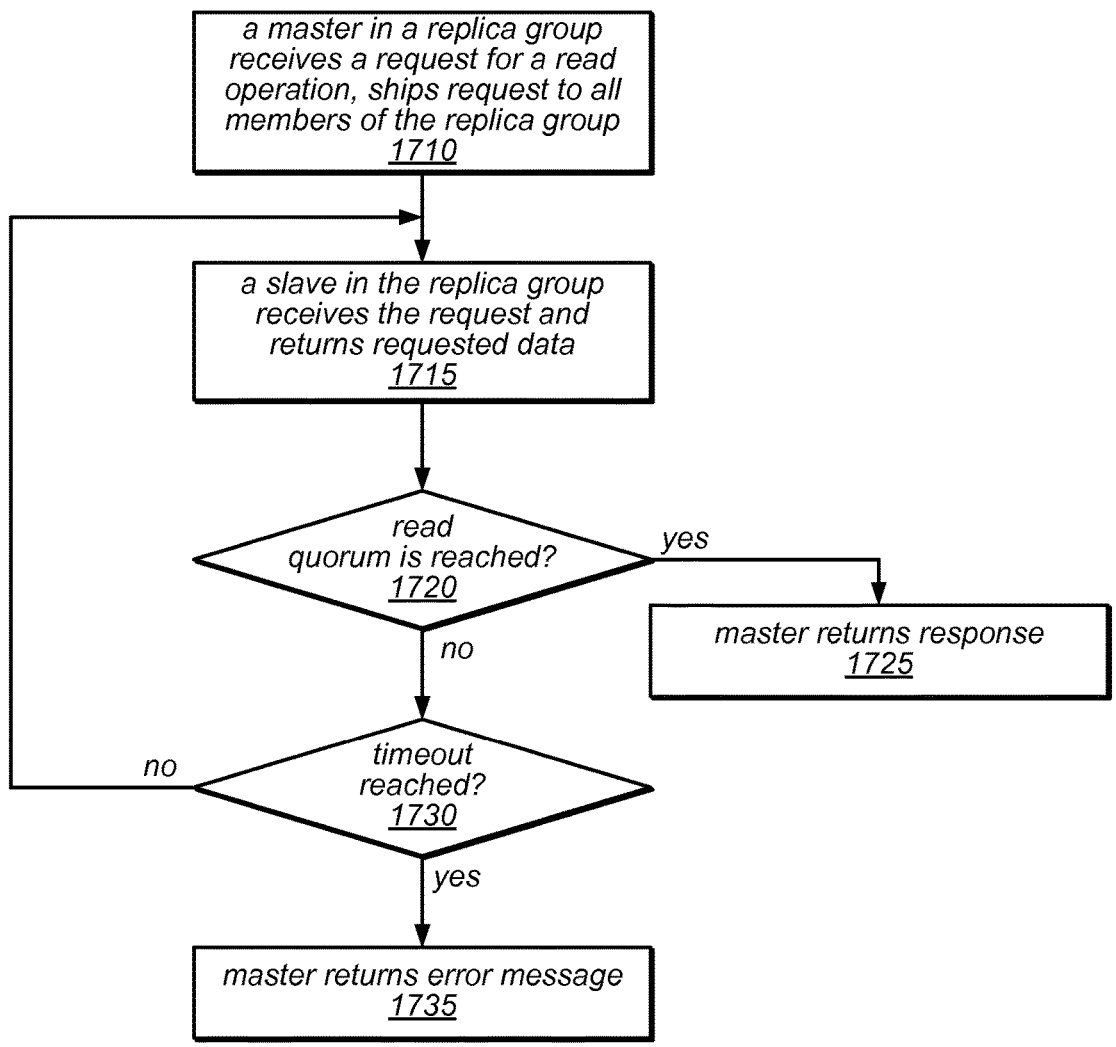
FIGS. 17A and 17B are flow diagrams illustrating different embodiments of a method for performing a read operation in a data storage system.

One embodiment of a method for performing a read operation in a data storage system is illustrated by the flow diagram in FIG. 17A. In this example, the data storage system uses a quorum mechanism for performing read operations. As illustrated at 1710, in this example, the method may include a master replica in a replica group receiving a request to perform a read operation, and (in response) shipping the request to all members of the replica group. For example, a client may initiate a read operation using a "GetItem" or "GetItems" API, or using another mechanism to initiate the retrieval of data or state stored in the data storage system. The method may include a slave replica in the replica group receiving the request and returning the requested data, as in 1715.

If the read quorum is not reached and (in this example) if a timeout period has not yet expired, shown as the negative exit from 1720 and the negative exit from 1730, the operations illustrated as 1715-1730 may be repeated until a read quorum is reached. For example, other slave replicas may receive the read request and return the requested data back to the master replica, and the master replica may continue to monitor those responses until a quorum is reached (e.g., until a result is returned by all replicas of at least N−K+1 data centers, at which point the returned result that is associated with the highest credentials may be considered the correct result), or until the timeout period expires (shown as the positive exit from 1730). When and if a read quorum is achieved (shown as the positive exit from 1720), the master replica may return a response to the requestor of the read operation, as in 1725. If a read quorum is not reached before the timeout period expires (shown as the positive exit from 1730), the method may include the master replica returning an error message to the requestor, as in 1735.

Figure 17B:
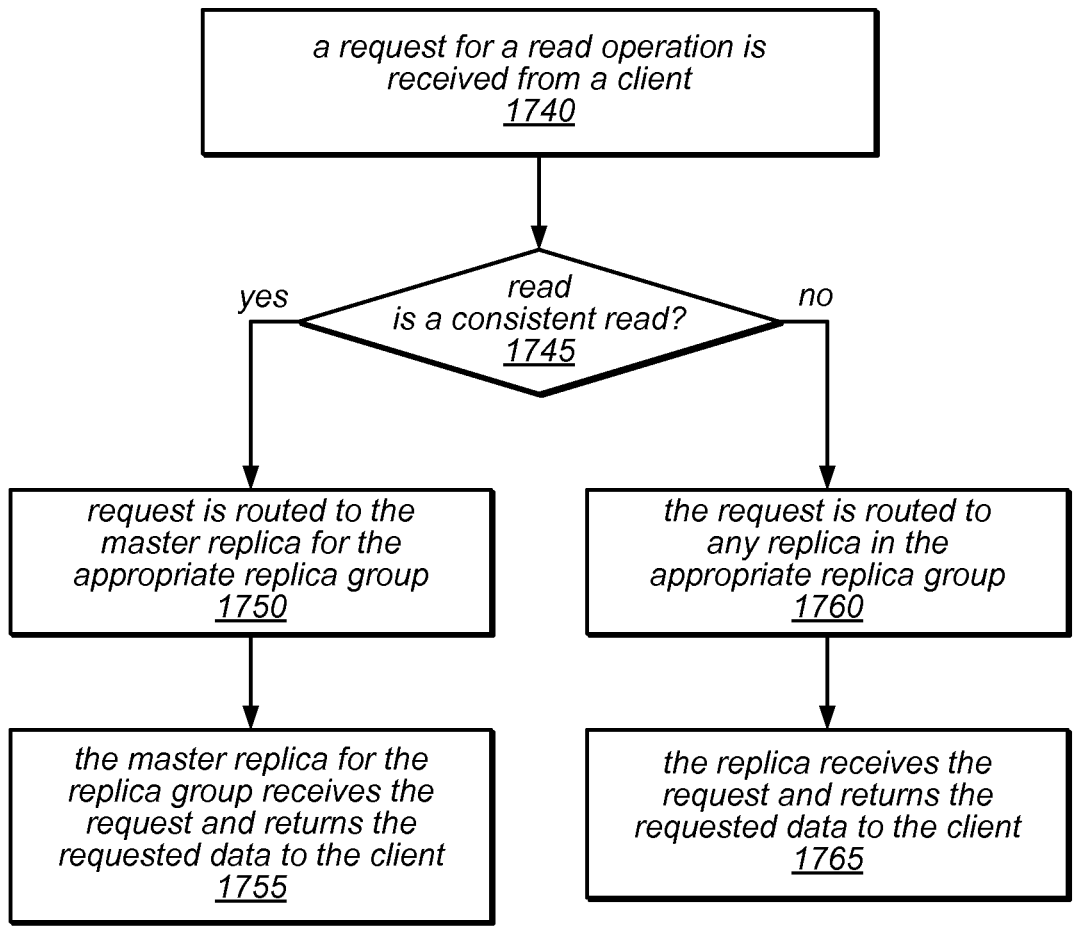

Another embodiment of a method for performing a read operation in a data storage system is illustrated by the flow diagram in FIG. 17B. In this example, the data storage system does not use a quorum mechanism for performing read operations. As illustrated in this example, the method may include receiving a request for a read operation from a client, as in 1740. For example, a client may initiate a read operation using a "GetItem" or "GetItems" API, or using another mechanism to initiate the retrieval of data or state stored in the data storage system. If the read is to be performed as a consistent read operation (shown as the positive exit from 1745), the method may include routing the request to the master replica for the appropriate replica group, as in 1750. In this case, the master replica for the replica group may receive the request and return the requested data to the client, as in 1755. For example, in some embodiments, the master replica maintains an item cache storing information about items (or logs) that have been committed up to the current point. Therefore, the most recent version of the requested data may be present in that cache and/or on disk, and master may serve it without consulting any other replicas. Note that a read operation may be performed as a consistent read operation if the underlying system implements consistent read operations for all read operations or if this option is specified for the partitions hosted on the replica or for the requested read operation itself, in different embodiments.

If the read operation is not to be performed as a consistent read operation (shown as the negative exit from 1745), it may be performed as an eventually consistent read operation. In general, an eventually consistent read may be served by any replica in the appropriate replica group. As illustrated in this example, the request may be routed to an arbitrary replica in the appropriate replica group, as in 1760, and that replica may receive the request and return the requested data to the client, as in 1765. Note that a read operation may be performed as an eventually consistent read operation if the underlying system implements eventually consistent read operations for all read operations or if this option is specified for the partitions hosted on the replica or for the requested read operation itself, in different embodiments.

In some embodiments, instances of a MasterContext class may hold and/or advance the master state machine state. In other words, these MasterContext instances may implement all failover logic that drives the state machine. The state machine may be driven by attempts to become master of a replica group once the external lock for the replica group is held. A replica acting as the master replica may transition back to slave status when the lock is lost, or if the node cannot otherwise perform its role as the master replica.

A failover process may be performed in response to various system events or conditions (e.g., in response to the failure of a storage node instance or communication link thereto, or in response to a change in partitioning or replica group membership). Failover may be driven by one of the replicas in a replica group attempting to become the master for the group. Failover may be considered complete when the replica attempting to become master assumes mastership of the replica group by successfully completing all of the steps required to become master.

In some embodiments, the failover protocol may be defined by the following series of steps, which are described in more detail below:
1. Acquire External Advisory Lock
2. Gather State
3. Fetch Tail
4. Replicate Tail
5. Write the first LSN of the new epoch
6. Wait for the epoch change LSN to become durable, then commit the tail
7. Assume master In some embodiments, in order for a replica to become the master for its replica group, it must first acquire an external advisory lock designated for the replication group. In some embodiments, this lock may be uniquely identified by the partition identifier of the data partition for which the replication group manages data. Note that in some embodiments, only one replica may be able to hold the lock at any one time (e.g., an external lock manager or service may ensure that this is the case). In some embodiments, only one master attempt may be made per lock acquisition. Each lock acquisition may include generation and/or assignment of a unique lock generation identifier, which may be guaranteed to be greater than the identifier of any previous lock acquisition (e.g., the external lock manager or service may ensure that this is the case). In some embodiments, a replica that successfully acquires the lock may drive the failover until it succeeds in becoming master, or until it fails (in which case it may release the lock so that another replica may attempt to become master for the replica group).

In some embodiments, gathering state may include querying all members of a replication group for their latest flushed and committed LSNs, and for their membership version (as described below). While gathering state, a test for a quorum may be performed upon receipt of every response to those queries. In some embodiments, peers are counted for the quorum (i.e. included in the quorum) if and only if they indicate that they support the candidate peer for master of the replication group. In some embodiments, mastership is not supported by a peer if it knows of (e.g., if it has observed) a newer membership version (which may require catch-up and re-iteration), if it does not host the replica (which may indirectly indicate that the membership version is out of date), or if it has observed a newer lock value (as a safe-guard).

In various embodiments, synchronization for changing the quorum set (i.e. the set of participants in the quorum scheme) may utilize a 'membership version' (or more generically a 'quorum version') that is updated through a replicated change, and whose current value is maintained for the replica group in a membership version indicator (e.g., in metadata maintained by the master replica). In some embodiments, each of the other replicas may maintain a membership version indicator that stores the most recent membership version of which it is aware (i.e. that is has observed). In some embodiments, a replica that is attempting to become master may iterate on filling out the failover quorum (i.e. the read quorum) itself whenever a higher quorum version is discovered. For example, on a failover, the replica attempting to become the new master may fill out the failover quorum. Upon discovering a higher quorum version, the replica attempting to become the new master may immediately synchronize the data leading up to the new version. After synchronizing, the replica may be ensured that it has found everything that used the pre-quorum change quorum for durability (in other words, it used the correct failover quorum for discovery of that data). The replica may then start gathering state again (filling out the failover quorum) using the newly defined quorum.

In some embodiments, the master hopeful must catch up its membership version during this step if any participating peer knows of (and reports) a more recent membership version. For example, the replica may be required to catch up (synchronize) its log to the more recent membership change, and then start the gathering state step over again using the new membership. Note that this may iterate more than once, in some cases.

Note that if the replica's log is snipped due to detecting a log conflict during this catch-up, it may iterate without reaching the membership change (and may be forced to catch up from farther behind). Note that if any member reports a newer membership version, and the replica that is attempting to become master is no longer part of the membership, the attempting replica may abandon the attempt, and may stop hosting the replica. Note that in some embodiments, only log records that are known to be in conflict (i.e. that have been determined to be in conflict) are snipped from the log and then further iterations of the catch-up operation may be performed in order to synchronize the log(e.g. unwinding the log stream as any additional conflicts are discovered during these additional iterations).

In some embodiments, the failover protocol described herein may enable safe membership changes (with respect to the quorum scheme), and may allow the quorum to be safely reconfigured when necessary. Since replication group splitting is also (in part) a membership change, it may be one of the primitives that enable partition splitting as well. Once mastership is supported by the failover quorum of peers, the replica may move to the next step.

In some embodiments, fetching the tail may include fetching any missing tail of the log (any log records not already appended to the replica's log) from the quorum member with the highest LSN credentials. In such embodiments, the highest LSN credentials may be the credentials that include the highest lock value, or the credentials that include the highest sequence value (e.g., if the lock values of multiple log records are the same). Again note that if the replica's log is snipped due to detection of a log conflict during a process to catch-up the log tail, the replica may iterate, starting the catch-up again from the point at which the conflicting log record was snipped.

In some embodiments, once the tail is caught up, the replica may replicate the tail such that the tail meets the durability requirement (e.g., that it is durable in at least K data centers). In some embodiments, the tail may be replicated to all nodes, but only the minimum necessary durability may be required.

Once the tail is verified replicated, the replica may write the first LSN of the new epoch. In other words, the replica may write metadata about the change in the mastership for the replica group, and the corresponding LSN may be marked as an "epoch change" (which may be useful later for log conflict detection and determining snip log cases). As mentioned above, in some embodiments, the master is not allowed to commit log records that it did not produce. In some embodiments, in order to avoid moving forward until it is certain that the log is fully resolved, after writing the first LSN of the new epoch, the replica may wait for the epoch change LSN to become durable, and then may commit the tail, and flip to being the master.

In some embodiments, the fact that the master hopeful stays in the 'assuming master' state until the epoch LSN is durable may prevent new user updates from being accepted prior to the replica committing the tail. Once the epoch LSN is durable, there can be no conflicts with the found tail in a subsequent failover. A this point, the log stream has been completely resolved up to and including the new master epoch LSN.

In some embodiments, once all of the steps described above have been completed, the replica may be cleared to become the new master. Note that in some embodiments, any or all of these failover steps may be timed. In such embodiments, each step (or iteration of a step) may be allotted a maximum time in which it may run. In some embodiments, these timeouts may be updated dynamically (e.g., they may be reset based on batched progress and iteration). In some embodiments, the system may include safeguards against data causing sudden timeout failures that would be persistent.

Figure 18:
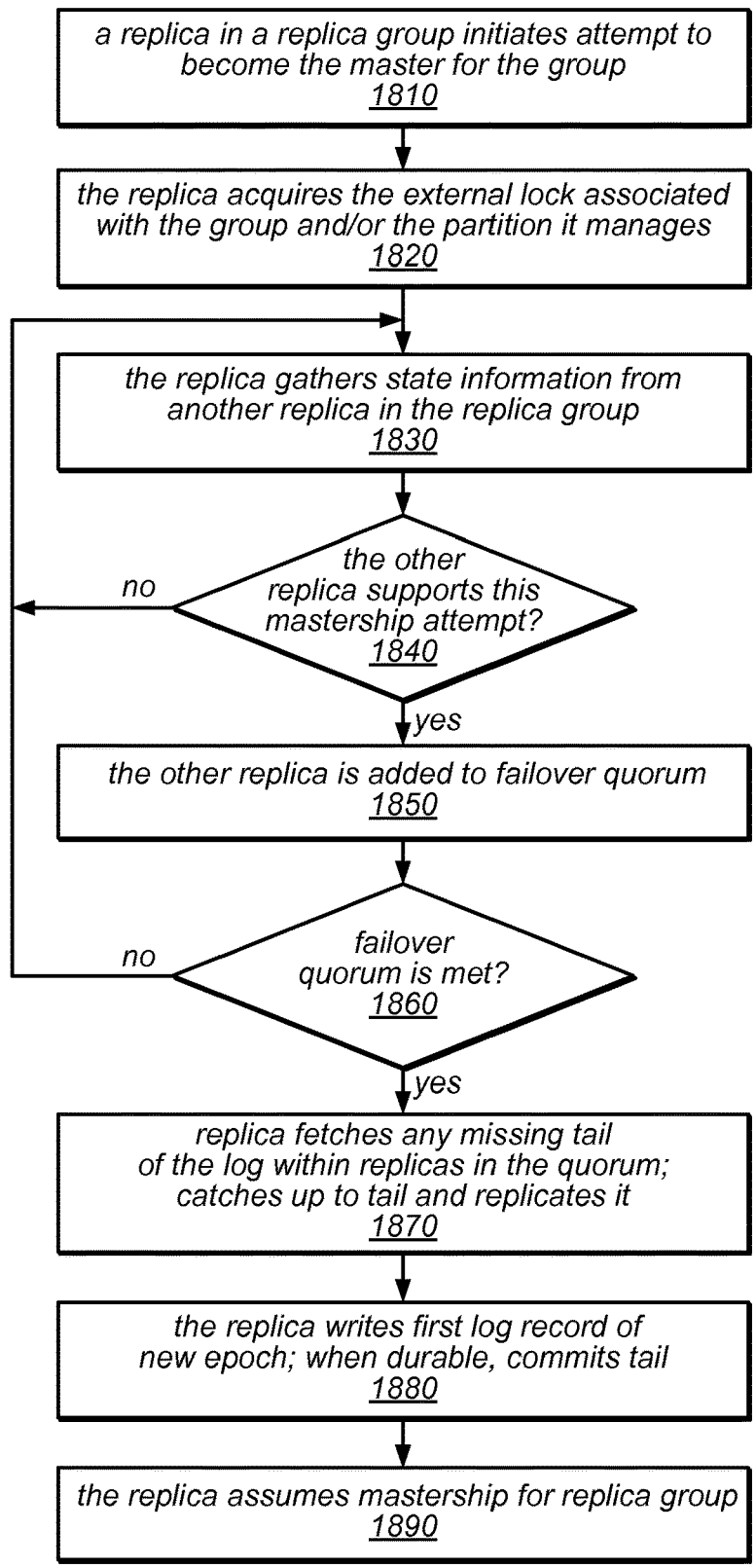
FIG. 18 is a flow diagram illustrating one embodiment of a method for performing a replication failover process in a data storage system.

One embodiment of a method for performing a replication failover process in a data storage system is illustrated by the flow diagram in FIG. 18. As illustrated in this example, the method may include a replica in a replica group initiating an attempt to become the master for the replica group, as in 1810. The method may include the replica that is attempting to become the master replica acquiring the external lock associated with the replica group and/or with the data partition it manages, as in 1820. As described above, the method may include the replica that is attempting to become the master replica gathering state information from another replica in the replica group, as in 1830.

As illustrated in this example, if the other replica supports this mastership attempt (shown as the positive exit from 1840), the method may include the adding the other replica to the failover quorum, as in 1850. On the other hand, if the other replica does not support this mastership attempt, the other replica is not added to the failover quorum. This is illustrated in FIG. 18 by the feedback from the negative exit of 1840 to 1830. As illustrated in this example, the replica attempting to become the master replica may continue gathering state information from other replicas in the replica group until the failover quorum is reached. This is illustrated in FIG. 18 by the feedback from the negative exit of 1860 to 1830. In other embodiments, rather than waiting indefinitely until the failover quorum is reached, these operations may only be repeated until a timeout period expires or until it is clear that there are not enough replicas remaining (i.e. as yet non-reporting) to reach the failover quorum. Note that replicas that are not included in the failover quorum may end up with an invalid branch of the log stream if they have flushed log records that were not found in the failover quorum and are thus superseded by log records produced by the newly elected master (assuming the replica succeeds in assuming the role of master replica).

Once the failover quorum is met, shown as the positive exit from 1860 (e.g., once the replica attempting to become the master replica for the group gathers information indicating that all replicas from N−K+1 data centers support this mastership attempt), the failover process may continue. In this example, the method may include the replica that is attempting to become the master replica for the replica group fetching any missing tail of the log stream that is found within one of the other replicas in the quorum, as in 1870. If such a tail is found, the method may include the replica that is attempting to become the master replica catching up to the tail and replicating it (e.g., sending its log records to the other replicas in the group in one or more "append" messages). The replica attempting to become the master may then write the first log record of a new epoch (an epoch in which it is the master replica), as in 1880. When this log record is durable (e.g., when this epoch change log record has been successfully replicated within the replica group and the write quorum is met with durability in at least K data centers), the replica attempting to become the master replica may commit the now-replicated tail. As illustrated in this example, the replica that is attempting to become the master may at that point assume mastership for replica group, as in 1890.

Figure 19:
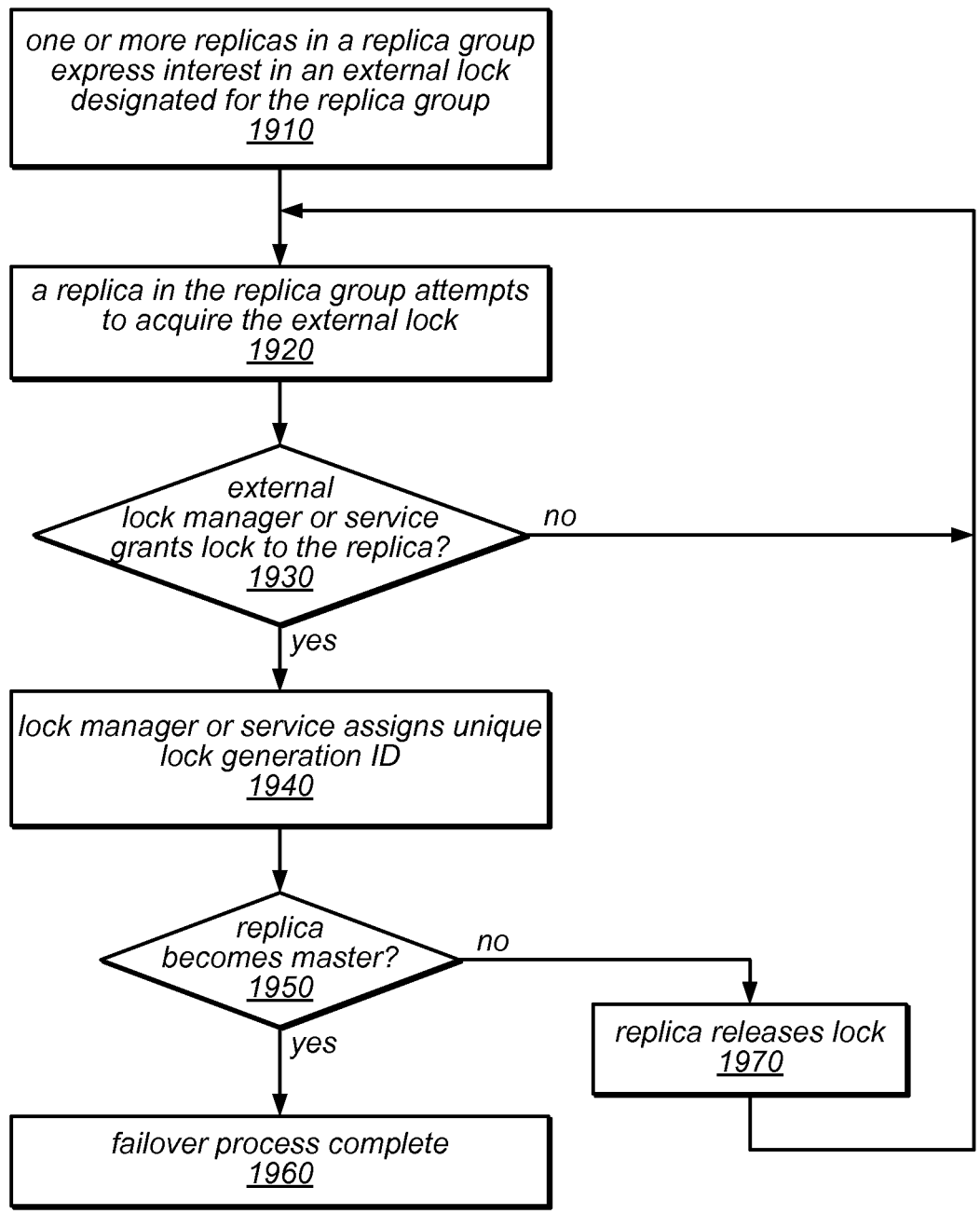
FIG. 19 is a flow diagram illustrating one embodiment of a method for acquiring an external lock for a replica group.

One embodiment of a method for acquiring an external lock for a replica group (as in 1820 of FIG. 18) is illustrated by the flow diagram in FIG. 19. As illustrated in this example, the method may include one or more replicas in a replica group expressing interest in an external lock designated for the replica group (which may indicate their intention to attempt to assume the role of master replica for the replica group), as in 1910. The method may include one of the replicas in the replica group attempting to acquire the external lock that is designated for the replica group and/or for a data partition it hosts (e.g., during a failover process), as in 1920. In various embodiments, such a lock may be maintained and/or managed on behalf of the replica or partition by an external lock manager or an external lock service. If the external lock manager or service does not grant the lock to the replica that is attempting to become the lock manager (shown as the negative exit from 1930), the method may include the same replica or another replica in the replica group attempting to acquire the external lock designated for the replica group, shown as the feedback from 1930 to 1920.

If the external lock manager or service does grant the lock to the replica that is attempting to become the lock holder or owner (shown as the positive exit from 1930), the method may include the lock manager or service assigning a unique lock generation identifier for the lock, as in 1940. In some embodiments, other credentials may also be assigned by the lock manager or service (as described herein). The failover process may then continue. If the replica that acquires the external lock succeeds in becoming the master replica for the replica group, shown as the positive exit from 1950, the failover process may be complete, as in 1960. For example, the replica that acquires the external lock may have gathered state from the other replicas in its replica group in an attempt to build a quorum to support its mastership attempt, and that attempt may have been successful. If the replica that acquires the external lock does not succeed in becoming the master replica for the replica group, shown as the negative exit from 1950, that replica may release the external lock, as in 1970. Subsequently, the replica may again attempt to acquire the external lock or another replica may attempt to acquire the external lock. This is illustrated in FIG. 19 by the feedback from 1970 to 1920.

Figure 20:
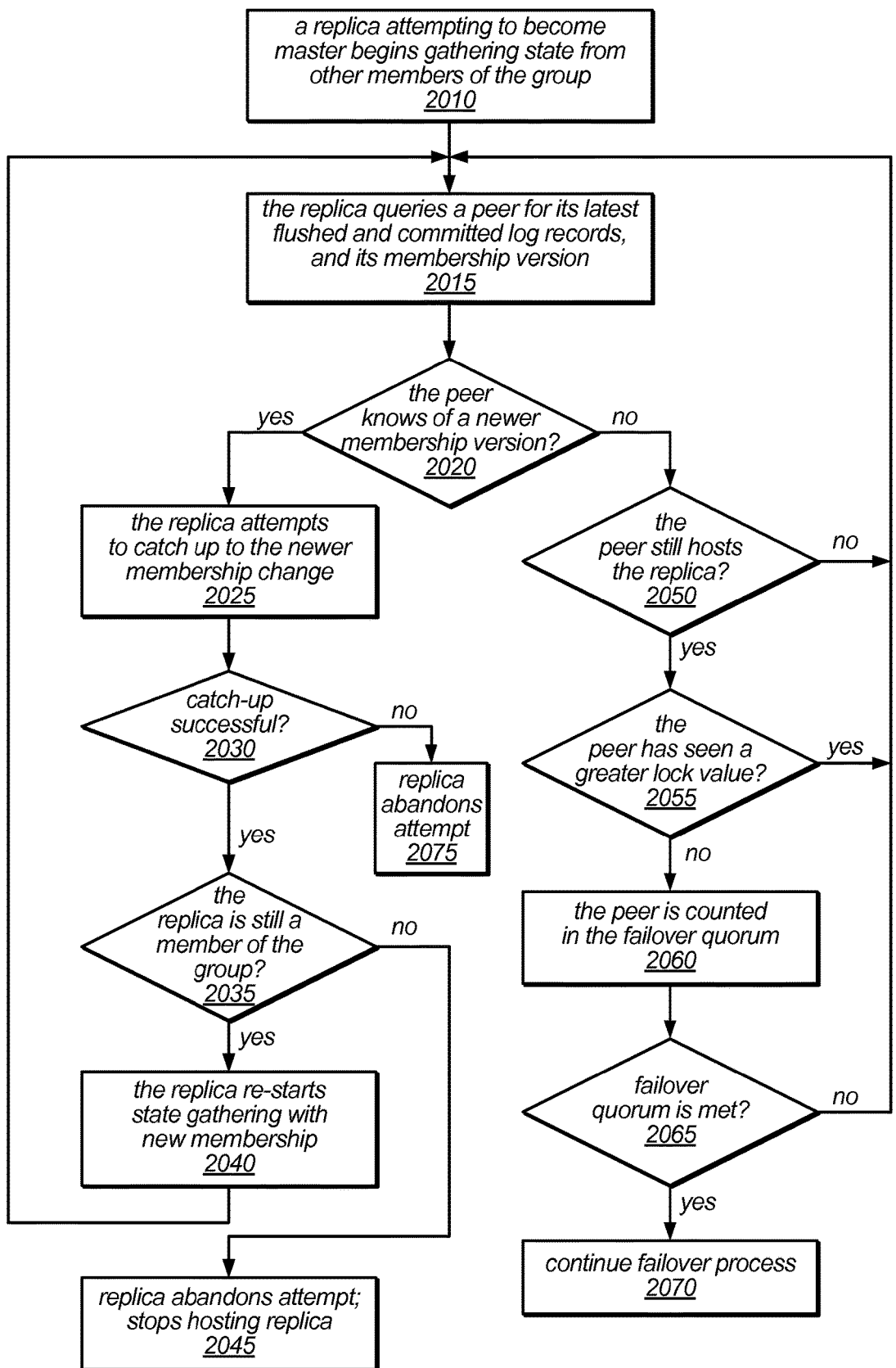
FIG. 20 is a flow diagram illustrating one embodiment of a method for filling out a failover quorum.

One embodiment of a method for filling out a failover quorum is illustrated by the flow diagram in FIG. 20. As illustrated in this example, the method may include a replica that is attempting to become the master replica for its replica group beginning to gathering state information from other members of the replica group, as in 2010. For example, the replica that is attempting to become the master replica may query a peer for its latest flushed and committed log records, and its membership version, as in 2015. The methods may include determining (based on the information gathered) whether the peer knows of (e.g., has observed) a newer membership version than the newest membership version that is known to the replica that is attempting to become the master replica, as in 2020.

If the peer knows of a membership version that is newer than the newest membership version that is known to the replica that is attempting to become the master replica, shown as the positive exit from 2020, the method may include the replica attempting to catch up to the newer membership change, as in 2025. Such a catch-up operation is described in more detail herein. If the catch-up operation is not successful, shown as the negative exit from 2030, the method may include the replica abandoning its attempt to become the master replica, as in 2075. If the catch-up operation is successful, shown as the positive exit from 2030, and if the replica is still a member of the replica group (according to the newer version of its membership), shown as the positive exit from 2035, the method may include the replica re-starting the state gathering operation with the new membership, as in 2040. If the catch-up operation is successful, shown as the positive exit from 2030, but the replica is no longer a member of the replica group (according to the newer membership version), shown as the negative exit from 2035, the method may include the replica abandoning its attempt to become the master replica, and no longer hosting the replica, as in 2045.

If the peer does not know of (e.g., has not observed) a membership version that is newer than the newest membership version that is known to the replica that is attempting to become the master replica (shown as the negative exit from 2020), if the peer hosts the replica (shown as the positive exit from 2050), and if the peer has not seen a greater lock value than the replica has seen (shown as the negative exit from 2055), the method may include the replica that is attempting to become the master for the replica group including the peer in the failover quorum, as in 2060. Otherwise (e.g., if the peer does not host the replica and/or if the peer has seen a greater lock value than the replica has seen), the method may include the replica that is attempting to become the master querying one or more other replicas in the replica group. This is illustrated in FIG. 20 by the feedback from the negative exit of 2050 or the positive exit of 2055 to 2015. If the failover quorum is not met (shown as the negative exit from 2065), the method may include repeating the state gathering operations beginning at 2015 until the quorum met or until a timeout period has expired (not shown). If the failover quorum is met (shown as the positive exit from 2065), the method may include continuing the failover process, as in 2070.

Figure 21:
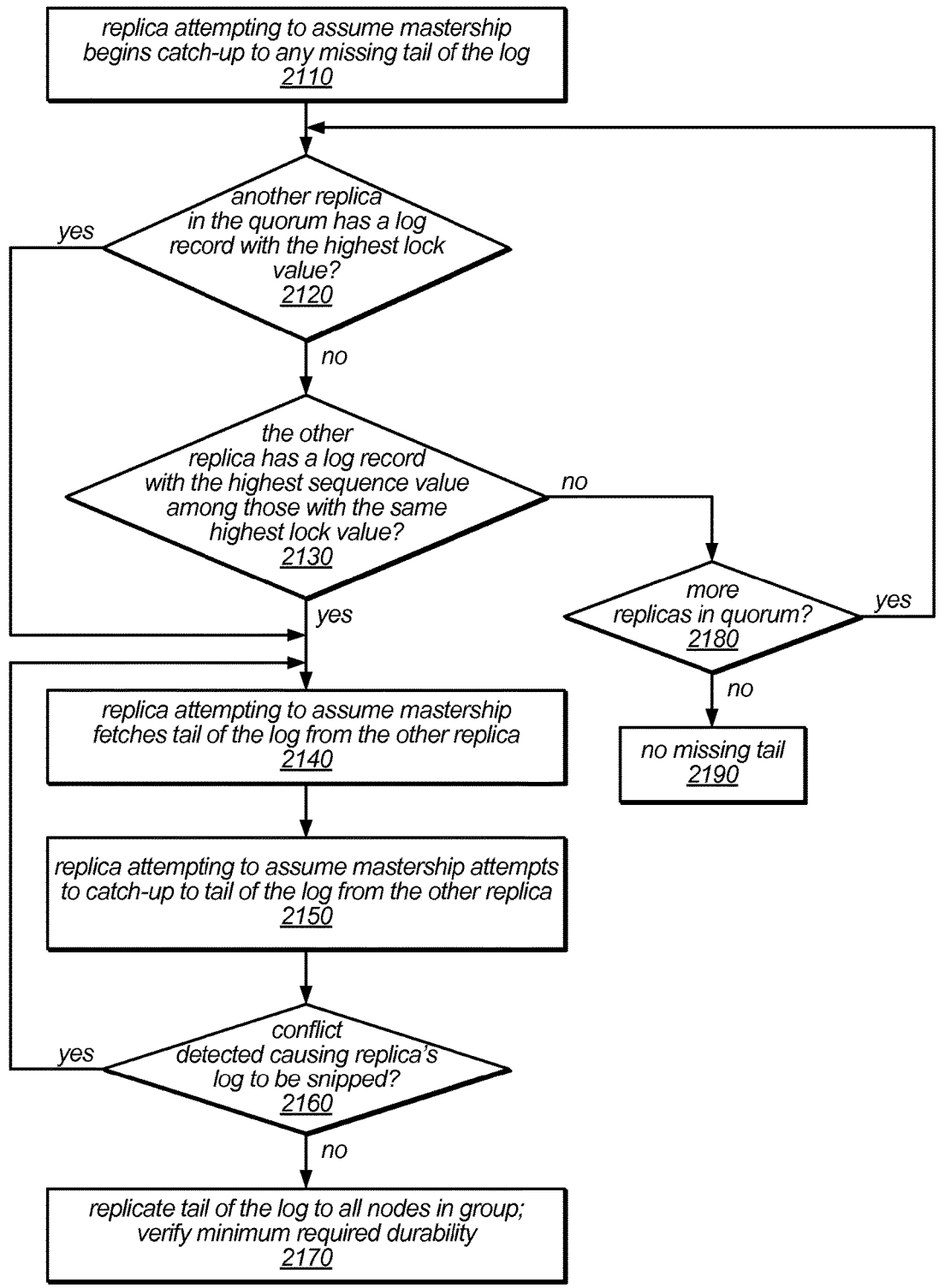
FIG. 21 is a flow diagram illustrating one embodiment of a method for performing a catch-up operation on a log stream tail.

One embodiment of a method for performing a catch-up operation on a log stream tail (e.g., as shown in element 1870 of FIG. 18) is illustrated by the flow diagram in FIG. 21. As illustrated at 2110, in this example, the method may include a replica that is attempting to assume mastership of its replica group beginning an operation to catch-up to any missing tail of the log. The method may include determining whether another replica in the failover quorum includes a log record with the highest lock value of any log records in the log stream, as in 2120, and/or determining whether the other replica includes a log record with the highest sequence value among those with the same highest lock value, as in 2130. If so (shown as the positive exit from 2120 or 2130), the method may include the replica that is attempting to assume mastership fetching the tail of the log from the other replica, as in 2140. The method may also include the replica that is attempting to assume mastership attempting to catch-up to the tail of the log from the other replica, as in 2150. For example, the replica may attempt to synchronize up to the tail by appending any missing log records (up to the log record with the highest credentials) to its log.

As illustrated in this example, the method may include determining (while attempting to synchronize up to the tail) whether there is a log conflict that causes the replica's log to be snipped, as in 2160. If so, the replica's log may be snipped (e.g., the log records that are known to be in conflict may be deleted) and the replica may iterate on the process one or more times, each time starting the catch-up operation again from the point in the log prior to the latest detected conflict. This is illustrated in FIG. 20 by the feedback from the positive exit of 2160 to 2140. If no conflict that causes the replica's log to be snipped is detected, shown as the negative exit from 2160 (e.g., if the replica has successfully caught up to the tail of the log), the method may include replicating the tail of the log to all of the other replicas in the replica group (or at least to the replicas included in the failover quorum), and verifying the minimum required durability of the log records in the tail of the log, as in 2170.

If the other replica does not include a log record with the highest lock value of any log records in the log stream or a log record with the highest sequence value among those with the same highest lock value (shown as the negative exits from 2120 and 2130), and there are no more replicas in the failover quorum (shown as the negative exit from 2180), there may be no missing tail of the log stream (e.g., no log tail having log records with higher credentials than the log records in the log stream of the replica attempting to assume mastership), as in 2190. If the other replica does not include a log record with the highest lock value of any log records in the log stream or a log record with the highest sequence value among those with the same highest lock value (shown as the negative exits from 2120 and 2130), but there are more replicas in the failover quorum (shown as the positive exit from 2180), the method may include continuing to look for a missing tail that includes log records with the highest credentials of any log records in the log stream. This is illustrated by the feedback from the positive exit of 2180 to 2120.

As previously noted, in some embodiments, replication groups (or replica groups) may be managed through replicated metadata changes. In such embodiments, when any member or members are added or removed, or when there is a change in the state of a member or members (or any combination of these operations), these membership change operations themselves may be performed as replicated changes. In general, any metadata that affects the replication group as a whole may be managed this way.

As previously noted, synchronization for changing the quorum set (i.e. the set of participants in the quorum scheme) may utilize a 'membership version' (or more generically a 'quorum version') that is updated through a replicated change. For example, in some embodiments, a metadata change may be written that increases the quorum version whenever a parameter of the quorum is altered (e.g. when a member begins participating in the quorum or is added to the set of quorum participants, when a member stops participating in the quorum, or when some fundamental property of the quorum itself is changed). In some embodiments, the systems described herein may use a locality-based quorum. In some embodiments, replicated changes may be used to change the valid data center set, and/or the minimum durability requirement for the write quorum (which in turn may redefine the read quorum).

In some embodiments, membership changes may synchronize with the quorum according to the following criteria. First, as described above, membership itself may be versioned, and all membership changes may result in an increase in the membership version. Membership changes may be implemented as metadata writes in the LSN stream. During failover, if any member reports a higher membership version during the "gather state" phase (while filling out the failover quorum), the member attempting to become master must immediately synchronize its log up to the membership change (or alternatively abandon its attempt to become master), and (if continuing) start the "gather state" phase (filling out the failover quorum) over again using the new membership. By doing this, the system may be certain that a) every LSN that became durable under the old membership has been found (because it was possible to synchronize the log all the way up to the membership change), and b) every LSN afterward used the new membership for durability assessment (up to and including the next membership change if there is one). This properly syncs membership with quorum at failover time (which is when it matters).

Note that the replica might snip the log while synchronizing to the membership change LSN, in which case one or more iterations may be performed using the old membership. If, after synchronizing, yet another membership change is discovered, additional synchronizing and iterating may be required. In general, the replica may always need to find the quorum using the correct membership, and so it may need to iterate on each membership change.

Figure 22:
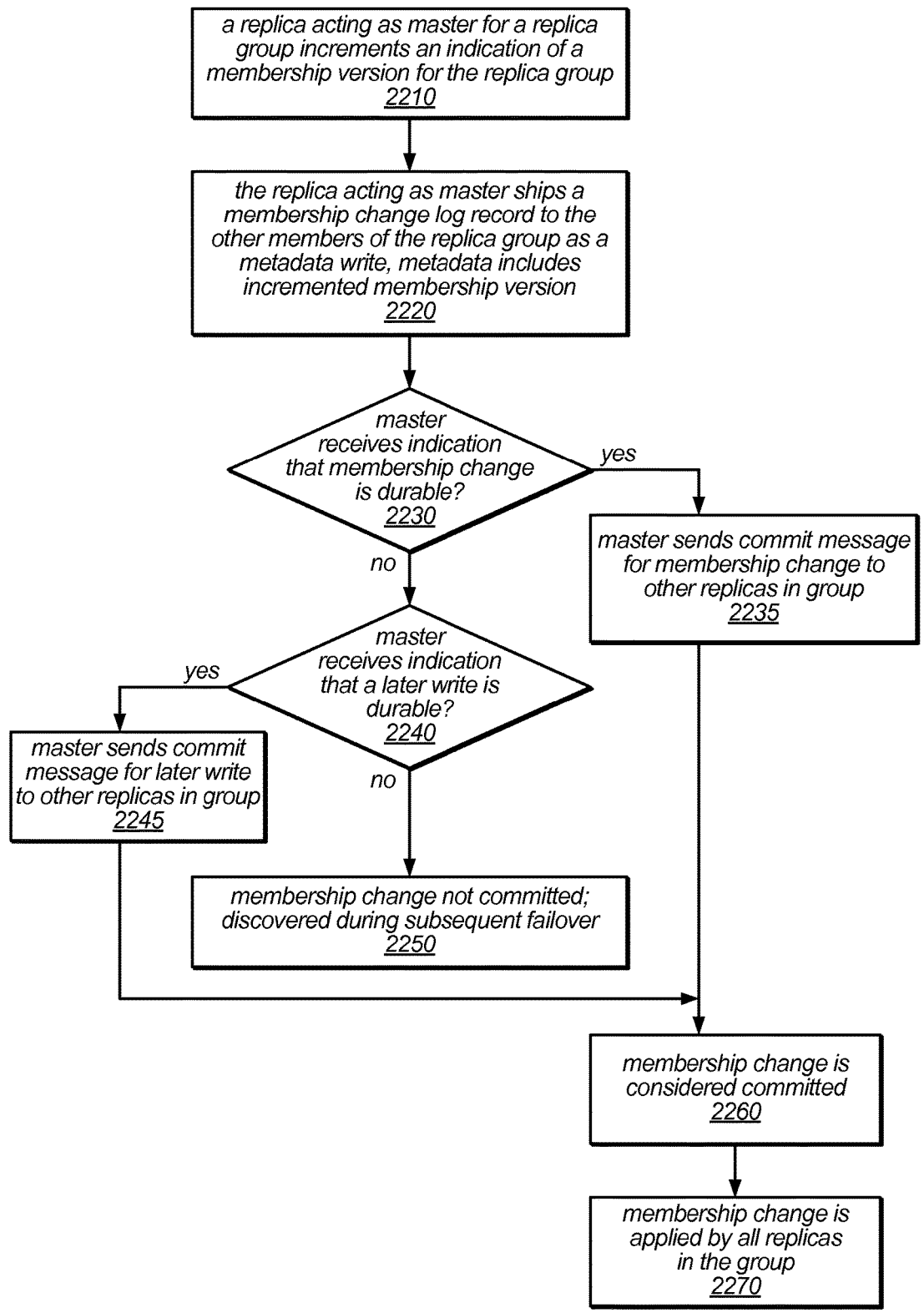
FIG. 22 is a flow diagram illustrating one embodiment of a method for performing a replica group membership change.

One embodiment of a method for performing a replica group membership change is illustrated by the flow diagram in FIG. 22. As illustrated in this example, the method may include a replica that is acting as the master replica for a replica group incrementing an indication of a membership version for the replica group, as in 2210. The method may include the replica acting as master shipping a membership change log record to the other members of the replica group as a metadata write, as in 2220. The metadata may include the incremented membership version information. Since the membership change is replicated just as any other write operation in the system, it may also be subject to durability requirements (e.g., the same durability requirements as other write operations or different durability requirements, in various embodiments).

As illustrated in this example, if the master replica receives an indication that the replicated membership change is durable (e.g., that the applicable write quorum requirements have been met), shown as the positive exit from 2230, the master replica may send a commit message for the membership change to the other replicas in the replica group, as in 2235, and the membership change may be considered committed, as in 2260. In response, the membership change may be applied by all of the replicas in the replica group, as in 2270.

As illustrated in this example, if the master replica does not receive an indication that the replicated membership change is durable (e.g., that the applicable write quorum requirements have been met for the replicated membership change), shown as the negative exit from 2230, but the master replica receives an indication that a later write operation is durable (shown as the positive exit from 2240), the master replica may send a commit message for the later write operation to the other replicas in the group (as in 2245), which may imply that the (earlier) membership change is also committed. Therefore, in response to the later write operation committing, the membership change may be considered committed (as in 2260) and the membership change may be applied by all of the replicas in the replica group (as in 2270). For example, in some embodiments, the master replica may not wait for an indication that the replicated membership change is durable, since it may not need to provide an indication of the result of the change to any external requestor, but if it is determined that a later write operation has committed, the master replica may correctly assume everything before it (include the membership change) must have committed. If the master replica does not receive an indication that the membership change is durable or that a later write is durable (shown as the negative exits from 2230 and 2240), the membership change may not be committed (as in 2250). As illustrated in this example, this may be discovered during a subsequent failover process (as a log conflict or invalid branch). Note that in other embodiments, the method may include the master replica monitoring the responses received from the other replicas in the replica group until it determines that the membership change is durable or until the timeout period expires.

Figure 23:
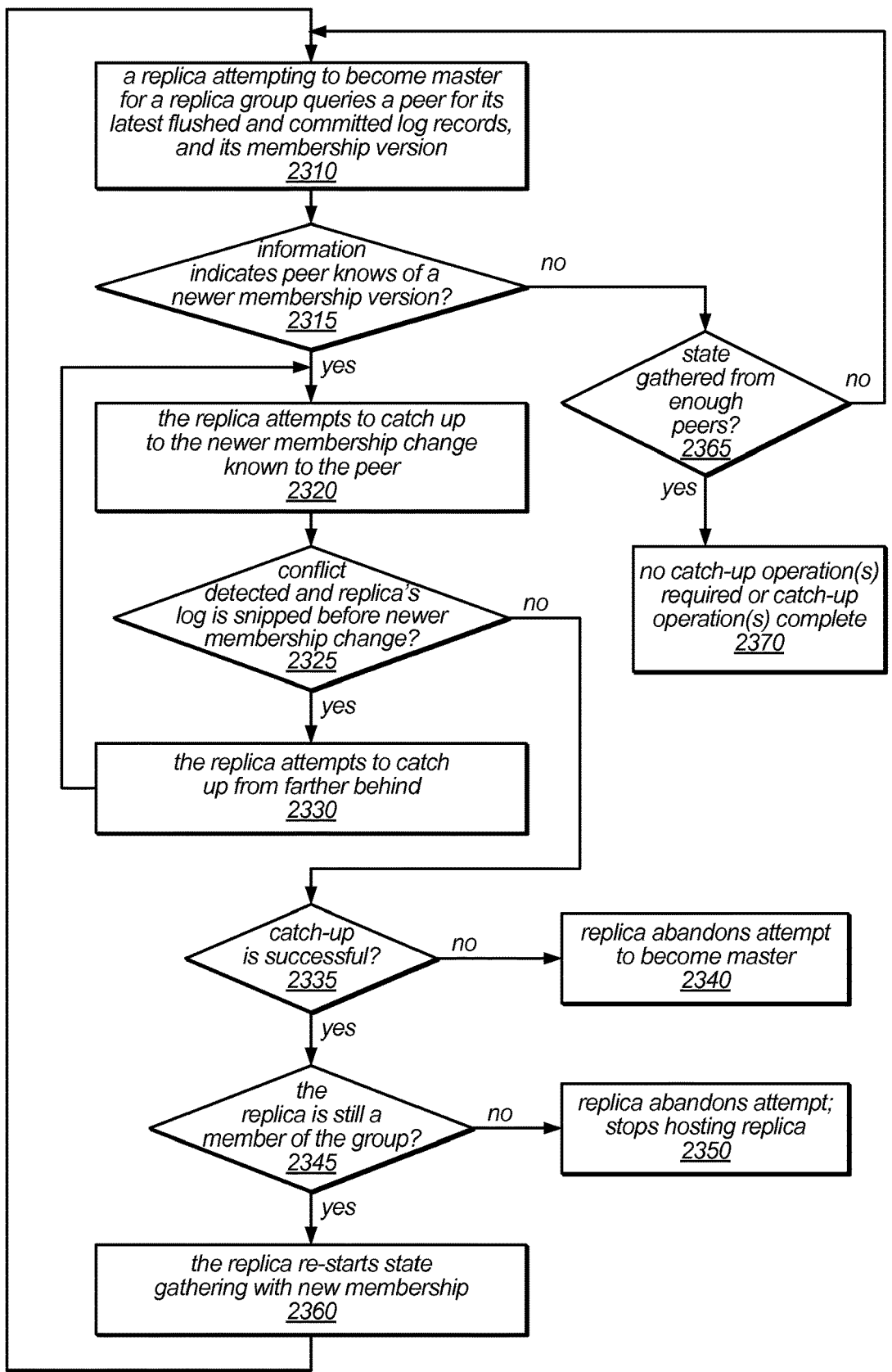
FIG. 23 is a flow diagram illustrating one embodiment of a method for synchronizing up to a replica group membership change during failover.

One embodiment of a method for synchronizing up to a replica group membership change during failover is illustrated by the flow diagram in FIG. 23. As illustrated in this example, the method may include a replica that is attempting to become master for a replica group querying a peer for its latest flushed and committed log records, and its membership version, as in 2310. For example, the replica that is attempting to become master for a replica group may query a peer in its replica group (as it is currently known to the replica that is attempting to become master). If the information received from the peer indicates that the peer knows of a newer membership version than that known by the replica that is attempting to become master (shown as the positive exit from 2315), the method may include the replica that is attempting to become master attempting to catch up to the newer membership change that is known to the peer, as in 2320. For example, the replica that is attempting to become master may attempt to synchronize up to the newer membership change by appending any missing log records (e.g., log records that are not currently found in its log stream) up to newer membership change to its log stream. If the information received from the peer does not indicate that the peer knows of a newer membership version than that known by the replica that is attempting to become master (shown as the negative exit from 2315), and if state has been gathered from enough peers to establish a quorum (shown as the positive exit from 2365), no catch-up operation(s) may be required (e.g., on the first iteration of the process), or the necessary catch-up operation(s) may be complete (e.g., on a subsequent iteration of the process), as in 2370. If the information received from the peer does not indicate that the peer knows of a newer membership version than that known by the replica that is attempting to become master (shown as the negative exit from 2315), but state has not been gathered from all of the peers or from at least enough peers to establish a quorum (shown as the negative exit from 2365), the method may include re-starting the state gathering operation illustrated in FIG. 23 beginning at 2310.

As illustrated in this example, if a log conflict is detected and the log of the replica that is attempting to become master is snipped before the newer membership change (shown as the positive exit from 2325), the method may include the replica attempting to catch up with the log of the peer from farther behind, as in 2330. For example, the method may include repeating the operations illustrated as 2320-2330 from the point in the log at which a conflicting log record was snipped away. This is illustrated in FIG. 23 as the path from 2330 to 2320. If (on the first or any other iteration of the operations illustrated at 2320-2330) no conflicts are detected and if the catch-up operation is successful (shown as the negative exit from 2325 and the positive exit from 2335), and if the replica is still a member of the replica group according to the newer membership change (shown as the positive exit from 2345), the method may include the replica re-starting the state gathering operation with the new membership, as in 2360, and the path back to 2310. On the other hand, if (on the first or any other iteration of the operations illustrated at 2320-2330) no conflicts are detected, but the catch-up operation is not successful (shown as the negative exit from 2325 and the negative exit from 2335), the method may include the replica abandoning its attempt to assume mastership of the replica group, as in 2340. However, if the catch-up operation is successful, but the replica is not still a member of the replica group according to the newer membership change (shown as the negative exit from 2345), the method may include the replica abandoning its attempt to assume mastership of the replica group, and discontinuing hosting the replica, as in 2350.

Figure 11:
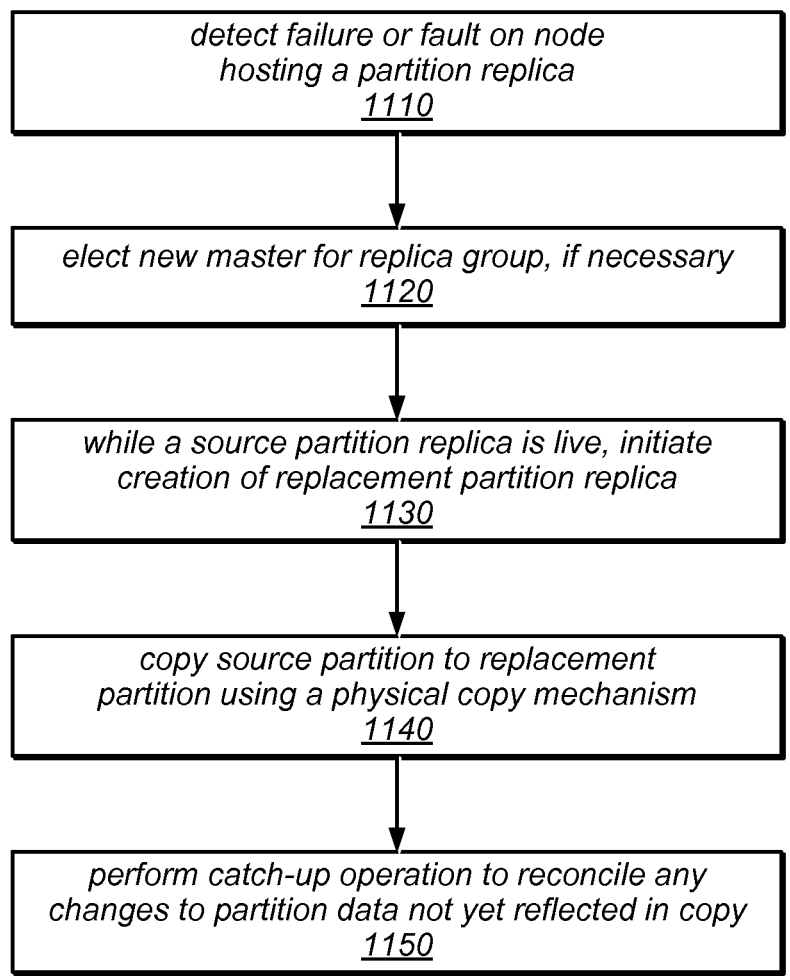
FIG. 11 is a flow diagram illustrating one embodiment of a method for moving a partition of a table being maintained by a data storage service in response to detecting an anomaly.

As illustrated in FIG. 11 and described above, in some embodiments, a storage system may support an operation to split a partition into two new partitions. Splitting a partition may in some embodiments be a failover-time operation that involves replication group splitting (also known as live-repartitioning or "sharding"). Splitting a partition may be thought of as a combination of a membership change and an identity change for the replication group in a single operation. Note that the master locks (the external locks that identify the replicas that are eligible to be the master for each replica group) are identified by partition identifiers (which will change due to the split). Therefore, all replica group members that append a split log record may release their interest in the old master lock (the lock for the pre-split replica group), and may register an interest in the new lock (i.e. the lock associated with an identifier of the partition to which they switch as a result of the split).

While appending the split operation results in two new replication groups, from the perspective of any one replica, the replica undergoes a membership change (as its replica group is reduced in size), and an identity change (as its partition id and data range change). Since the new metadata record (which may be referred to as the split partition record, or simply the "split record") for the new membership change contains the membership information of both new groups, each new group is aware of the other's existence. In addition, since the new metadata record (the split record) also contains the partition ID of the previous replica group, each new replica group remembers where it came from (which may be useful in various catch-up scenarios). Since the split partition record indicates a membership change, it may synchronize with the quorum in exactly (or substantially) the same fashion as any other membership change (as described above).

The replication primitive for splitting the group may utilize the quorum synchronization mechanism, in some embodiments. As previously noted, this system may use an external advisory lock manager or lock service to determine which replica has the right to become master, and the lock may be identified by the partition identifier. Note that the approach described herein may work for all configurations of the locality based quorum scheme described above when the failover quorums for the pre-split and post-split replica groups overlap each other's write quorums. For example, if a replica group is to be split into two new replica groups, this approach may be applied when N−K+1>N/2, and the two replica groups are spread identically across the same data centers. In some embodiments, the standard configuration may include values of N=3, K=2, which meet this constraint. Note that (in this example) if the configuration is altered yielding N−K+1<=N/2, splits should not be performed without reconfiguring the quorum. In other words, for a split to be safe (i.e. guaranteed not to accidentally yield a "split brain" scenario, in which different replicas assume mastership of the pre-split replica group and one or more post-split replica groups following the attempted split), the failover quorum must work out to be a simple majority of the configured data centers. In other words, the failover quorum must be a set of replicas that satisfies both the failover quorum (i.e. the number of replicas required) and the requirement that the pre-split and post-split replica groups overlap each other's write quorums (i.e. that the pre-split group's failover quorum must overlap the write quorum of each of the post-split groups, and vice versa).

In one example, it may be assumed that the replication group is grown to N*2 members, including two nodes in each of the N data centers. In this example, the split may be performed as follows. First, the master replica may be instructed to split the group into two groups, each containing N nodes, including one in each of the N data centers. Next, the master replica may lock the replica exclusively, and may write a split membership record to the log stream expressed as a quorum change (increasing the quorum version). The split membership record may define any or all of: the two group memberships, the two groups' post-split partition identifiers, the two groups' post-split data ranges, and/or the original partition identifier. The master may then ship the new log record to all members of the pre-split group (e.g., asynchronously, not waiting for any acknowledgements), after which it may append the log record to its log and execute the split operation that is indicated in the split membership log record. Appending the split membership log record may cause the master to: change its partition identifier to the identifier of the post-split group of which it is a member, change its data range to match that of the post-split group of which it is a member, release its master lock (thus demoting it from master status of the pre-split partition group to slave status), and express interest in the external lock associated with its new partition identifier. As previously noted, this mechanism for splitting a partition may be extended to allow splits into more than two new partitions (and corresponding replica groups), in some embodiments. In such embodiments, in order for the split to succeed, overlapping failover quorum and write quorum requirements described above may need to be met.

Since the split partition record changes the partition identifier for both new replica groups, it requires each group to failover. Note that the slave replicas of the original replica group may or may not receive the new split record right away. Therefore, at this point, there are potentially three master elections that may begin, and that may all be attempted at the same time. First, since the master of the original partition identifier has given up the external advisory lock for the original replica group, any slave replica that has not yet applied the split record may acquire the external lock for the original replica group and may attempt to become master for the original partition. In addition, any slave replica that has applied the split record and is included in the membership for the first new replica group may acquire the external lock for the first new replica group (and the corresponding first new partition identifier) and attempt to become the master for the first new replica group. Finally, any slave replica that has applied the split record and is included in the membership for the second new replica group may acquire the external lock for the second new replica group (and the corresponding second new partition identifier) and attempt to become master for the second new replica group.

In some embodiments, a slave replica that is attempting to become master for the original replica group will meet one of two fates: it will achieve the failover quorum (and become master for the original partition), or it will discover (while attempting to fill out the failover quorum) that the split record exists and be required to synchronize up to it. Discovering the existence of the split record may cause the replica to abandon its attempt to become master, since it must now release the external lock for the original replica group. The replica may now recognize the new post-split replica group of which it is a member, and may attempt to acquire the external lock for the new post-split replica group. If the slave replica succeeds in becoming master for the old partition identifier, this means that the split record failed to become durable within the original replica group, and is now destined to be snipped away on any replica that did manage to append it.

In some embodiments, if the split record achieves minimum durability, any slave replica that acquires the external lock for the original group will be guaranteed to find the split record when filling out the failover quorum (within the configured fault tolerance). In this case, the split may be guaranteed to succeed. However, if the split record does not achieve durability, and a slave replica fills out the failover quorum without discovering the split record, the slave replica may become master for the original replica group, and the slave replica may redefine the log sequence number that was the split record with its own epoch change record, or with a subsequent log sequence number that follows the log sequence number of the epoch change. In this case, neither post-split replica group will be able to elect a master because each of their failover quorums will overlap the quorum used in electing the master for the original group. This is because the post-split replica groups are guaranteed not to be able to elect a master so long as the quorum configuration satisfies the overlapping quorum requirements described above. Furthermore, during any attempts of the post-split replica group members to become master for a post-split replica group, the log conflict will be detected, causing the master hopeful to snip their log(thus snipping away the split record). This may result in the replica reverting back to its old state, including its interest in the master lock for the original replica group. In other words, detecting the log conflict may cause the replica to abandon its attempt to become master, and register its interest in the original replica group's master lock again.

As noted above, if either of the post-split groups succeeds in electing a master, the split may be guaranteed to succeed. This is because the minimum durability requirement for the post-split groups is the same as the minimum durability requirement for the pre-split group, electing a master requires at least the minimum durability requirement of replicas to be caught up to (e.g., to have flushed) the epoch change record, and the epoch change record occurs after the split record in the log sequence. In other words, if either post-split group succeeds in electing a master, it is guaranteed that the split record was durable in the pre-split replica group. Therefore, the split itself is guaranteed to succeed. Stated another way, once master election succeeds for either of the new replica groups, the split is guaranteed to succeed, since successfully achieving the failover quorum for either new group satisfies the durability requirement for the original replica group. In some embodiments, this process for splitting a partition works in conjunction with the failover protocol such that either the split does not become durable (and is snipped away fairly quickly), or the failover attempts push the split to completion fairly quickly. In general, the whole failover process following a split may be performed roughly as quickly as a single failover. Note that in some embodiments, this approach may require that the pre-split and post-split replica groups meet the quorum overlap requirements described herein in the same data centers.

Note that catch-up (e.g., hole filling) requests from pre-split nodes to post-split nodes may in various embodiment allow a pre-split node to catch up in one of two ways. For example, if the split is complete, the pre-split node may need to specify its new partition identifier (which it may obtain from a heartbeat issued by the new replica group) in its request, and only members of the correct post-split group can fulfill this request. On the other hand, if the split is not yet considered complete, the post-split nodes may recognize that the request is coming from a pre-split node, and may offer up log records up to and including the split record. The pre-split node may then (following the appending of the split record) be required to make further requests for missing log records to nodes in its post-split group membership using the new partition identifier for its post-split group.

In some embodiments, heartbeats may carry the partition identifier(s) of pre-split partitions until the split record becomes flush stable (at which point it is certain that there are not any members of the pre-split replica group that are still behind the split). Any pre-split nodes may note this (e.g., this may be how they recognize that the heartbeat is meant for them), and may use the pre-split partition identifiers in subsequent catch-up requests. In some embodiments, a split may be considered "complete" when both new replica groups have committed the split record. Each of the new replica groups may monitor this independently, and may declare the split complete when it receives confirmation that the split record has been committed. At that point, a new membership change record may be propagated to clear the split record, and to write the new membership record that contains only the post-split group information, in some embodiments. It may not be until this point that one of the new groups is allowed to perform another split.

Figure 24:
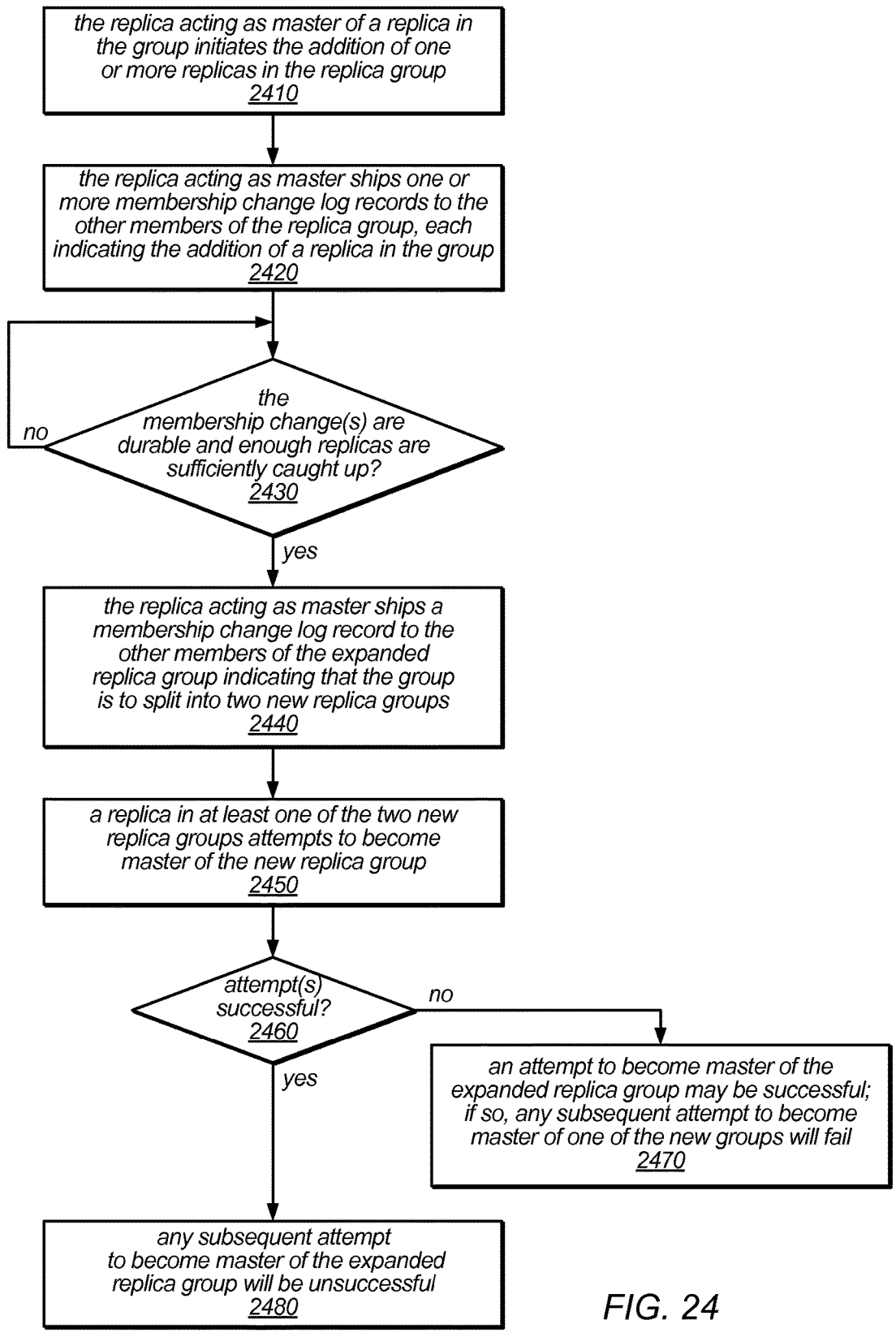
FIG. 24 is a flow diagram illustrating one embodiment of a method for splitting a replicated partition.

One embodiment of a method for splitting a replicated partition is illustrated by the flow diagram in FIG. 24. As illustrated in this example, the method may include (e.g., in response to a request to split a partition) the replica acting as master of a replica in the group initiating the addition of one or more replicas in the replica group, as in 2410. The method may include the replica acting as master shipping one or more membership change log records to the other members of the replica group, each indicating the addition of a replica in the group, as in 2420. In some embodiments, each membership change log record may include an incremented membership version, as described above.

As illustrated in this example, the method may include determining whether the membership change(s) are durable and whether the replicas in the expanded replica group are sufficiently caught up to the most recent log records (as in 2430). If not, e.g., if the membership change log record replication does not meet the applicable write quorum requirements, the method may include the master replica monitoring responses from the other replicas in the replica group until it receives sufficient indications that the membership change is durable. In another example, if there are not at least enough replicas in the write quorum that are caught up to allow master elections to be held, the method may include the master replica monitoring the state of the other replicas (and/or refusing to accept a request to split the replica group) until at least the minimum number of replicas are caught up. If the master replica does receive sufficient indication(s) that the membership change(s) are durable and that enough replicas are sufficiently caught up (shown as the positive exit from 2430), e.g., if the membership change log record replication meets the applicable write quorum requirements, the method may include the replica acting as master shipping a membership change log record to the other members of the newly expanded replica group indicating that the expanded replica group is to split into two new replica groups, as in 2440. In some embodiments, this membership change log record may include information indicating which replicas are to be included in each of the new replica groups, a new partition identifier for each of the new replica groups, and a new data range for each of the new replica groups. As previously noted, the techniques described herein for splitting a replica group may depend on the overlapping quorum requirements described above.

In some embodiments, subsequent to a membership change to split a replica group into two new replica groups, a replica in at least one of the two new replica groups may attempt to become master of its new replica group, as in 2450. For example, attempting to become master of the new replica group may include gathering state information about other replicas in the new group and determining whether they support the mastership attempt, as with any other failover operation. In the example illustrated in FIG. 24, if no attempt to become master of a new replica group is successful (shown as the negative exit from 2460), an attempt by one of the replicas of the expanded replica group to become master of the expanded replica group may be successful, as in 2470. If it is, any subsequent attempt by one of the replicas to become master of one of the new groups will fail. If at least one attempt to become master of a new replica group is successful (shown as the positive exit from 2460), any subsequent attempt by one of the replicas to become master of the expanded replica group will be unsuccessful, as in 2480. As previously noted, in some embodiments, a replica group may be split into more than two new replica groups by a split membership change. In such embodiments, the techniques described herein may be applied to expand the original replica group to a sufficient number of replicas to populate the new replica groups, and then to split the original replica group into more than two new replica groups, each of which may then attempt to elect its own master replica. In such embodiments, the overlapping quorum requirements described herein may be applicable to all of the post-split replica groups.

Figure 25:
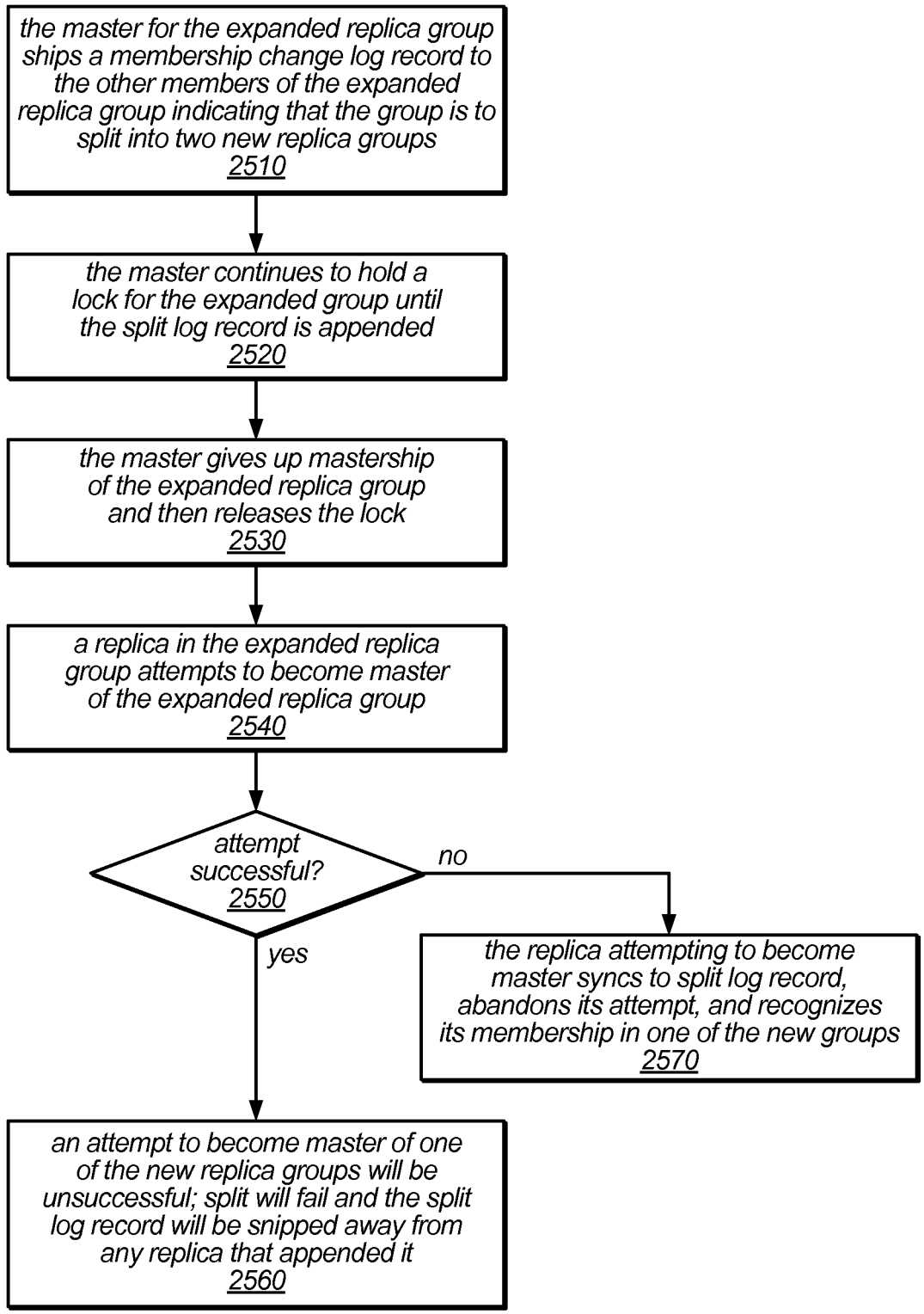
FIG. 25 is a flow diagram illustrating one embodiment of a method for releasing mastership of a partition when it is split.

One embodiment of a method for releasing mastership of a partition when it is split is illustrated by the flow diagram in FIG. 25. As illustrated at 2510, in this example, the method may include the master for the expanded replica group shipping a membership change log record to the other members of the expanded replica group indicating that the group is to split into two new replica groups. As in the previous example, the membership change log record may include information indicating which replicas are to be included in each of the new replica groups, a new partition identifier for each of the new replica groups, and a new data range for each of the new replica groups. As illustrated at 2520, the master may continue to hold the lock for the expanded group until it has appended the split log record to its log. After appending the split log record, the master replica may give up the mastership of the expanded replica group, and then release the external lock for the replica group (or the partition that it manages), as in 2530.

As illustrated in this example, a replica in the expanded replica group may attempt to become master of the expanded replica group, as in 2540 (e.g., if it has not received, applied, or committed the split log record). Attempting to become master of the expanded replica group may include gathering state information about other replicas in the expanded replica group and determining whether they support the mastership attempt, as with any other failover operation. If this attempt to assume mastership is not successful (shown as the negative exit from 2550), the method may include the replica attempting to become master synchronizing to the split log record, abandoning its attempt to assume membership of the expanded replica group, and recognizing its membership in one of the new replica groups, as in 2570. For example, the attempt to assume mastership of the expanded replica group may fail if the split log record is discovered while attempting to fill the failover quorum. If the attempt to assume mastership of the expanded replica group is successful (shown as the positive exit from 2550), an attempt by one of the replicas to become master of one of the new replica groups will be unsuccessful, as in 2560. In this case, the split operation will fail and the split log record will be snipped away from any replica that appended it to its log stream. As previously noted, the techniques described herein for splitting a replica group may depend on the overlapping quorum requirements described above.

In some embodiments, the storage systems described herein may implement fault-tolerant log-handling mechanisms by which log conflicts (e.g., log conflicts caused when logs diverge due to failovers) are detected and resolved. These mechanisms may rely on the safe replication commit strategy described herein, i.e. that a master may only commit log records that it produced during its current master reign. A commit of a replication log record (using the replication mechanisms described herein) may be defined by the log record achieving minimum durability when no other log record exists that has the same epoch and sequence, but higher credentials (since the lock generation value indicates the total ordering of external lock acquisitions through time, with a higher value indicating a later lock generation). In other words, this may be the point at which the log record is intrinsically committed in the system (i.e. it is guaranteed to survive), and the only way that a master can be absolutely sure that a log record is intrinsically committed is if it produced the log record during its current master reign.

Given this understanding, log conflict detection and resolution may in some embodiments be achieved based on the performance of a comparison operation that maps up to four characteristics of log records at the time that a log record is received (to be appended to the log) to the actions to be taken in response to receiving the log record. For example, the comparison operation may examine one or more of:

- the relative difference between log sequence number of the received log record and the most recently appended log record, i.e. whether the log sequence number of the received log record is less than the log sequence number of the most recently appended log record, equal to the log sequence number of the most recently appended log record, greater than the log sequence number of the most recently appended log record by one, or greater than the log sequence number of the most recently appended log record by more than one
- the relative difference between the master epoch of the received log record and the master epoch of the most recently appended log record, i.e. whether the master epoch of the received log record is less than the master epoch of the most recently appended log record, equal to the master epoch of the most recently appended log record, greater than the master epoch of the most recently appended log record by one, or greater than the master epoch of the most recently appended log record by more than one
- the relative difference between the lock generation value of the received log record and the lock generation value of the most recently appended log record, i.e. whether the lock generation value of the received log record is less than the lock generation value of the most recently appended log record, equal to the lock generation value of the most recently appended log record, or greater than the lock generation value of the most recently appended log record
- whether or not the incoming log is an "epoch change" log or not, and if so, whether the previous lock generation value matches the previous sequence log In some embodiments, this comparison operation may be expressed as a function of four parameters with an input domain of all permutations of the relative values, and a result range of five directives (or actions that may be taken in response). In this example, the possible actions may include accepting the log record for appending to the log, dropping the log record as moot (e.g., if it is already past the log record in sequence), caching the log record for the future (e.g., saving it so that it may be evaluated when the log sequence catches up to it), snipping the log (if a log conflict is detected), or returning an error indication (if an invalid combination of the input parameter values is detected). For this example, a matrix of all 96 combinations of these input parameters has mapped to the appropriate directives (as shown below).

Note that in some embodiments, log conflicts (due to invalid log branches, etc.) may be detected and resolved during failover. For example, a new master hopeful, upon fetching the log tail, may catch up through the normal append path, which may result in a log snip. In this case, the new master hopeful may break out of the catch-up loop, and may iterate to fetch the log tail again (e.g., in order to retrieve an earlier log record than it thought it needed prior to the snip). The quorum peers, upon accepting a log tail (e.g., as part of the replicate tail step) may similarly catch up to the tail, and may snip the log as necessary. They may then report their most recently flushed log record, which may result in iterating the replicate tail operation from the master beginning at an earlier point in the log stream. Note that in some embodiments, conflicts may be detected and resolved outside of the failover process. For example, the data storage system may check for and resolve any detected log conflicts as part of processing every append message, whether or not the append message is received and/or processed during a failover.

As previously noted, in some embodiments, only a current and active master may commit log records (LSNs), and in order to commit a log record, it must be guaranteed that the log record will always survive. This means that the log record must meet the durability requirement, and must also have greater precedence (i.e. higher credentials) than any other log record that exists. As discussed above, the only way a replication group member can be sure that both of these are true is if (a) the replica produced the record and assigned the precedence (i.e. the LSN credentials) itself based on its current master authority, and (b) it recognizes that the record meets the durability requirement while still holding that authority (i.e. while it is still acting as master in the same master reign, such that the epoch and lock values of the LSN are still the latest in existence). Therefore, in some embodiments, a log record may only be committed by the same master that produced the log record (and that produced the log record within the current master reign).

In the failover protocol, this constraint means that a discovered tail may be replicated, but not committed. This may be acceptable, however, since at the point at which the new master is able to commit a new log that it produced, all log records leading up to that point will be fully resolved. The failover protocol may ensure that the log tail catch-up process correctly resolves the log based on the guarantee that it will find that committed log, and the committed log will have a higher authority than any other log in existence prior to the log being committed. While it may be acceptable (in some embodiments) for this to log to carry data, this commit may be ensured to happen at the time of the failover by requiring the epoch change LSN to commit before accepting new writes. In other embodiments, this may not be required.

In some embodiments, a log conflict detection class may be a static class for which the instances are configured to assess the LSN stream. In other words, it may be in these instances that log conflicts are detected, and in which all snip log cases are defined. The logic of the assessment function (e.g., the comparison operation described above) may be based on the core invariants provided by the failover protocol, and the external lock service. The logic for assessing the LSNs in a log stream may be relatively straight-forward when examining LSNs that are all part of the one valid log stream. However, the replication systems described herein may be designed to be fault tolerant. Therefore, all of the cases in which failovers occur that do not include some member or members of the one valid log stream may have to be reconciled with the member(s) view of the world once they return. One strategy to deal with this is to immediately remove any nodes that do not participate in a failover from the replica group, and require them to re-join when they come back. As noted above, this strategy may put the system at a higher risk of multiple failures, causing the system to lose quorum, especially if the system includes a very large number of small replication groups (e.g., groups that consist of three replicas each most all of the time, as in many of the examples described herein). In addition, as discussed in more detail below, it may take a lot of time and effort to achieve all of the failovers and/or re-joins that may be required following a widespread outage if the system includes a very large number of small replication groups. In embodiments that do not remove members from replica groups for not participating in a master election, the system may be forced to deal with log branching.

In one embodiment, the log stream assessment mechanism may work as follows. A received LSN may be compared to the current LSN (i.e. the most recently appended LSN), and several comparison values may be produced (e.g., one for each of the LSN components: epoch, sequence number, and lock generation id). These comparison values may be considered enums (although they may or may not be represented as enums in the comparison code). In addition to being dependent on these three comparison values, the output of the assessment function may in some cases be dependent on a flag that marks a new epoch change LSN.

As noted above, the comparison value for the sequence comparison may indicate that the received LSN sequence value is one greater than the current LSN sequence value (resulting in a comparison value of PLUSPLUS), that the received LSN sequence value is more than one greater than the current LSN sequence value (resulting in a comparison value of GTPP), that the received LSN sequence value is the same as the current LSN sequence value (resulting in a comparison value of EQUAL), or that the received LSN sequence value is less than the current LSN sequence value (resulting in a comparison value of LESS). Similarly, the comparison value for the epoch value comparison may indicate that the received LSN epoch value is one greater than the current LSN epoch value (resulting in a comparison value of PLUSPLUS), that the received LSN epoch value is more than one greater than the current LSN epoch value (resulting in a comparison value of GTPP), that the received LSN epoch value is the same as the current LSN epoch value (resulting in a comparison value of EQUAL), or that the received LSN epoch value is less than the current LSN epoch value (resulting in a comparison value of LESS).

In some embodiments, the comparison value for the lock comparison may have fewer possible values. In this example, the comparison value for the lock comparison may indicate that the received LSN lock value is greater than the current LSN lock value (resulting in a comparison value of GREATER), that the received LSN lock value is the same as the current LSN lock value (resulting in a comparison value of EQUAL), or that the received LSN lock value is less than the current LSN lock value (resulting in a comparison value of LESS). In some embodiments, the value of the new epoch flag may indicate that the received LSN is marked as a "new epoch" LSN (in which case the flag may be set, or "true"), or may indicate that the received LSN is not marked as a "new epoch" LSN (in which case the flag may be clear, or "false").

In this example, all assessments are made based on these four pieces of data, and all 96 combinations of these values may result in a definitive action to be taken in response to receiving a log record. In this example, the possible actions that may be taken are:
  ADVANCE: append the received LSN—it is the next LSN in the LSN stream
  EPOCH: append the received LSN—it is the next LSN in the LSN stream (and it also changes the epoch)
  DROP: drop the received LSN—it is in the past (it has already been processed or has been superseded)
  OOC: cache the received LSN—it is in the future (i.e. it was received out of context), and may be needed later
  SNIP: snip the log (and then re-assess the received log record)—the comparison indicates that the log sequence was on an invalid branch
  ASSERT: return an error—the combination of parameter values of the received LSN are invalid (e.g., the failover protocol has been broken)

The assessment function (and/or the comparison operations thereof) may depend on the replication protocol and external lock service guarantees provided in the system, as expressed in the lemmas and theorems outlined below (for this example). The sequence terminology described earlier may be assumed in these lemmas and theorems.

The following lemmas may be valid for the example log detection and resolution function described herein:
  Lemma 1: In a given stream branch, the epoch and lock always increase together. That is, epoch($LSN_1$)>epoch ($LSN_2$) if and only if lock($LSN_1$)>lock($LSN_2$) and also lock($LSN_1$)>lock($LSN_2$) if and only if epoch($LSN_1$)>poch($LSN_2$). Further, if lock($LSN_1$)=lock($LSN_2$) then epoch($LSN_1$)=epoch($LSN_2$), and vice versa. This is given by the failover protocol.
  Lemma 2: In order to have an LSN of epoch E, all valid LSN's of epoch E-1 must first be verified as durable. This is given by the failover protocol.
  Lemma 3: Committed LSNs are always included in the valid log stream during failover. This is given by the failover protocol.
  Lemma 4: In order to have an LSN of epoch E that is not an epoch change LSN, the epoch change LSN for epoch E must first be committed. This is given by the failover protocol.
  Lemma 5: A unique lock generation is used for each master reign. This is given by the failover protocol.
  Lemma 6: Only one lock generation may be active at one time. This guarantee may be provided by the external lock service.
  Lemma 7: For an external Lock L, if there are lock acquisition times of T1, T2, and T1<T2, then lock generation Lock(T1)<Lock(T2). This guarantee may be provided by the external lock service.

The following theorems have been proven for the example log detection and resolution function described herein, but are not shown:
  Theorem 1: If $LSN_1$ and $LSN_2$ reside in two different stream branches, and epoch($LSN_1$)>epoch($LSN_2$), then lock($LSN_1$) !=lock($LSN_2$).
  Theorem 2: If LSNs with different locks are created in a stream branch without any other branch creating an LSN in-between, all LSNs of the first of the two locks must be committed.
  Theorem 3: If $LSN_1$ and $LSN_2$ reside in two different stream branches, and epoch($LSN_1$)>epoch($LSN_2$), then lock($LSN_1$)>lock($LSN_2$).
  Theorem 4: If epoch($LSN_1$)=epoch($LSN_2$), and lock($LSN_1$)<lock($LSN_2$), then sequence($LSN_1$)<=sequence($LSN_2$).
  Theorem 5: If epoch($LSN_1$)=epoch($LSN_2$), and lock($LSN_1$) !=lock($LSN_2$), and sequence($LSN_1$)=sequence($LSN_2$), then $LSN_2$ is an epoch change LSN.
  Theorem 6: If sequence($LSN_1$)<sequence($LSN_2$), epoch($LSN_1$)=epoch($LSN_2$), and $LSN_2$ is marked as an epoch change LSN, then lock($LSN_1$) !=lock($LSN_2$).
  Theorem 7: if lock($LSN_1$)>lock($LSN_2$), and $LSN_2$ is not an epoch change LSN, then epoch($LSN_1$) !=epoch ($LSN_2$).

The example log conflict detection function may be illustrated by the following pseudo code, according to one embodiment.

```
public class LogConflictDetection
{
// Possible actions dictated by an assessment
//
enum Action
{
   DROP,    // duplicate delivery, etc.
   ADVANCE, // normal steady state advancement case - only one case results in this action
   EPOCH,   // epoch change advancement case - only one case results in this action
   OOC,     // future log - "out of context". The stream leading up to this LSN must be filled in
   SNIP,    // log conflict detected (and replica is on the invalid branch) - log should be snipped
   ASSERT   // a case that should be impossible - therefore, assert error
}
// Comparisons are: received LSN is __ when compared to current LSN (most recently
// submitted LSN)
//
// Valid values for sequence : LESS, EQUAL, PLUSPLUS, GTPP
// Valid values for epoch    : LESS, EQUAL, PLUSPLUS, GTPP
// Valid values for lock     : LESS, EQUAL, GREATER
// Valid values for newEpoch : EPOCH, FALSE
//
static int GREATER  = 0; // >  - strictly greater
static int GTPP     = 0; // >> - more than one greater (greater than plusplus)
static int EQUAL    = 1; // == - exactly the same
static int LESS     = 2; // <  - strictly less
static int PLUSPLUS = 3; // ++ - one greater
static int EPOCH    = 0; // newEpoch
static int FALSE    = 1; // !newEpoch
static Action[ ][ ][ ][ ] matrix = new Action[4][4][3][2];
//                                currentLSN -> receivedLSN
//
static                        // seq epoch lock newEpoch
{
matrix[PLUSPLUS][EQUAL][EQUAL][EPOCH]      = Action.ASSERT;  // ++ == == T
matrix[PLUSPLUS][EQUAL][EQUAL][FALSE]      = Action.ADVANCE; // ++ == == F
matrix[PLUSPLUS][EQUAL][GREATER][EPOCH]    = Action.SNIP;    // ++ == >  T
matrix[PLUSPLUS][EQUAL][GREATER][FALSE]    = Action.SNIP;    // ++ == >  F
matrix[PLUSPLUS][EQUAL][LESS][EPOCH]       = Action.ASSERT;  // ++ == <  T
matrix[PLUSPLUS][EQUAL][LESS][FALSE]       = Action.ASSERT;  // ++ == <  F
matrix[PLUSPLUS][PLUSPLUS][EQUAL][EPOCH]   = Action.ASSERT;  // ++ ++ == T
matrix[PLUSPLUS][PLUSPLUS][EQUAL][FALSE]   = Action.ASSERT;  // ++ ++ == F
matrix[PLUSPLUS][PLUSPLUS][GREATER][EPOCH] = Action.EPOCH;   // ++ ++ >  T
matrix[PLUSPLUS][PLUSPLUS][GREATER][FALSE] = Action.SNIP;    // ++ ++ >  F
matrix[PLUSPLUS][PLUSPLUS][LESS][EPOCH]    = Action.ASSERT;  // ++ ++ <  T
matrix[PLUSPLUS][PLUSPLUS][LESS][FALSE]    = Action.ASSERT;  // ++ ++ <  F
matrix[PLUSPLUS][GTPP][EQUAL][EPOCH]       = Action.ASSERT;  // ++ >> == T
matrix[PLUSPLUS][GTPP][EQUAL][FALSE]       = Action.ASSERT;  // ++ >> == F
matrix[PLUSPLUS][GTPP][GREATER][EPOCH]     = Action.SNIP;    // ++ >> >  T
matrix[PLUSPLUS][GTPP][GREATER][FALSE]     = Action.SNIP;    // ++ >> >  F
matrix[PLUSPLUS][GTPP][LESS][EPOCH]        = Action.ASSERT;  // ++ >> <  T
matrix[PLUSPLUS][GTPP][LESS][FALSE]        = Action.ASSERT;  // ++ >> <  F
matrix[PLUSPLUS][LESS][EQUAL][EPOCH]       = Action.ASSERT;  // ++ <  == T
matrix[PLUSPLUS][LESS][EQUAL][FALSE]       = Action.ASSERT;  // ++ <  == F
matrix[PLUSPLUS][LESS][GREATER][EPOCH]     = Action.ASSERT;  // ++ <  >  T
matrix[PLUSPLUS][LESS][GREATER][FALSE]     = Action.ASSERT;  // ++ <  >  F
matrix[PLUSPLUS][LESS][LESS][EPOCH]        = Action.DROP;    // ++ <  <  T
matrix[PLUSPLUS][LESS][LESS][FALSE]        = Action.DROP;    // ++ <  <  F
matrix[EQUAL][EQUAL][EQUAL][EPOCH]         = Action.DROP;    // == == == T
matrix[EQUAL][EQUAL][EQUAL][FALSE]         = Action.DROP;    // == == == F
matrix[EQUAL][EQUAL][GREATER][EPOCH]       = Action.SNIP;    // == == >  T
matrix[EQUAL][EQUAL][GREATER][FALSE]       = Action.ASSERT;  // == == >  F
matrix[EQUAL][EQUAL][LESS][EPOCH]          = Action.DROP;    // == == <  T
matrix[EQUAL][EQUAL][LESS][FALSE]          = Action.ASSERT;  // == == <  F
matrix[EQUAL][PLUSPLUS][EQUAL][EPOCH]      = Action.ASSERT;  // == ++ == T
matrix[EQUAL][PLUSPLUS][EQUAL][FALSE]      = Action.ASSERT;  // == ++ == F
matrix[EQUAL][PLUSPLUS][GREATER][EPOCH]    = Action.SNIP;    // == ++ >  T
matrix[EQUAL][PLUSPLUS][GREATER][FALSE]    = Action.SNIP;    // == ++ >  F
matrix[EQUAL][PLUSPLUS][LESS][EPOCH]       = Action.ASSERT;  // == ++ <  T
matrix[EQUAL][PLUSPLUS][LESS][FALSE]       = Action.ASSERT;  // == ++ <  F
matrix[EQUAL][GTPP][EQUAL][EPOCH]          = Action.ASSERT;  // == >> == T
matrix[EQUAL][GTPP][EQUAL][FALSE]          = Action.ASSERT;  // == >> == F
matrix[EQUAL][GTPP][GREATER][EPOCH]        = Action.SNIP;    // == >> >  T
matrix[EQUAL][GTPP][GREATER][FALSE]        = Action.SNIP;    // == >> >  F
matrix[EQUAL][GTPP][LESS][EPOCH]           = Action.ASSERT;  // == >> <  T
matrix[EQUAL][GTPP][LESS][FALSE]           = Action.ASSERT;  // == >> <  F
matrix[EQUAL][LESS][EQUAL][EPOCH]          = Action.ASSERT;  // == <  == T
matrix[EQUAL][LESS][EQUAL][FALSE]          = Action.ASSERT;  // == <  == F
matrix[EQUAL][LESS][GREATER][EPOCH]        = Action.ASSERT;  // == <  >  T
matrix[EQUAL][LESS][GREATER][FALSE]        = Action.ASSERT;  // == <  >  F
matrix[EQUAL][LESS][LESS][EPOCH]           = Action.DROP;    // == <  <  T
matrix[EQUAL][LESS][LESS][FALSE]           = Action.DROP;    // == <  <  F
```

```
matrix[GTPP][EQUAL][EQUAL][EPOCH] = Action.ASSERT;        // >> == == T
matrix[GTPP][EQUAL][EQUAL][FALSE] = Action.OOC;           // >> == == F
matrix[GTPP][EQUAL][GREATER][EPOCH] = Action.SNIP;        // >> == > T
matrix[GTPP][EQUAL][GREATER][FALSE] = Action.SNIP;        // >> == > F
matrix[GTPP][EQUAL][LESS][EPOCH] = Action.ASSERT;         // >> == < T
matrix[GTPP][EQUAL][LESS][FALSE] = Action.ASSERT;         // >> == < F
matrix[GTPP][PLUSPLUS][EQUAL][EPOCH] = Action.ASSERT;     // >> ++ == T
matrix[GTPP][PLUSPLUS][EQUAL][FALSE] = Action.ASSERT;     // >> ++ == F
matrix[GTPP][PLUSPLUS][GREATER][EPOCH] = Action.OOC;      // >> ++ > T
matrix[GTPP][PLUSPLUS][GREATER][FALSE] = Action.OOC;      // >> ++ > F
matrix[GTPP][PLUSPLUS][LESS][EPOCH] = Action.ASSERT;      // >> ++ < T
matrix[GTPP][PLUSPLUS][LESS][FALSE] = Action.ASSERT;      // >> ++ < F
matrix[GTPP][GTPP][EQUAL][EPOCH] = Action.ASSERT;         // >> >> == T
matrix[GTPP][GTPP][EQUAL][FALSE] = Action.ASSERT;         // >> >> == F
matrix[GTPP][GTPP][GREATER][EPOCH] = Action.OOC;          // >> >> > T
matrix[GTPP][GTPP][GREATER][FALSE] = Action.OOC;          // >> >> > F
matrix[GTPP][GTPP][LESS][EPOCH] = Action.ASSERT;          // >> >> < T
matrix[GTPP][GTPP][LESS][FALSE] = Action.ASSERT;          // >> >> < F
matrix[GTPP][LESS][EQUAL][EPOCH] = Action.ASSERT;         // >> < == T
matrix[GTPP][LESS][EQUAL][FALSE] = Action.ASSERT;         // >> < == F
matrix[GTPP][LESS][GREATER][EPOCH] = Action.ASSERT;       // >> < > T
matrix[GTPP][LESS][GREATER][FALSE] = Action.ASSERT;       //>> < > F
matrix[GTPP][LESS][LESS][EPOCH] = Action.DROP;            // >> < < T
matrix[GTPP][LESS][LESS][FALSE] = Action.DROP;            // >> < < F
matrix[LESS][EQUAL][EQUAL][EPOCH] = Action.DROP;          // < == == T
matrix[LESS][EQUAL][EQUAL][FALSE] = Action.DROP;          // < == == F
matrix[LESS][EQUAL][GREATER][EPOCH] = Action.ASSERT;      // < == > T
matrix[LESS][EQUAL][GREATER][FALSE] = Action.ASSERT;      // < == > F
matrix[LESS][EQUAL][LESS][EPOCH] = Action.DROP;           // < == < T
matrix[LESS][EQUAL][LESS][FALSE] = Action.ASSERT;         // < == < F
matrix[LESS][PLUSPLUS][EQUAL][EPOCH] = Action.ASSERT;     // < ++ == T
matrix[LESS][PLUSPLUS][EQUAL][FALSE] = Action.ASSERT;     // < ++ == F
matrix[LESS][PLUSPLUS][GREATER][EPOCH] = Action.SNIP;     // < ++ > T
matrix[LESS][PLUSPLUS][GREATER][FALSE] = Action.SNIP;     // < ++ > F
matrix[LESS][PLUSPLUS][LESS][EPOCH] = Action.ASSERT;      // < ++ < T
matrix[LESS][PLUSPLUS][LESS][FALSE] = Action.ASSERT;      // < ++ < F
matrix[LESS][GTPP][EQUAL][EPOCH] = Action.ASSERT;         // < >> == T
matrix[LESS][GTPP][EQUAL][FALSE] = Action.ASSERT;         // < >> == F
matrix[LESS][GTPP][GREATER][EPOCH] = Action.SNIP;         // < >> > T
matrix[LESS][GTPP][GREATER][FALSE] = Action.SNIP;         // < >> > F
matrix[LESS][GTPP][LESS][EPOCH] = Action.ASSERT;          // < >> < T
matrix[LESS][GTPP][LESS][FALSE] = Action.ASSERT;          // < >> < F
matrix[LESS][LESS][EQUAL][EPOCH] = Action.ASSERT;         // < < == T
matrix[LESS][LESS][EQUAL][FALSE] = Action.ASSERT;         // < < == F
matrix[LESS][LESS][GREATER][EPOCH] = Action.ASSERT;       // < < > T
matrix[LESS][LESS][GREATER][FALSE] = Action.ASSERT;       // < < > F
matrix[LESS][LESS][LESS][EPOCH] = Action.DROP;            // < < < T
matrix[LESS][LESS][LESS][FALSE] = Action.DROP;            // < < < F
}
/**
 * Return the necessary action to perform based on the most recently submitted (appended)
 * LSN, the newly received LSN (for append),
 * and whether the received LSN is marked as an epoch change LSN.
 */
public static Action assess(LSN currentLSN, LogEntry incomingLog, boolean newEpoch)
{
  LSN receivedLSN = incomingLog.getLSN( );
  int sequenceCompare = receivedLSN.seq == currentLSN.seq + 1 ? PLUSPLUS :
          receivedLSN.seq > currentLSN.seq + 1 ? GTPP :
          receivedLSN.seq == currentLSN.seq ? EQUAL : LESS;
  int epochCompare  = receivedLSN.epoch == currentLSN.epoch ? EQUAL :
          receivedLSN.epoch == currentLSN.epoch + 1 ? PLUSPLUS :
          receivedLSN.epoch > currentLSN.epoch + 1 ? GTPP : LESS;
  int lockCompare   = receivedLSN.lock == currentLSN.lock ? EQUAL :
          receivedLSN.lock > currentLSN.lock ? GREATER : LESS;
  int newEpochCompare = newEpoch ? EPOCH : FALSE;
  Action verdict =
     matrix[sequenceCompare][epochCompare][lockCompare][newEpochCompare];
  // Epoch change is ambiguous with parallel branch transitions if lsn.epoch and lsn.seq line
  // up (see AMBIGUOUS_EPOCH_CHANGE)
  // So, verify the transition is correct by inspecting and comparing the previous lock with that
  // of the current LSN. If not
  // a match, then it is the parallel branch scenario, and is actually a snip case
```

```
if(verdict == Action.EPOCH)
{
    if(incomingLog.getPriorLock( ) != currentLSN.lock)
        verdict = Action.SNIP;
}
return verdict;
    }
}
```

Figure 26:
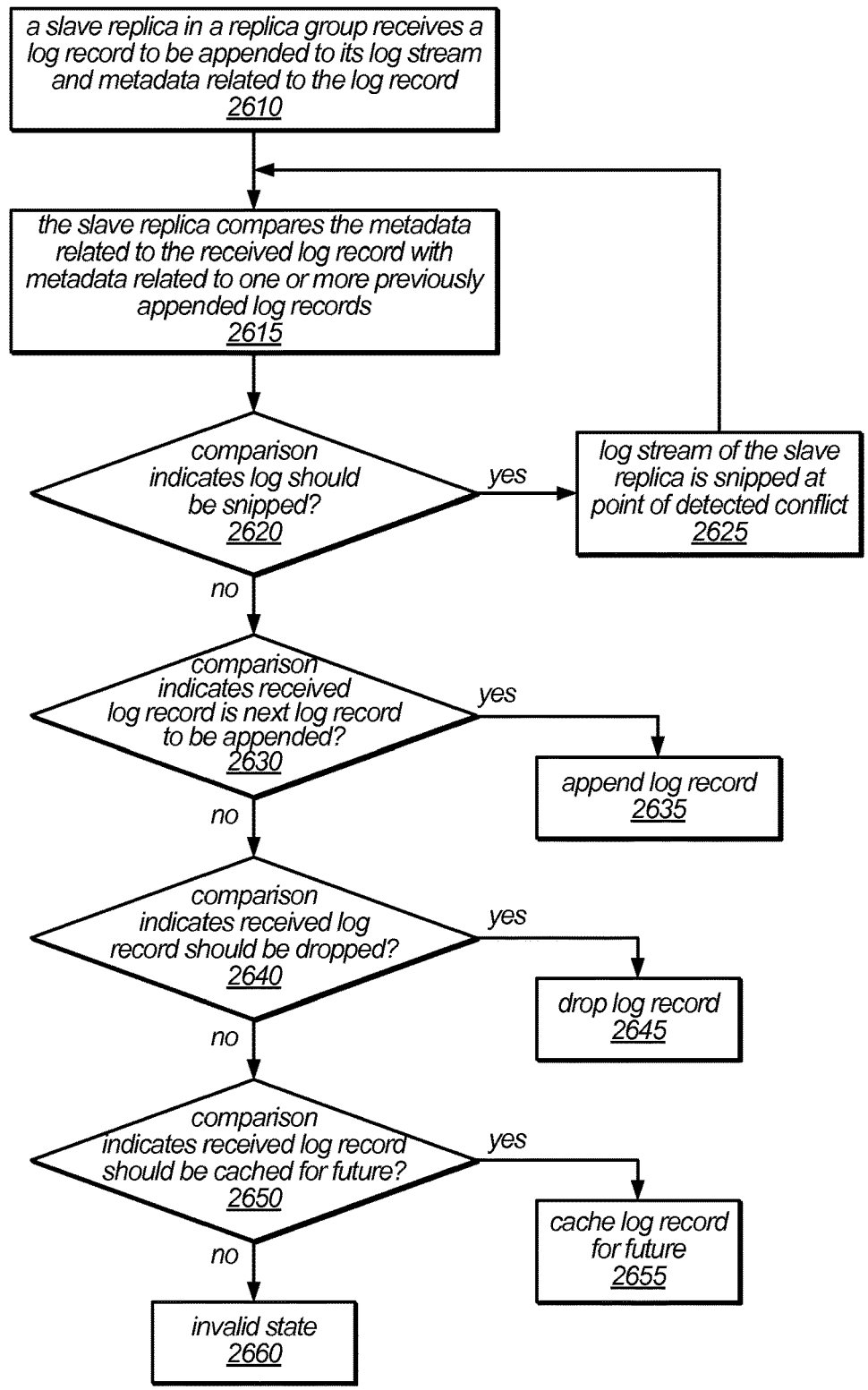
FIG. 26 is a flow diagram illustrating one embodiment of a method for detecting and resolving log conflicts in a data storage system.

One embodiment of a method for detecting and resolving log conflicts in a data storage system is illustrated by the flow diagram in FIG. 26. As illustrated at 2610, in this example, the method may include a slave replica in a replica group receiving a log record to be appended to its log stream and metadata related to the log record. The method may include the slave replica comparing the metadata related to the received log record with metadata related to one or more previously appended log records, as in 2615. If the comparison indicates that the log stream of the slave replica should be snipped (shown as the positive exit from 2620), e.g., if a conflict is detected in the compared data that indicates the log stream of the slave replica is on an invalid branch, the method may include snipping the log stream of the slave replica at the point of the detected conflict (as in 2625), and then beginning the comparison operation again (shown as the feedback from 2625 back to 2615). Note that in this case, the log stream of the slave replica may be caught up with the valid stream later (e.g., during a subsequent failover operation), in some embodiments.

If the comparison indicates that the received log record is the next log record that should be appended to the log stream (shown as the positive exit from 2630), the method may include appending the received log record to the log stream, as in 2635. For example, one of the comparisons that takes place may determine whether the log sequence number is next in the log sequence with respect to the log sequence numbers of the log records already appended in the log(e.g., if it is greater than the log sequence number of the most recently appended log record by one). If so, in some cases, the log record may be appended to the log stream. In some embodiments, if a flag indicating whether the log record is associated with an epoch change is set (or true), the log record appended to the log stream may indicate the epoch change.

If the comparison does not indicate that the received log record should be appended to the log stream (shown as the negative exit from 2630), but the comparison indicates that the received log record should be dropped, shown as the positive exit from 2640, the method may include dropping the log record, as in 2645. For example, one of the comparisons that takes place may determine whether the log record is a duplicate log record or a log record that has been superseded. If the comparison does not indicate that the received log record should be dropped, but the comparison indicates that the received log record should be cached as a potential future addition to the log stream (shown as the positive exit from 2650), the method may include caching the received log record as a potential future addition to the log, as in 2655. For example, one of the comparisons that takes place may determine whether the log sequence number of the received log record is not next in sequence, such as if the difference between the log sequence number of the received log record and the log sequence number of the most recently appended log record is greater than one. If so, in some cases, the log record may be cached for potential future use. In some embodiments, a cached log record may be applied later (e.g., in sequence order), unless a different branch is taken, the replica is dropped from group, or another situation or state change prevents it being subsequently appended to the log. Note that if none of the comparisons described above are true (shown as the negative exits from 2620, 2630, 2640, and 2650), the system may be in an invalid state, as in 2660, and an error may be returned. This may correspond to the situation in which the "ASSERT" action is taken in the example pseudo code above (e.g., in response to a combination of metadata comparison results that should not be possible in the data storage system).

In some embodiments, log branching (and/or the need for various techniques to detect and resolve the resulting log conflicts) may be avoided through post-failover rejoins. In some such embodiments, log branching may be avoided entirely by removing members of a replica group that do not participate in a failover election from the replica group, and then replacing them with new members. In some such embodiments, the replicas that were removed may rejoin using the same mechanisms with which any new replica joins a replica group. This alternative approach may be much simpler to implement than the approach described above, but may add risk. For example, it may be considered too risky to implement this alternate approach in a system like that runs 10s to 100s of thousands (or even millions) of replication groups due to the time and expense of performing multiple re-join operations for many different failovers. For example, the time and effort required for the removed replica group members to rejoin the replica group may affect the durability model of the system, and/or the availability of the system and/or the data maintained thereby. In the case of a large scale event, such as a data center outage, the system would have to work through many, many failovers at the same time and process a very large number of re-join operations to return the system to a stable state. However, it may be reasonable to implement this alternate approach for single replicated databases or in other replicated storage systems on a relatively small scale.

Figure 27:
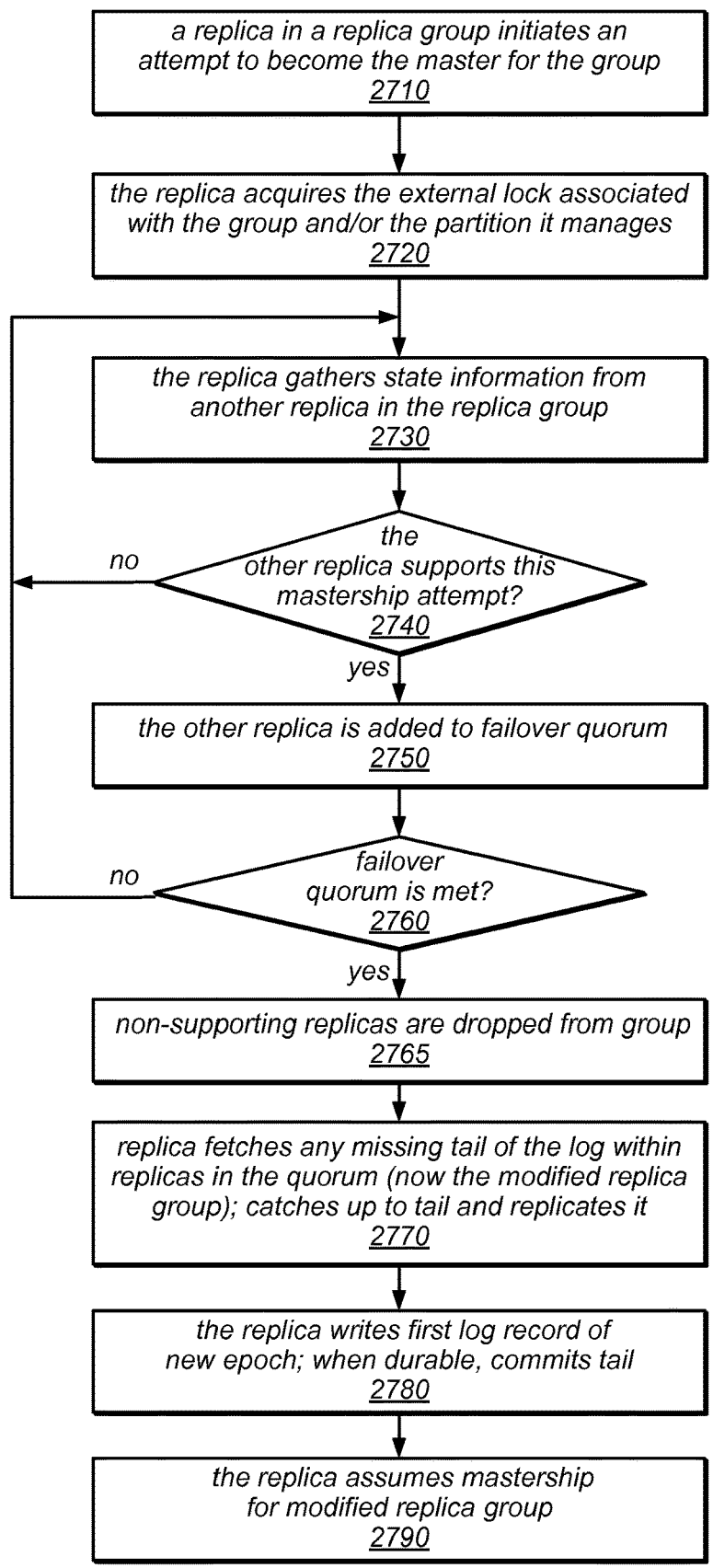
FIG. 27 is a flow diagram illustrating another embodiment of a method for filling out a failover quorum.

Another embodiment of a method for filling out a failover quorum is illustrated by the flow diagram in FIG. 27. As illustrated in this example, the method may include a replica in a replica group initiating an attempt to become the master for the replica group, as in 2710. The method may include the replica that is attempting to become the master replica acquiring the external lock associated with the replica group and/or with the data partition it manages, as in 2720. As described above, the method may include the replica that is attempting to become the master replica gathering state information from another replica in the replica group, as in 2730.

As illustrated in this example, if the other replica supports this mastership attempt (shown as the positive exit from 2740), the method may include adding the other replica to the failover quorum, as in 2750. On the other hand, if the other replica does not support this mastership attempt, the other replica is not added to the failover quorum, but may be retained in the replica group and may be included in a subsequent attempt to reach a failover quorum (whether or not the current attempt is successful). As illustrated in this example, the replica attempting to become the master replica may continue gathering state information from other replicas in the replica group until the failover quorum is reached (or until a timeout period expires, or until it is clear that the failover quorum cannot be reached, in different embodiments). This is illustrated in FIG. 27 by the feedback from 2740 to 2730.

In the example illustrated in FIG. 27, once the failover quorum is met, shown as the positive exit from 2760, any replicas that did not support the attempt to become master of the replica group may be removed from the replica group (as in 2765), and the failover process may continue. In this example, the method may include the replica that is attempting to become the master replica for the replica group fetching any missing tail of the log stream that is found within one of the other replicas in the quorum (now the modified replica group), as in 2770. If such a tail is found, the method may include the replica that is attempting to become the master replica catching up to the tail and replicating it (e.g., sending its log records to the other replicas in the group in one or more "append" messages). The replica attempting to become the master may then write the first log record of a new epoch (an epoch in which it is the master replica), as in 2780. When this log record is durable, the replica attempting to become the master replica may commit the now-replicated tail. As illustrated in this example, the replica that is attempting to become the master may at that point assume mastership for the modified replica group (e.g., the replica group from which one or more replicas may have been dropped), as in 2790. Note that, in some embodiments, by dropping any replicas that are not included in the failover quorum from the replica group, invalid branches in the log stream may be avoided, and the techniques described herein for detecting and resolving such conflicts in the log stream may not be necessary. Also note that in some embodiments, a replica that is dropped from the replica group may rejoin the replica group at a later time. Rejoining the replica group may include discarding the state of the dropped replica and then synchronizing the replica to the replicas in the quorum from scratch (as with any operation to add a new replica to a replica group).

As described herein, in some embodiments, a data storage system may employ a master/slave replication system with fault tolerance based on a quorum scheme in which write quorums overlap with failover synchronization quorums to ensure that following a change in mastership, all acknowledged writes have been found. In some embodiments, the data storage system may be designed to utilize an external lock manager or lock service (e.g. a distributed lock manager) to safely manage the global view of the system, including a view indicating which replica of a replication group is allowed to function as master at any given time. In such embodiments, the distributed lock manager may ensure, through a lease mechanism, that one, and only one, replica is ever acting as the master for each replication group at any given time. The master replica of the replication group may be the only replica that may master new write requests made to the system and directed to the replication group, and may also serve consistent read requests being made to the system and directed to the replication group. This approach may work well in systems in which the distributed lock manager will remain available to the replicas, or in systems in which it is acceptable for a given replication group to be unavailable for short periods of time. For example, if the external lock manager becomes unavailable, then all replication groups may become masterless (and thus unavailable for both writes and consistent reads) as soon as their master leases expire (e.g., within a few seconds, in some systems). The alternate approaches described below may allow both writes and consistent reads to continue in the event that an external lock manager or service that is used to establish mastership becomes unavailable.

A steady state view of the system may be defined as a state during which a single master replica coordinates writes to the slave replicas in its replica group, and acknowledges the writes when (and if) a quorum of the slave replicas report having persisted them. In some embodiments, during this steady state view, consistent read operations may only be served by the master replica, since the master has been the only replica mastering writes.

In some embodiments, if the master replica fails, the steady state view may cease to function, and a view change may be required in order to resume steady state operations. The view change may involve selecting a new master, issuing it new master credentials that compare greater than any previous master credentials in existence (i.e. credentials that are the highest credentials known to any replica in the replica group), and synchronizing the new master with a quorum of the surviving replicas that overlaps all previous write quorums used by the previous master. In some embodiments, the view change may also involve ensuring that all previous writes satisfy a write quorum that utilizes only the surviving replicas.

In some embodiments, in order to implement such a view change, the system may utilize a consensus mechanism that selects a new master replica candidate, and assigns it a new credential that is higher (e.g., that compares greater) than any previous credential in existence. In some such embodiments, an external lock manager may be utilized for this purpose. Once the new master candidate and credentials are selected, the new master candidate may acquire the failover quorum, and may synchronize with the quorum according to the applicable failover protocol (e.g., the failover quorum described herein). In some embodiments, in order to determine when a view change is required, a failure detection mechanism may also be required. In some embodiments, an external lock manager may be utilized for this purpose as well. For example, the external lock manager may maintain a lease with the master replica in order to maintain that only one replica is acting as master for the steady state view at any single point in time.

Figure 28:
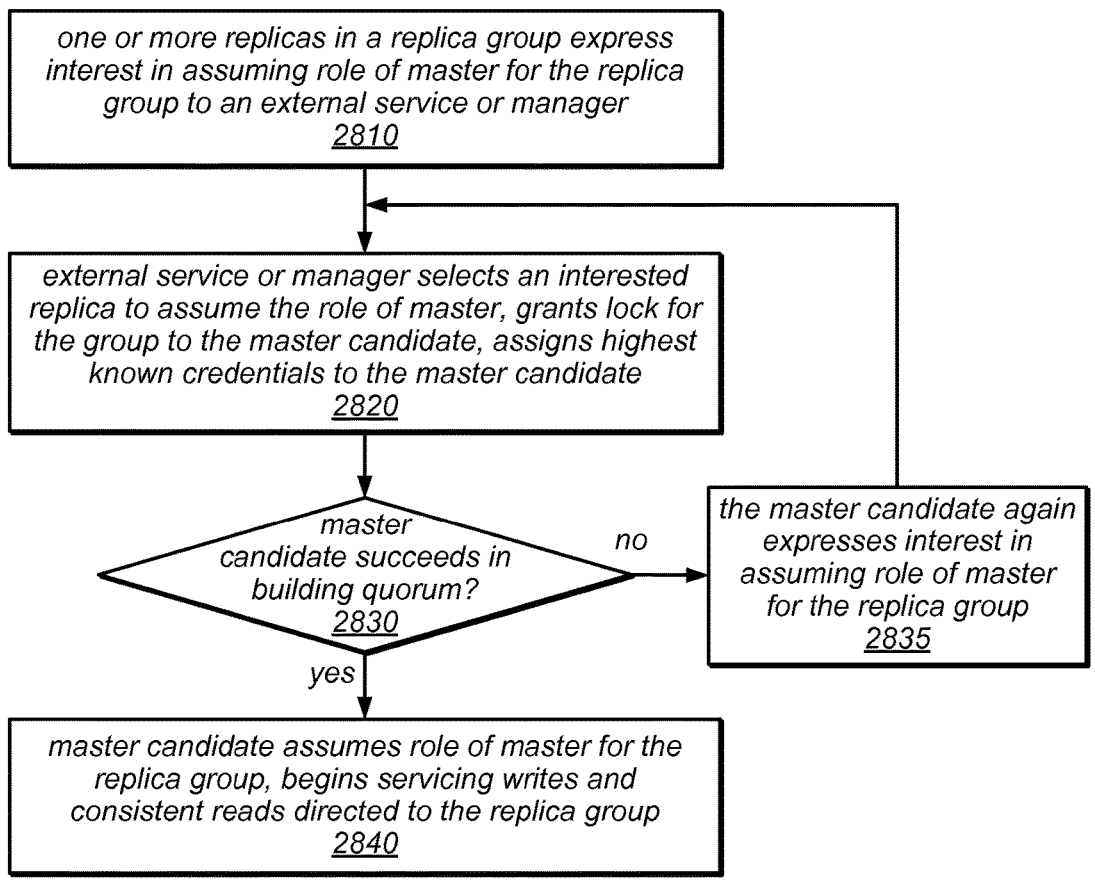
FIG. 28 is a flow diagram illustrating one embodiment of a method for employing an external service or manager to select a master replica for a replica group.

One embodiment of a method for employing an external service or manager (e.g., a lock service or lock manager) to select a master replica for a replica group is illustrated by the flow diagram in FIG. 28. As illustrated at 2810, in this example, the method may include one or more replicas in a replica group expressing interest in assuming the role of master for the replica group to an external service or manager (e.g., a lock service or lock manager). The external service or manager may select one of the interested replicas to as a candidate to assume the role of master, may grant a lock for the group to the master candidate, and may assign the highest known credentials to the master candidate, as in 2820. For example, the external service or manager may assign the appropriate sequence number, lock generation identifier and/or epoch identifiers to the master candidate to ensure that only one replica has highest credentials (e.g., by incrementing one or more of these elements of the master credentials each time it selects a new master candidate). In some embodiments, the external service or manager may associate a lock with each replica group that can be held by at most one replica at a time. In other embodiments, another mechanism may be employed by the external service or manager to ensure that only one replica is a valid master at a time. Note that a change of mastership may be initiated due to the failure of the master replica (or the computing node on which it is hosted), a loss of communication between the master replica and the external service or manager, or another reason, in different embodiments.

As illustrated at 2830, in this example, the method may include determining whether the master candidate succeeds in building a quorum that supports its attempt to become master replica, as described herein. If not, shown as the negative exit from 2830, the method may include the master candidate again expressing its interest in assuming the role of master replica, as in 2835. The external service or manager may again select one of the interested replicas to assume the role of master (either the original master candidate or a new master candidate). In other words, the method may include repeating the operations illustrated in 2820-2835 for various interested replicas until one is successful in building a quorum of replicas that support the attempt to become master replica. This is illustrated by the path from the negative exit of 2830 to 2835, and from 2835 back to 2820. If the master candidate succeeds in building a quorum that supports its attempt to become master replica, shown as the positive exit from 2830, the master candidate may assume the role of master for the replica group, and may begin servicing writes and consistent reads directed to the replica group, as in 2840. In some embodiments, write operations may employ a write quorum (as described herein), and consistent reads may always be serviced by the master replica, since it is the only replica in the group known to have a consistent view of the data maintained by the replica group.

In some embodiments, a lease may be applied primarily to manage consistent read operations. For example, in systems in which write operations use a quorum scheme, the write operations may be made safe without the need for a lease. Consistent reads may similarly be made safe without a lease if they required acquiring quorum as a prerequisite to responding successfully to the consistent read. However, this would decrease system performance, since acquiring quorum is an expensive operation that would need to be performed in addition to each read. Note that, in general, write operations cannot avoid the expense of acquiring a quorum because all write operations must be performed on all replicas. In contrast, consistent read operations may be performed only on the master, e.g., as long as it is certain that there is only one master. On the other hand, as described in reference to FIG. 17B, eventually consistent read operations may be served by any replica in the appropriate replica group. In some embodiments, the use of a lease may ensure that there is only one master at all times regardless of network partitions, etc., that may cause false positives in the failure detector.

In some systems that rely on an external lock manager for master leases, the system may also utilize the external lock manager for maintaining the steady state view for master writes. For example, in order to maintain a lease, a heart-beat mechanism may be employed between the external lock manager and the current master replica, such that the lease is continued or renewed periodically as long as the external lock manager and the master replica remain in communication with each other and no other replica assumes the role of master replica for the replica group. In some embodiments, if the lease is lost, the mastership for both consistent read operations and write operations may be given up. While this strategy may have the advantage of simplicity, it may also have the disadvantage that if the external lease mechanism fails or otherwise becomes unavailable, the master may be lost, and the steady state view may cease to function. In some embodiments, since this lease mechanism may be this same mechanism that provides consensus for selecting the next master and its new credentials, it may not be possible to establish a new steady state view if the external lease mechanism fails or otherwise becomes unavailable. This may lead to a service outage. The "blast radius" (i.e. the affected range) of such a service outage may include all master/slave views that were utilizing the failed lease manager, which may be unacceptable in some systems.

Figure 29:
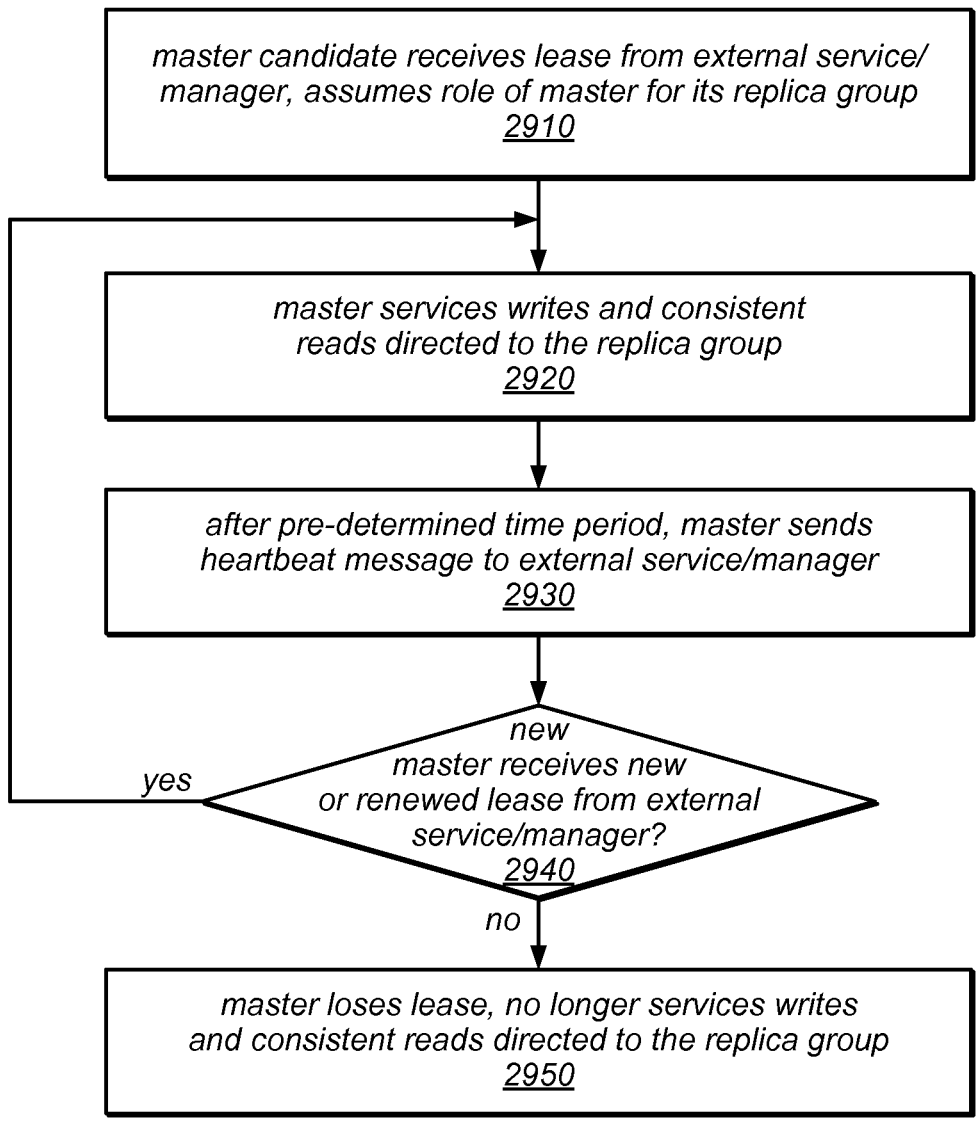
FIG. 29 is a flow diagram illustrating one embodiment of a method for employing a heartbeat mechanism between an external service or manager and a master replica for a replica group.

One embodiment of a method for employing a heart-beat mechanism between an external service or manager (e.g., a lock service or lock manager) and a master replica for a replica group is illustrated by the flow diagram in FIG. 29. As illustrated in this example, the method may include a master candidate receiving a lease from an external service or manager, and assuming the role of master for its replica group, as in 2910. The method may also include the master replica servicing write operations and consistent read operations that are directed to the replica group, as in 2920. As illustrated in this example, the method may include, after a pre-determined time period, the master replica sending a heart-beat message to the external service/manager, as in 2930. In other words, the new master may begin a heart-beat process with the external service/manager in order to maintain (or periodically renew) the lease. In such embodiments, the heart-beat time period may be less than the lease period.

As illustrated in FIG. 29, if the new master receives a new (or renewed) lease from the external service/manager in response to sending the heart-beat message (shown as the positive exit from 2940), the method may include repeating the operations illustrated at 2920-2940 as long as the new master continues to receive new leases in response to the heart-beat message. If the new master does not receive a new (or renewed) lease from the external service/manager in response to sending the heart-beat message (shown as the negative exit from 2940), the method may include the master losing its lease, and no longer servicing the write operations and consistent read operations that are directed to the replica group, as in 2950. In this case, write operations and/or consistent read operations may not be serviced until another replica becomes the master replica for the replica group.

As described herein, in some embodiments, write operations may employ a quorum scheme. In some embodiments, this mechanism may be leveraged to allow write operations to continue to be available following the loss of any external lease mechanism. For example, rather than giving up mastership for write purposes when the lease may no longer be maintained (due to problems with the lease manager, or simply due to communication issues with the lease manager), the steady state master may simply continue to act in the role of master for the replica group so long as enough replicas only support write quorums for writes mastered by a replica with the greatest credentials that the replica has ever seen. Since all write quorums must intersect all failover quorums, if another replica succeeds in achieving a failover quorum (which may be a pre-requisite for the replica to become master), then any previous master will no longer be able to achieve write quorums for writes that it tries to master. Thus, it may be safe for the new master to emerge without the possibility of having two replicas attempting to act as masters for write operations directed to the replica group.

In some embodiments, to enable this approach, the failover protocol described above may be extended as follows: When a replica participates in a new failover quorum, it may first validate that it has never seen a higher master credential or else may refuse to be part of the quorum. In other words, a replica cannot support failover quorums for credentials that are not greater than any it has previously seen, according to the failover protocol described above. The replica may durably remember (e.g., persist to disk or write to another type of persistent memory) the new highest master credential, and may not be able to respond as a participant in the quorum until the new highest master credential is durably remembered. At that point, the replica may agree to reject any attempted write operation that is mastered under a lesser master credential.

In some embodiments, in order to establish a new master for a new steady state view, the system may require a consensus mechanism for determining the replica that may be master next, and its new credentials. The new credentials may be guaranteed to be greater than any previous master credentials. Using the protocol described above, once the steady state view is established, it may be maintained for write operations without the need to maintain (or even know about) any leases.

Figure 30:
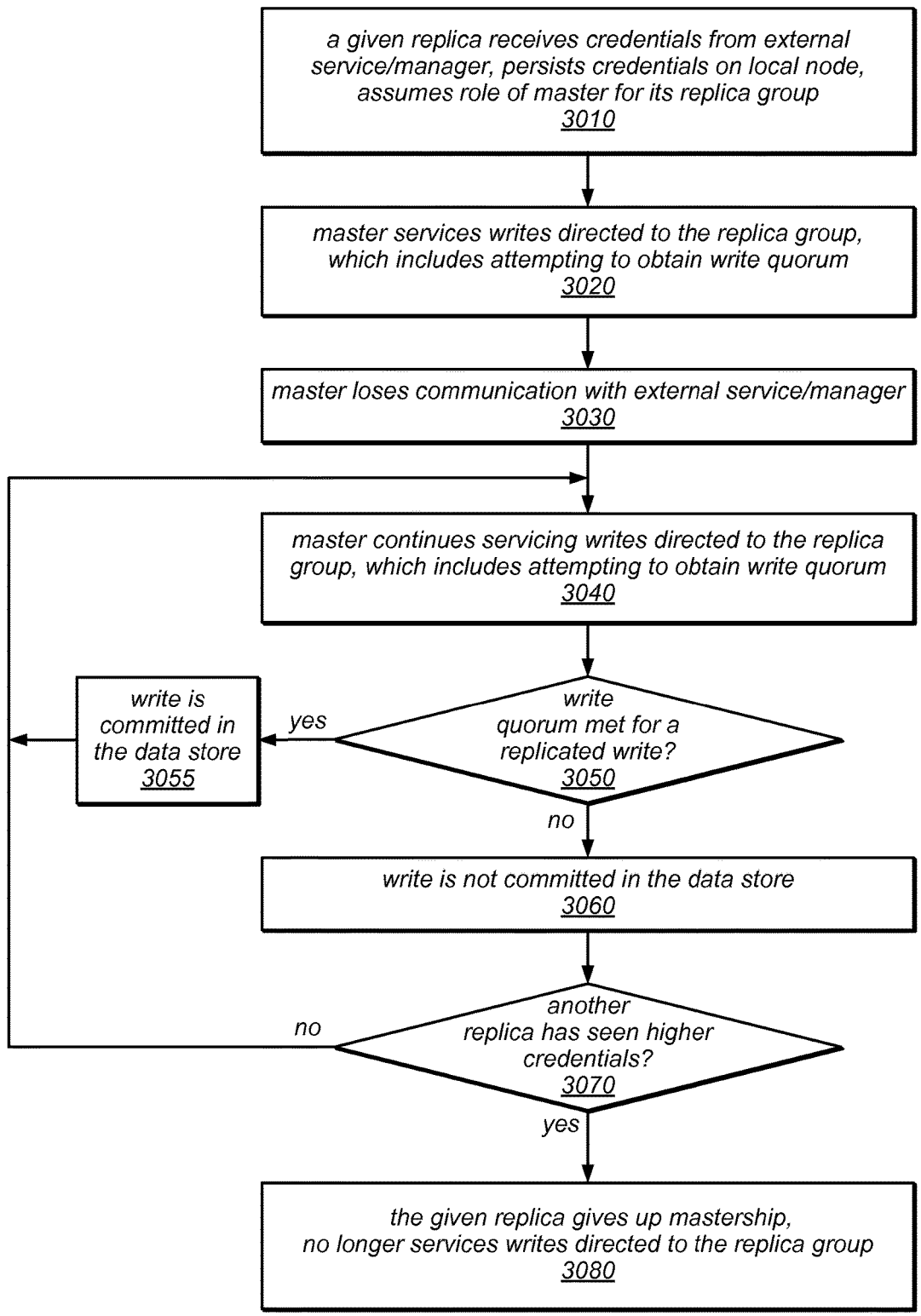
FIG. 30 is a flow diagram illustrating one embodiment of a method for continuing to service write operations when an external service or manager is unavailable.

One embodiment of a method for continuing to service write operations when an external service or manager (e.g., a lock service or lock manager) is unavailable is illustrated by the flow diagram in FIG. 30. As illustrated in this example, the method may include a given replica receiving credentials from an external service or manager, persisting those credentials on the local node (e.g., persisting them to disk or writing them to another type of persistent memory), and assuming the role of master for its replica group, as in 3010. As illustrated at 3020, the method may also include the master replica servicing write operations that are directed to the replica group, which may include attempting to obtain a write quorum for each of the write operations (as described in detail herein).

As illustrated in FIG. 30, the master replica may lose communication with the external service/manager (as in 3030). For example, the external manager/service (or the computing node or nodes on which it is hosted) may fail, communication between the master replica and the external service/manager may fail, or the heart-beat (or the response thereto) may be lost. However, the master may continue servicing write operations that are directed to the replica group, which may include attempting to obtain a write quorum for each of the write operations, as in 3040. If the write quorum is met for a given replicated write operation (shown as the positive exit from 3050), the method may include committing that write operation in the data store, as in 3055. If the write quorum is not met for a given replicated write operation (shown as the negative exit from 3050), that write operation may not be committed in the data store, as in 3060.

As illustrated in this example, if no other replica has seen higher credentials than those held by the current master (shown as the negative exit from 3070), the method may include repeating the operations illustrated as 3040-3070. In other words, until another replica sees (or holds) higher credentials than those that were assigned to the given replica at 3010, the given replica may continue to act as master for the replica group, and may continue to service write operations directed to the replica group (committing those for which a write quorum is achieved). However, if (at any point) another replica sees (or holds) higher credentials than the current master (i.e. credentials higher than those that were assigned to the given replica at 3010), the given replica may give up mastership of the replica group and may no longer service write operations that are directed to the replica group. This is illustrated in FIG. 30 by the negative exit from 3070, and element 3080.

Figure 31:
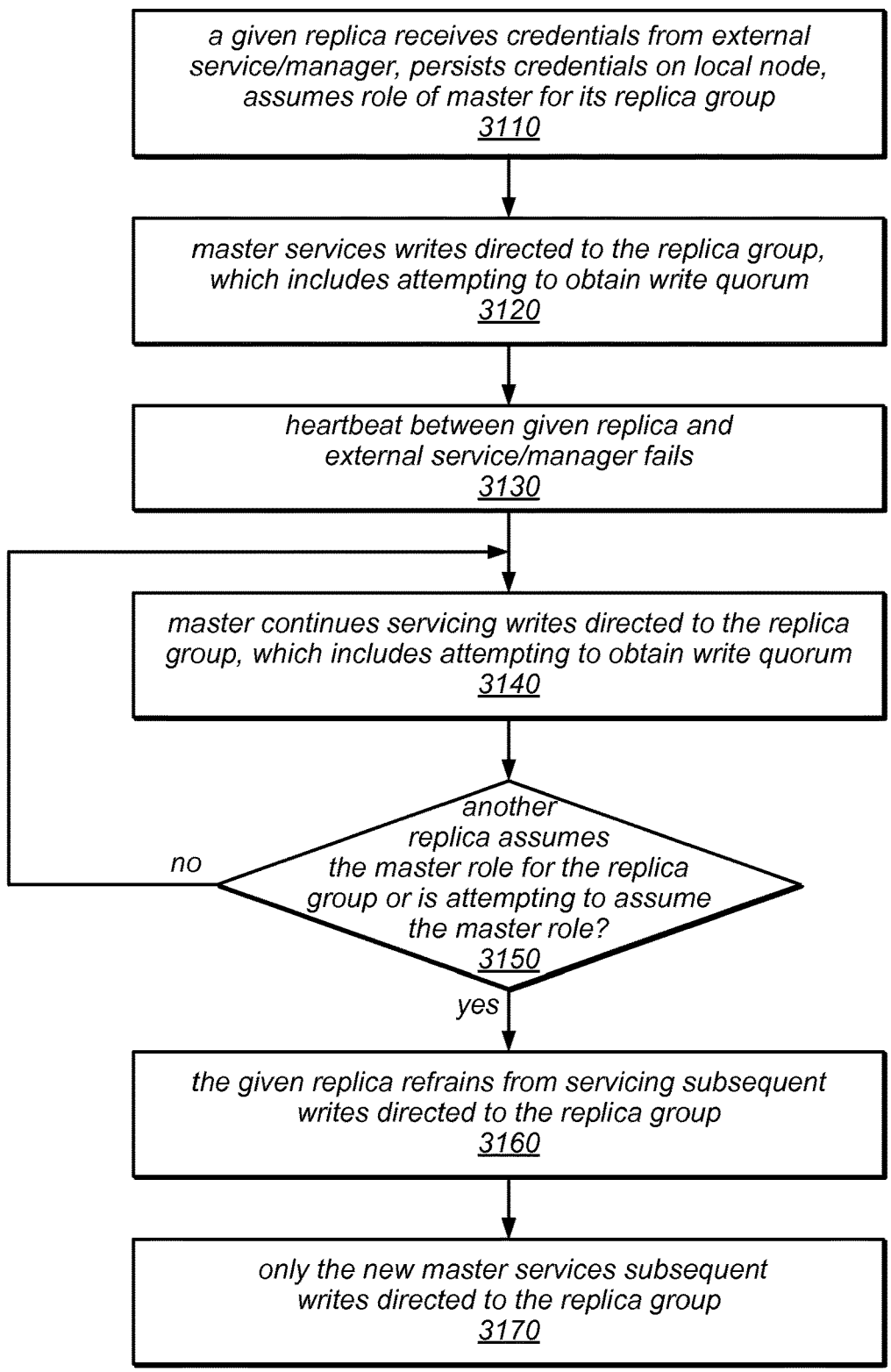
FIG. 31 is a flow diagram illustrating another embodiment of a method for continuing to service write operations when an external service or manager is unavailable.

Another embodiment of a method for continuing to service write operations when an external service or manager (e.g., a lock service or lock manager) is unavailable is illustrated by the flow diagram in FIG. 31. As in the previous example, the method may include a given replica receiving credentials from an external service or manager, persisting those credentials on the local node (e.g., persisting them to disk or writing them to another type of persistent memory), and assuming the role of master for its replica group, as in 3110. The method may also include the master replica servicing write operations that are directed to the replica group, which may include attempting to obtain a write quorum for each of the write operations, as in 3120. As described herein, in some embodiments, the master replica may implement a heart-beat mechanism in which messages are exchanged between the master replica and the external service/manager in order to maintain the mastership of the given replica and to ensure that only one replica acts in the role of master replica for the replica group at a time. In such embodiments, the heart-beat between the given replica and the external service/manager may fail, as in 3130. For example, the external manager/service (or the computing node or nodes on which it is hosted) may fail, or communication between the master replica and the external service/manager may fail, causing the heart-beat (or the response thereto) to be lost. However, the master may continue servicing write operations that are directed to the replica group (which may host a particular data partition), which may include attempting to obtain a write quorum for each of the write operations, as in 3140. As in the previous example, write operations for which the write quorum is achieved may be committed in the data store (not shown).

As illustrated in this example, if another replica assumes the role of master replica for the replica group or is determined to be attempting to assume the role of master replica for the replica group (shown as the positive exit from 3150), the given replica may refrain from servicing any subsequently requested write operations that are directed to the replica group, as in 3160. For example, if the given replica is asked to participate in a quorum for a new master election, or once the given replica determines (after the fact) that another replica has assumed mastership of the replica group through a failover operation of which it was unaware, it may refrain from servicing write operations directed to its replica group. Instead, only the new master (once it has assumed the role of master) may service any subsequent write operations that are directed to the replica group, as in 3170. However, until another replica assumes (or attempts to assume) the role of master replica for the replica group, the given replica may continue to service write operations that are directed to the replica group, regardless of the state of the external manager/service. This is illustrated in FIG. 31 by the feedback from the negative exit of 3150 to 3140.

The approach described above may allow write operations to continue even when an external lock/lease service or manager is unavailable. In some embodiments, the system may require acquiring quorum for consistent reads that will overlap the failover quorums without a lease, as is the case with write operations. For example, in some embodiments, the quorum may only be required when the external lock/lease service or manager is unavailable. Under these circumstances (i.e. when the external lock/lease manager is unavailable), the performance of the system may be degraded, since consistent reads may suddenly become much more expensive. (i.e. they may be much slower). Such an approach may also add load to the other replicas in the replica group, which may impact eventually consistent read operations, as well.

In some embodiments, another approach may be utilized to allow consistent read operations to continue when an external lock/lease service or manager is unavailable without going into a significantly degraded mode. For example, the system may utilize a local lease mechanism (i.e. the lease mechanism may be implemented in the replication group itself) for this purpose. In some embodiments, the system may implement a heart-beat mechanism between the current master replica and the other replicas in the replica group (i.e. the slave replicas) that is used to ensure that all replicas have the latest information (e.g., that nothing has been missed). In some embodiments, this heart-beat mechanism may be implemented using LSNs (replicated writes) issued by the current master, and the heart-beat messages may also to be used as the lease mechanism for consistent read operations. Because they are expressed as replicated writes, the heart-beat messages may only succeed in obtaining the write quorum (and taking effect) if no other master has emerged (as with any other replicated writes). The heart-beat messages may include an indication of the lease and/or an indication of a lease period (e.g., a configurable time interval that is greater than the heart-beat interval), such that they establish a lease for the specified period if they are committed.

Figure 32:
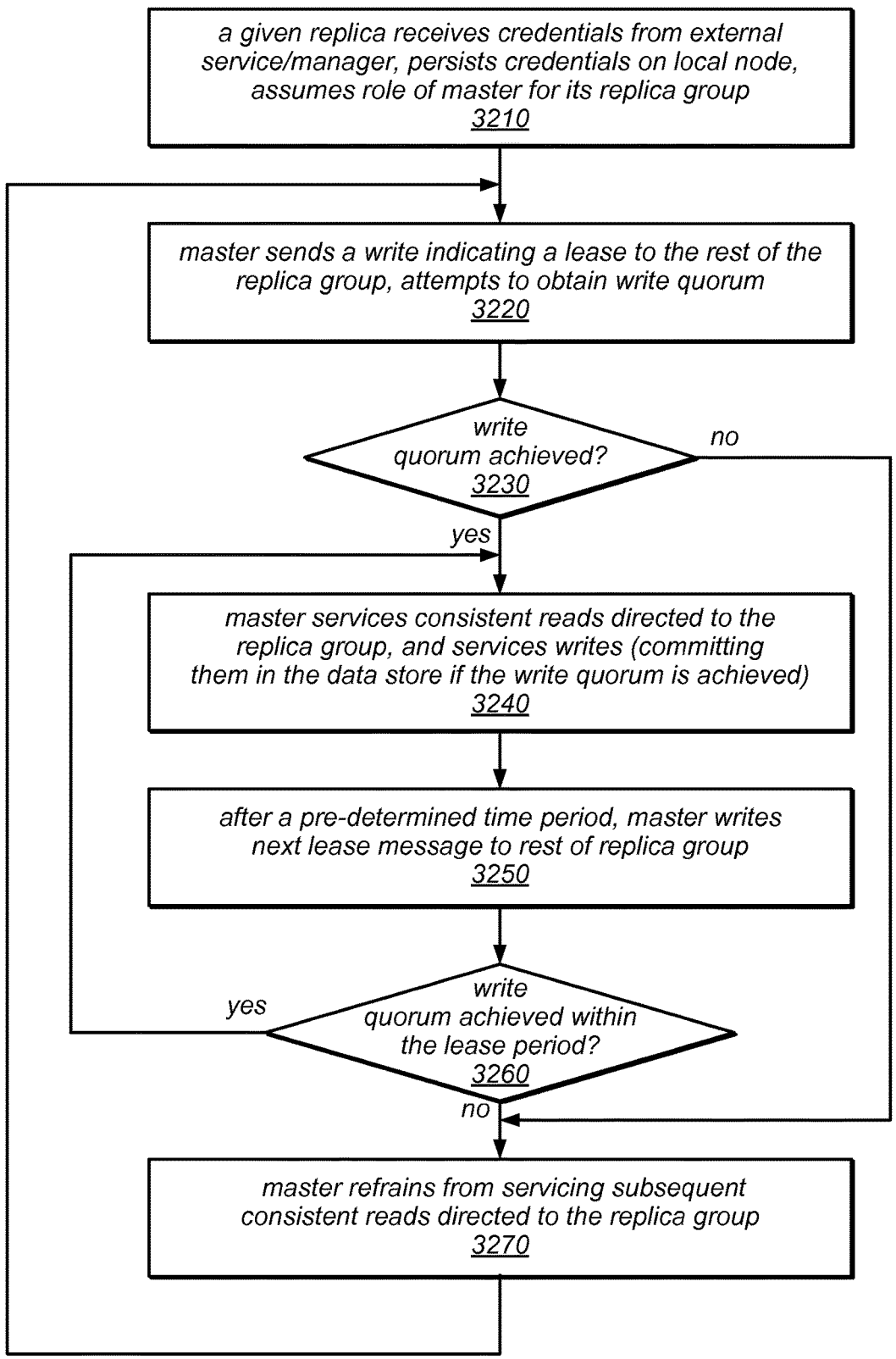
FIG. 32 is a flow diagram illustrating one embodiment of a method for employing a series of local leases to determine the replica authorized to service consistent read operations.

One embodiment of a method for employing a series of local leases to determine the replica authorized to service consistent read operations is illustrated by the flow diagram in FIG. 32. As in previous examples, the method may include a given replica receiving credentials from an external service or manager, persisting those credentials on the local node (e.g., persisting them to disk or writing them to another type of persistent memory), and assuming the role of master for its replica group, as in 3210. As illustrated in FIG. 32, the method may include the master replica sending a replicated write that indicates a lease to the rest of the replica group, and attempting to obtain a write quorum for that write operation, as in 3220. In this example, the lease may represent the authorization of a replica to act as the master replica for its replica group for a pre-determined amount of time (the lease period). The lease message may also include an identifier of the replica that mastered the message and/or any of the other information typically included in replicated writes in the system. If the write operation indicating the lease achieves a write quorum (shown as the positive exit from 3230), the method may include the master replica servicing consistent read operations that are directed to the replica group (data partition), and servicing write operations that are directed to the replica group (data partition), committing them to the data store if a write quorum is achieved, as in 3240.

As illustrated in this example, the method may include, after a pre-determined time period (the heart-beat period), the master replica sending the next lease message to the rest of replica group as a replicated write (as in 3250). In other words, once a given replica has been assigned credentials (and thus, the authority to attempt to become the master replica for its replica group) by an external service or manager (or by other means), and the replica has become the master replica for the replica group, that master replica may implement a lease locally (within the replica group), rather than relying on an external service or manager to maintain its authority to service consistent read operations directed to the replica group (data partition), i.e. to renew the lease for an additional lease period. For example, in some embodiments, the leases may be originated, maintained and/or renewed using local heart-beat messages for which the heart-beat period is less than the lease period. As illustrated in this example, if the write operation indicating the lease (heart-beat message) achieves a write quorum within the lease period (shown as the positive exit from 3260), the method may include repeating the operations illustrated as 3240-3260 until a subsequent attempt to renew the lease fails (e.g., until a subsequent write operation indicating a lease fails to achieve the write quorum within the current lease period).

If one of the write operations indicating the lease (e.g., an origination or renewal of the lease) does not achieve a write quorum (shown as the negative exit from 3230 or the negative exit from 3260), the method may include the master refraining from servicing subsequent consistent read operations that are directed to the replica group, as in 3270. However, the master replica may not refrain from performing subsequent write operations in response to a failure to achieve a write quorum for a lease. Instead, the master may refrain from performing write operations only when (and if) it becomes aware of another replica's attempt to become a new master replica for the group (regardless of whether that attempt has successfully completed). As illustrated in this example, following a failure to renew a least within the current lease period, the master replica may generate a new lease (assuming no other replica has assumed the role of master replica for the replica group). This is illustrated in FIG. 32 as the path from 3270 back to 3220. Note that in some embodiments, if a write quorum for a lease renewal is not reached during a current lease period, but is reached shortly afterward (e.g., before another replica has had a chance to assume the role of master replica for the group or to attempt to assume the role of master replica), the master replica may resume servicing consistent reads that are directed to the replica group without having to initiate another write operation indicating a new lease or a new lease renewal.

In some embodiments, a local lease mechanism may also be utilized to maintain the master replica for consistent read operations when mastership of a replica group changes. One embodiment of a method for determining the replica authorized to service consistent read operations when mastership of a replica group changes is illustrated by the flow diagram in FIG. 33. As illustrated in this example, the method may include a given replica receiving credentials from an external service or manager, persisting those credentials on the local node (e.g., persisting them to disk or writing them to another type of persistent memory), and assuming the role of master for its replica group, as in 3310. The method may include the master replica sending a message indicating a lease (e.g., the origination of a new lease or the renewal of an existing lease) to the rest of the replica group as a replicated write operation, and attempting to obtain a write quorum for that write operation, as in 3320. As described herein, the lease may in some embodiments represent the authorization of the replica to act as the master replica for its replica group for a pre-determined amount of time (the lease period). If the write quorum is achieved (shown as the positive exit from 3330), the method may include the master replica servicing consistent read operations that are directed to the replica group (or a corresponding data partition for which it stores data), and servicing write operations that are directed to the replica group (data partition), committing them to the data store if a write quorum is achieved, as in 3340. If the write quorum is not achieved within the lease period (shown as the negative exit from 3330), the given replica may refrain from servicing subsequent consistent read operations that are directed to the replica group (data partition), as in 3380. In this case, the master replica may still service write operations, which may use a quorum mechanism to determine whether they should be committed.

Figure 33:
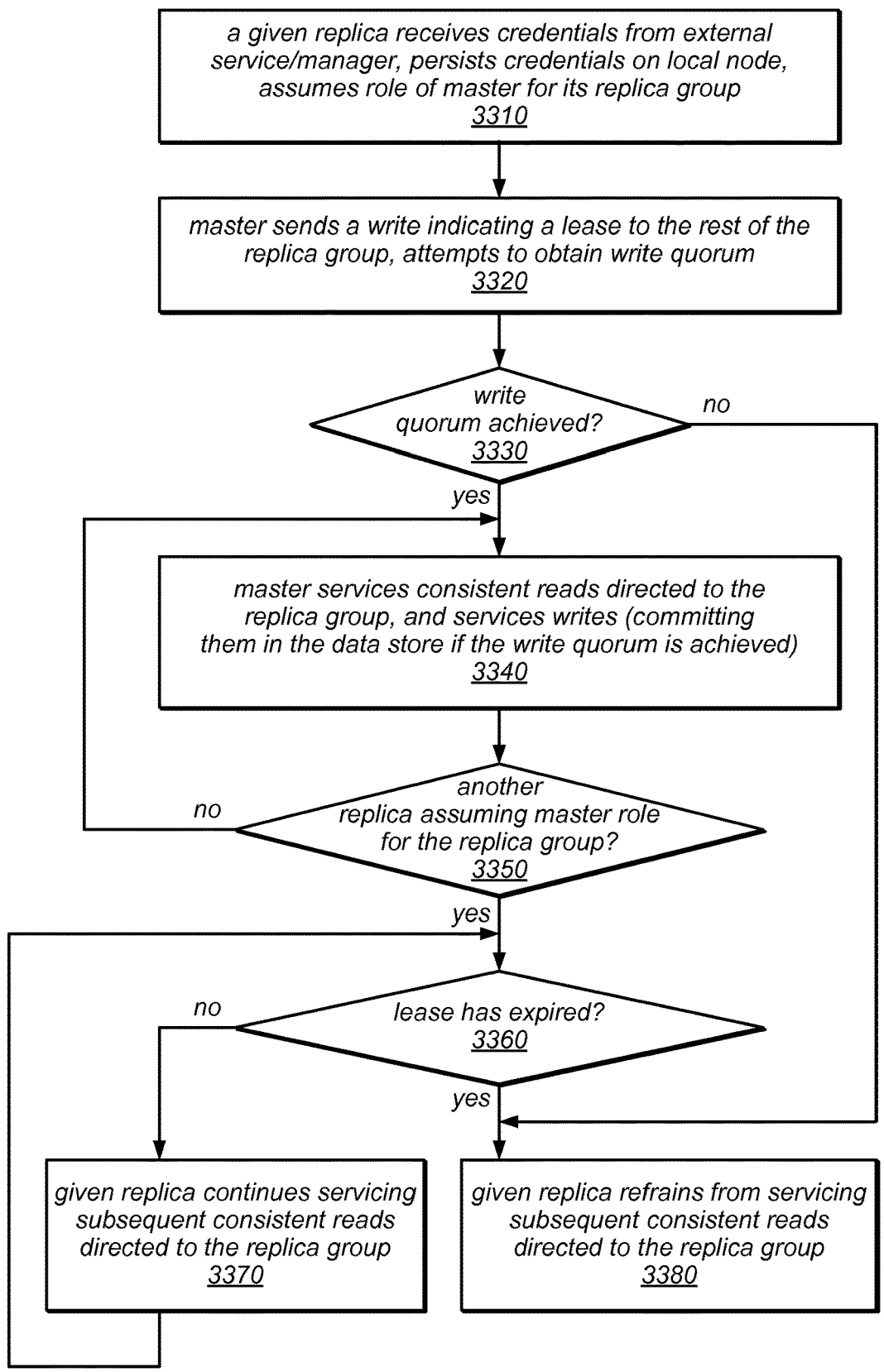
FIG. 33 is a flow diagram illustrating one embodiment of a method for determining the replica authorized to service consistent read operations when mastership of a replica group changes.

In some embodiments, until another replica assumes the role of master replica for the replica group (or determines that another replica is attempting to assume the role of master replica), the current master replica may continue to service consistent read operations and/or write operations that are directed to the replica group (data partition), regardless of the state of the external service/manager. This is illustrated in FIG. 33 by the feedback from the negative exit of 3350 to 3340. As described herein, this may include generating and sending additional local lease messages to the other replicas in the replica group until and unless another replica assumes (or is determined to be attempting to assume) the role of master replica for the replica group. As illustrated in FIG. 33, if another replica assumes (or is attempting to assume) the role of master replica for the replica group (shown as the positive exit from 3350), and the most recent lease generated by the given replica has expired (shown as the positive exit from 3360), the method may include the given replica refraining from servicing subsequent consistent read operations that are directed to the replica group (data partition), as in 3380. On the other hand, if another replica assumes (or is attempting to assume) the role of master replica for the replica group (shown as the positive exit from 3350), but the most recent lease generated by the given replica has not expired (shown as the negative exit from 3360), the method may include the given replica continuing to service consistent read operations that are directed to the replica group (data partition) until the lease expires, as in 3370. This is illustrated in FIG. 32 by the feedback from the negative exit of 3360 to 3370, and the path from 3370 back to 3360. In other words, in some embodiments, a new master replica that has built a quorum may not take over the responsibility of mastering consistent read operations until an active local lease has expired.

Note that in some embodiments, the master replica may start its lease timer immediately upon issuing the lease message (e.g., before sending it out to the other members of the replica group for quorum), and may not use the lease (i.e. may not master any consistent read operations) until it has received sufficient acknowledgements indicating that the write of the lease message has reached quorum (which may represent the point at which the write may be committed). Each replica receiving the lease message may independently note the current time (e.g., as indicated by their local clock) when they process the heart-beat (lease) write operation. Any heart-beat (lease) write operation that achieves quorum may be guaranteed to be found by the failover quorum during a failover steady state view change. As noted above, in some embodiments, the new master having achieved the failover quorum may allow any found lease (i.e. the latest heart-beat processed) to expire prior to taking over the role of master replica for the replica group. At that time, the new master replica may be certain that any previous master will not be using that lease, and that any newer lease that was not found did not reach the write quorum (thus, a previous master could not be using it either). In some embodiments, the approach described above may ensure that two replicas cannot be acting as master replica for a replica group at the same time. Note that in some embodiments, if a previous master (i.e. the issuer of a currently active lease) participates in the failover quorum that establishes a new master, it may not honor the lease it had previously issued (e.g., it may give up or cancel the lease prior to the expiration of the lease period). In such embodiments, the new master may not need to wait for the lease period to expire before assuming the role of master replica for the replica group.

Figure 34:
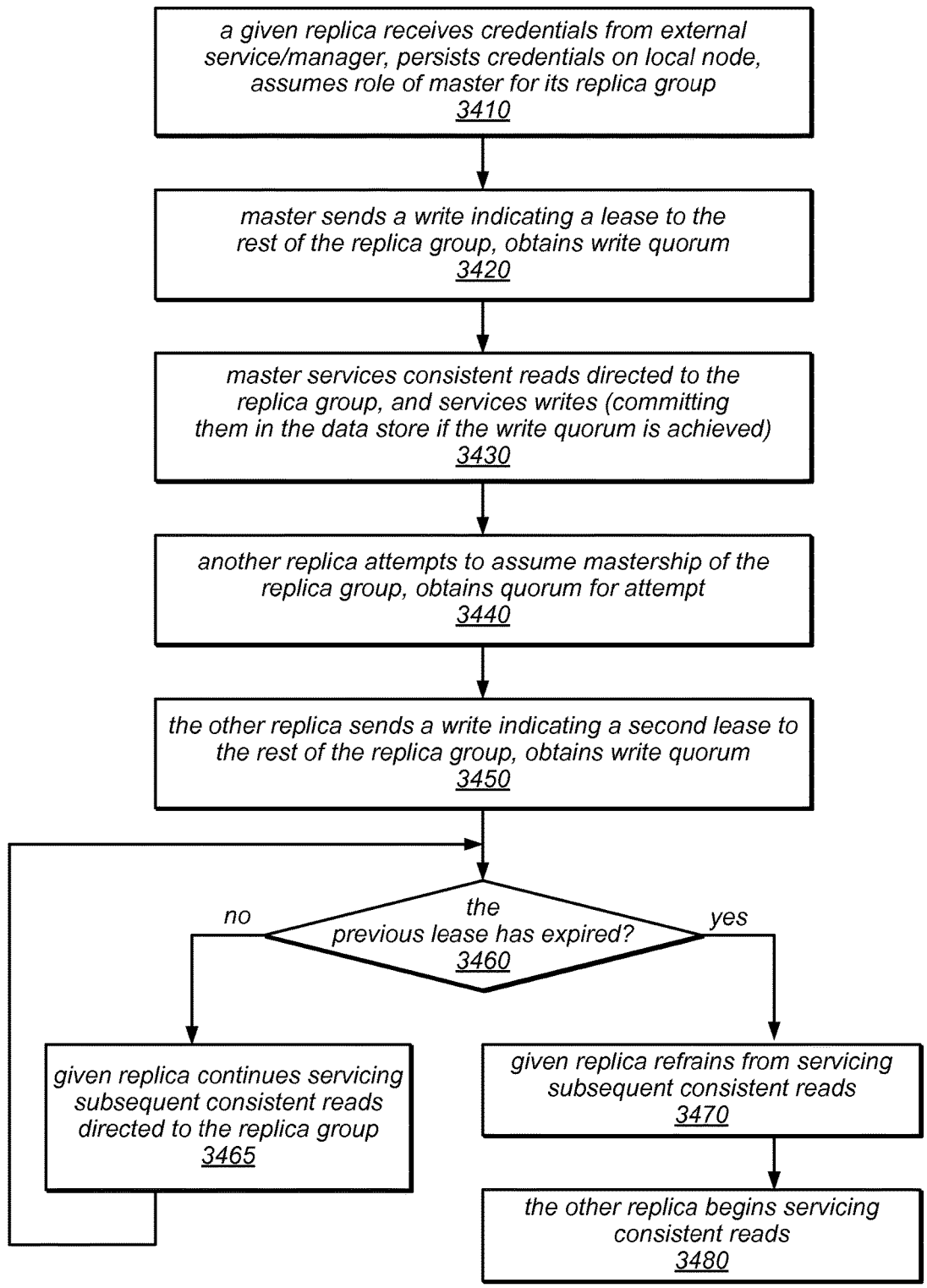
FIG. 34 is a flow diagram illustrating another embodiment of a method for determining the replica authorized to service consistent read operations when mastership of a replica group changes.

Another embodiment of a method for determining the replica authorized to service consistent read operations when mastership of a replica group changes is illustrated by the flow diagram in FIG. 34. As illustrated in this example, the method may include a given replica receiving credentials from an external service or manager, persisting those credentials on the local node (e.g., persisting them to disk or writing them to another type of persistent memory), and assuming the role of master for its replica group, as in 3410. The method may include the master replica sending a message indicating a lease (e.g., the origination of a new lease or the renewal of an existing lease) to the rest of the replica group as a replicated write operation, and obtaining a write quorum for that write operation, as in 3420. As described herein, the lease may in some embodiments represent the authorization of the replica to act as the master replica for its replica group for a pre-determined amount of time (the lease period). As illustrated in this example, the method may include the master replica servicing consistent read operations that are directed to the replica group (or a corresponding data partition for which it stores data), and servicing write operations that are directed to the replica group (data partition), committing them to the data store if a write quorum is achieved, as in 3430. The method may also include another replica attempting to assume mastership of the replica group, and obtaining a quorum that supports its attempt to become master of the replica group, as in 3440. As illustrated in this example, the method may include the other replica (i.e. the replica that is in the process of assuming mastership) sending a message indicating a second lease (e.g., the origination of a new lease for the replica that is assuming mastership) to the rest of the replica group as a replicated write operation, and obtaining a write quorum for that message, as in 3450.

As illustrated in FIG. 34, the method may include determining whether the previous lease, i.e. the most recent lease generated by the given replica (the current master), has expired, as in 3460. If not, shown as the negative exit from 3460, the method may include the given replica continuing to service any subsequent consistent read operations that are directed to the replica group (data partition), as in 3465, until the previous lease expires. This is illustrated in FIG. 34 by the feedback from the negative exit of 3460 to 3465, and the path from 3465 back to 3460. If the previous lease has expired (or once it subsequently expires), shown as the positive exit from 3460, the method may include the given replica refraining from servicing any subsequent consistent read operations that are directed to the replica group (data partition), as in 3470, and the other replica (the replica that is assuming the role of master for the replica group) beginning to service any consistent read operations under the authority of the second lease, as in 3480.

Note that in some embodiments, timing may only be measured by the local clock(s) on each computing node. In such embodiments, the techniques described herein may not depend on clock skew across servers. Instead, they may only depend on the local clocks of individual servers running at the same rate. This may also be a base requirement necessary for an external lock/lease service or manager to function properly.

In some embodiments, the techniques described herein for managing mastership of write operations and consistent read operations without relying on an external lock/lease service or manager may depend on quorum and persistence facilities already built into the system. In some embodiments, a consensus mechanism may still be required for enacting a steady state view change, and for determining the new master credentials. However, in some embodiments, the consensus mechanisms described herein may be replaced with other consensus mechanisms (perhaps within the replica group itself), which may eliminate the dependency on an external lock/lease service or manager entirely.

Figure 35:
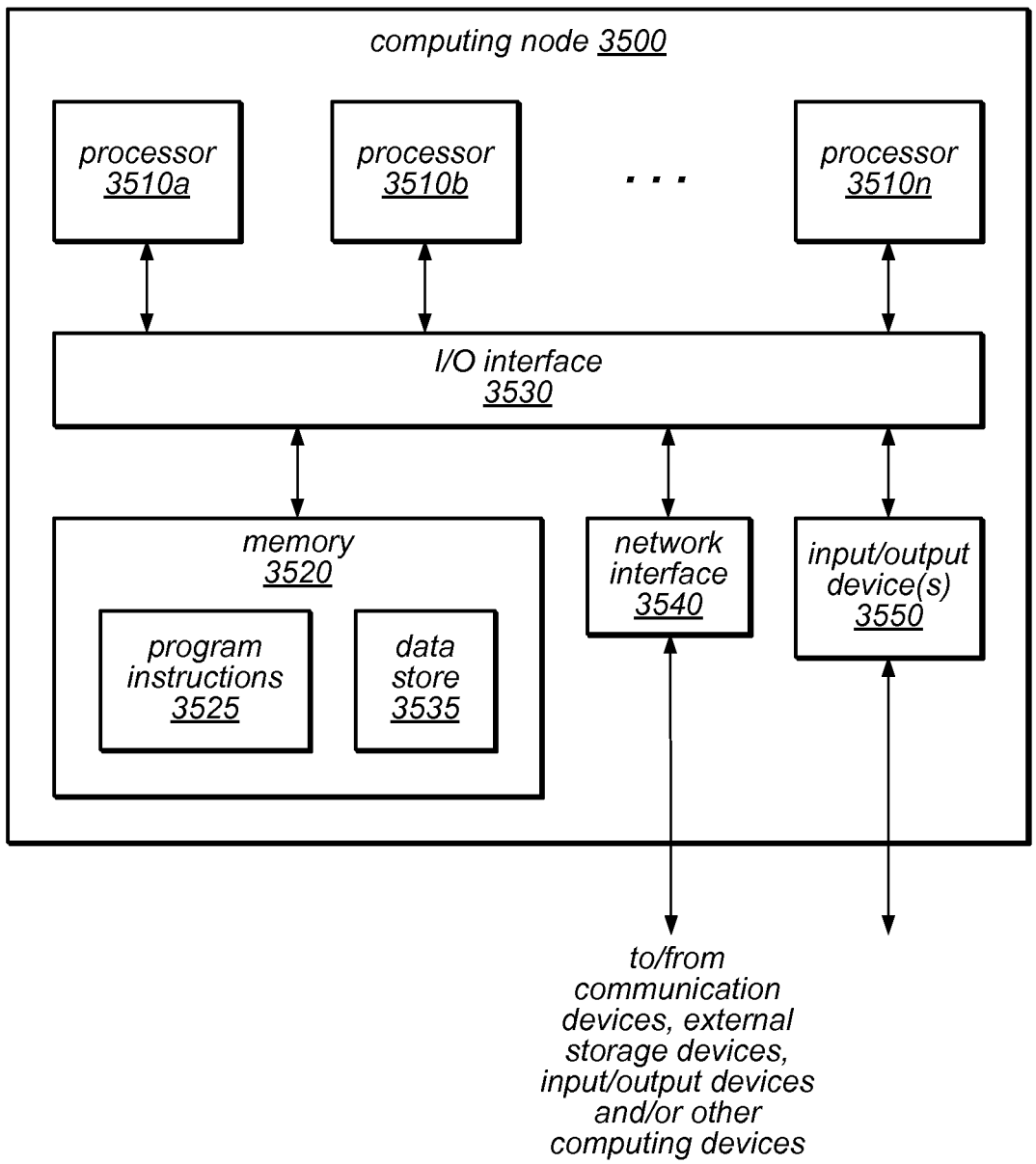
FIG. 35 is a block diagram illustrating a computing node that may be suitable for implementation of a data storage service, according to various embodiments.

One computing node that may be suitable for implementation of a data storage service that employs the techniques described herein is illustrated in FIG. 35. Computing node 3500 may include functionality to provide any or all of the components of a system that implements such a data storage service, or multiple computing nodes similar to or different from computing node 3500 may collectively provide this functionality, in different embodiments. For example, in various embodiments, one or more computing nodes 3500 may implement any number of storage service clients 110, a front end module 140, any number of auto admin instances 150, any number of storage devices (such as storage node instances 160), and/or any other components of a Web services platform 130, an auto admin cluster, or external resources that interact with Web services platform 130 (such as external workflow component 170 or external storage service 180). Any number of those storage node instances 160 may each host one or more replicas of various data partitions and/or metadata associated therewith. For example, any given storage node instance 160 may host a replica acting as master replicas for its replica group and/or a replica acting as a slave replica in its replica group. In various embodiments, any or all of the techniques described herein for partitioning, replication, and/or management thereof may be performed by one or more components of the storage node instances 160 that host a master replica and/or a slave replica, such as partition manager 270 and replication and failover component 275 illustrated in FIG. 2C. In some embodiments that include multiple computing nodes 3500, all of the computing nodes 3500 may include the same or similar hardware components, software components, and functionality, while in other embodiments, the computing nodes 3500 comprising a computing system configured to implement the functionality described herein may include a wide variety of hardware components, software components, and functionality. In some embodiments, multiple computing nodes 3500 that collectively implement a data storage service may be components of a larger shared resource system or grid computing system.

In the illustrated embodiment, computing node 3500 includes one or more processors 3510 coupled to a system memory 3520 via an input/output (I/O) interface 3530. Computing node 3500 further includes a network interface 3540 coupled to I/O interface 3530, and one or more input/output devices 3550. As noted above, in some embodiments, a given node may implement the functionality of more than one component of a system that manages and maintains data in tables (e.g., in a non-relational database) on behalf of data storage service clients, such as that described herein. In various embodiments, a computing node 3500 may be a uniprocessor system including one processor 3510, or a multiprocessor system including several processors 3510 (e.g., two, four, eight, or another suitable number). Processors 3510 may be any suitable processor capable of executing instructions. For example, in various embodiments processors 3510 may be general-purpose or embedded processors implementing any of a variety of instruction set architectures (ISAs), such as the x86, PowerPC, SPARC, or MIPS ISAs, or any other suitable ISA. In multiprocessor systems, each of processors 3510 may commonly, but not necessarily, implement the same ISA. Similarly, in a distributed computing system such as one that collectively implements a data storage service, each of the computing nodes may implement the same ISA, or individual computing nodes and/or replica groups of nodes may implement different ISAs.

In some embodiments, system memory 3520 may include a non-transitory, computer-readable storage medium configured to store program instructions and/or data accessible by processor(s) 3510. In various embodiments, system memory 3520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above, are shown stored within system memory 3520 as program instructions 3525 and data storage 3535, respectively. For example, program instruction 3525 may include program instructions that when executed on processor(s) 3510 implement any or all of a storage service client 110, a front end module 140 (which may include a user interface), an auto admin instance 150, a storage node instance 160, an admin console 265, a request router, a staging host, one or more metadata tables, an external workflow component 170, an external storage service 180, and/or any other components, modules, or sub-modules of a system that provides the data storage service described herein. Program instructions 3525 may also include program instructions configured to implement additional functionality of a system that implements a data storage service not described herein.

Data storage 3535 may in various embodiments include collections of data maintained by a data storage service on behalf of its clients/users, and/or metadata used by a computing system that implements such a service, as described herein (including, but not limited to, tables managed and maintained on behalf of clients/users of the service, metadata tables, business rules, partition maps, routing tables, indexes, namespaces and/or partitions thereof, service level agreement parameter values, subscriber preferences and/or account information, performance data, and/or resource usage data). In other embodiments, program instructions and/or data as described herein for implementing a data storage service that employs the techniques described above may be received, sent or stored upon different types of computer-readable media or on similar media separate from system memory 3520 or computing node 3500. Generally speaking, a computer-readable medium may include storage media or memory media such as magnetic or optical media, e.g., disk or CD/DVD-ROM coupled to computing node 3500 via I/O interface 3530. Program instructions and data stored on a computer-readable storage medium may be transmitted to a computing node 3500 for execution by a processor 3510a by transmission media or signals such as electrical, electromagnetic, or digital signals, which may be conveyed via a communication medium such as a network and/or a wireless link, such as may be implemented via network interface 3540.

In one embodiment, I/O interface 3530 may be configured to coordinate I/O traffic between processor(s) 3510, system memory 3520, and any peripheral devices in the computing node, including network interface 3540 or other peripheral interfaces, such as input/output devices 3550. In some embodiments, I/O interface 3530 may perform any necessary protocol, timing or other data transformations to convert data signals from one component (e.g., system memory 3520) into a format suitable for use by another component (e.g., processor 3510). In some embodiments, I/O interface 3530 may include support for devices attached through various types of peripheral buses, such as a variant of the Peripheral Component Interconnect (PCI) bus standard or the Universal Serial Bus (USB) standard, for example. In some embodiments, the function of I/O interface 3530 may be split into two or more separate components, such as a north bridge and a south bridge, for example. Also, in some embodiments some or all of the functionality of I/O interface 3530, such as an interface to system memory 3520, may be incorporated directly into processor 3510.

Network interface 3540 may be configured to allow data to be exchanged between computing node 3500 and other devices attached to a network (such as other computer systems, communication devices, input/output devices, or external storage devices), or between other nodes in a system providing shared computing services. In various embodiments, network interface 3540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 3550 may, in some embodiments, include one or more display terminals, keyboards, keypads, touchpads, scanning devices, voice or optical recognition devices, or any other devices suitable for entering or retrieving data by one or more computing nodes 3500. Multiple input/output devices 3550 may be present in computing node 3500 or may be distributed on various computing nodes of a system that is configured to implement a data storage service. In some embodiments, similar input/output devices may be separate from computing node 3500 and may interact with one or more computing nodes of a system through a wired or wireless connection, such as over network interface 3540.

Storage service clients (e.g., users, subscribers and/or client applications) may interact with a data storage service such as that described herein in various ways in different embodiments, such as to submit requests for service (including, but not limited to, requests to store, retrieve and/or update items in tables, or requests to repartition a table), and to receive results. For example, some subscribers to the service may have physical access to computing node 3500, and if so, may interact with various input/output devices 3550 to provide and/or receive information. Alternatively, other clients/users may use client computing systems to access the system, such as remotely via network interface 3540 (e.g., via the Internet and/or the World Wide Web). In addition, some or all of the computing nodes of a system providing the service may provide various feedback or other general types of information to clients/users (e.g., in response to user requests) via one or more input/output devices 3550.

Those skilled in the art will appreciate that computing node 3500 is merely illustrative and is not intended to limit the scope of embodiments. In particular, the computing system and devices may include any combination of hardware or software that can perform the indicated functions, including computers, network devices, internet appliances, PDAs, wireless phones, pagers, etc. Computing node 3500 may also be connected to other devices that are not illustrated, in some embodiments. In addition, the functionality provided by the illustrated components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-readable storage medium or a portable article to be read by an appropriate drive, various examples of which are described above. In some embodiments, instructions stored on a computer-readable storage medium separate from computing node 3500 may be transmitted to computing node 3500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable storage medium. Accordingly, different embodiments may be practiced with other computer system configurations.

Note that while several examples described herein are directed to the application of various techniques in systems that include a non-relational database, in other embodiments these techniques may be applied in systems in which the non-relational data store is implemented using a different storage paradigm.

Those skilled in the art will appreciate that in some embodiments the functionality provided by the methods discussed above may be provided in alternative ways, such as being split among more software modules or routines or consolidated into fewer modules or routines. Similarly, in some embodiments illustrated methods may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered. The various methods as depicted in the figures and described herein represent illustrative embodiments of methods. The methods may be implemented in software, in hardware, or in a combination thereof in various embodiments. Similarly, the order of any method may be changed, and various elements may be added, reordered, combined, omitted, modified, etc., in various embodiments.

From the foregoing it will be appreciated that, although specific embodiments have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a plurality of computing nodes, each comprising at least one processor and memory, wherein the plurality of computing nodes is configured to implement a data storage service;
    wherein the data storage service maintains data on behalf of one or more storage service clients, wherein maintaining the data comprises storing two or more replicas of the data on respective computing nodes in the system, wherein the two or more replicas make up a replica group, wherein at most one of the replicas in the replica group can act as a master replica for the replica group at a time, and wherein replicas in the replica group that are not acting as the master replica act as slave replicas in the replica group;
    wherein one of the replicas in the replica group is configured to:
        receive a log record to be appended to a log maintained by the replica, wherein the log comprises a plurality of log records, wherein each log record indicates an update to the data being maintained on behalf of the storage service clients or an update to the membership of the replica group, and wherein each log record comprises metadata associated with the update or the replica group that receive log records from the master replica, wherein the metadata comprises:
            a sequence number that was assigned to the log record when the log record was generated and that comprises a value in a strictly increasing series; and
            a master reign identifier indicating a reign of a particular master replica over the replica group when the log record was generated;
        compare metadata for the received log record to metadata for one or more other log records in the log to determine a conflict in master reign between the received log record and the one or more other log records;
        determine an action to be taken in response to receiving the log record dependent on results of the comparison, wherein the action resolves the determined conflict; and
        take the determined action.

2. The system of claim 1, wherein said determining an action comprises:
    determining, dependent on the results of the comparison, whether the received log record is a log record that immediately follows a log record that was previously appended to the log in sequential order; and
    in response to determining that the received log record is the log record that immediately follows the log record that was previously appended to the log in sequential order, determining that the replica should append the received log record to the log.

3. The system of claim 1, wherein said determining an action comprises:
    determining, dependent on the results of the comparison, whether the received log record is redundant in the log or has been superseded by another log record that was previously appended to the log; and
    in response to determining that the received log record is redundant in the log or has been superseded by another log record that was previously appended to the log, determining that the replica should refrain from appending the received log record to the log.

4. The system of claim 1, wherein said determining an action comprises:
    determining, dependent on the results of the comparison, whether the received log record is a log record that follows a log record that was previously appended to the log and one or more other log records that have not yet been appended to the log in sequential order; and
    in response to determining that the received log record is a log record that follows the log record that was previously appended to the log and one or more other log records that have not yet been appended to the log in sequential order, determining that the replica should not yet append the received log record to the log, but should cache the received log record for potential future use.

5. The system of claim 1, wherein said determining an action comprises:
    determining, dependent on the results of the comparison, whether one or more log records in the log are on an invalid branch of the log; and
    in response to determining that one or more log records in the log are on an invalid branch of the log:
        determining that the replica should delete the one or more log records that are on an invalid branch from the log.

6. A method, comprising:
    performing by a computer:
        receiving, by a replica in a replica group that comprises two or more replicas, a log record to be appended to a log maintained by the replica, wherein the log comprises a plurality of log records, wherein each log record comprises metadata associated with an update to be applied in the replica group, wherein the two or more replicas maintain data on respective computing nodes in a data store, wherein at most one of the replicas in the replica group can act as a master replica for the replica group at a time, and wherein replicas in the replica group that are not acting as the master replica act as slave replicas in the replica group;
        comparing, by the replica, at least one element of the metadata for the received log record to a corresponding element of the metadata for a log record that was previously appended to the log, wherein the comparing determines whether a conflict in master reign exists between the received log record and one or more log records that were previously appended to the log, and wherein the metadata comprises a master reign identifier indicating a reign of a particular master replica over the replica group when the log record was generated and a sequence number that was assigned to the log record when the log record was generated;

determining, by the replica, an action to be taken in response to receiving the log record dependent on results of the comparison, wherein the action resolves any determined conflict; and taking, by the replica, the determined action.

7. The method of claim 6, wherein each log record indicates an update to the data being maintained by the replica group or an update to the membership of the replica group.

8. The method of claim 6, wherein said determining an action comprises:

determining, dependent on the results of the comparison, whether the received log record is a log record that immediately follows the log record that was previously appended to the log in sequential order; and in response to determining that the received log record is the log record that immediately follows the log record that was previously appended to the log in sequential order, determining that the replica should append the received log record to the log.

9. The method of claim 6, wherein said determining an action further comprises determining whether the received log record comprises an indication that there has been a change in mastership for the replica group; and wherein the determined action is dependent on whether the received log record comprises an indication that there has been a change in mastership for the replica group.

10. The method of claim 6, wherein said determining an action comprises:

determining, dependent on the results of the comparison, whether the received log record is redundant in the log or has been superseded by another log record that was previously appended to the log; and in response to determining that the received log record is redundant in the log or has been superseded by another log record that was previously appended to the log, determining that the replica should refrain from appending the received log record to the log.

11. The method of claim 6, wherein said determining an action comprises:

determining, dependent on the results of the comparison, whether the received log record is a log record that follows the log record that was previously appended to the log and one or more other log records that have not yet been appended to the log in sequential order; and in response to determining that the received log record is a log record that follows the log record that was previously appended to the log and one or more other log records that have not yet been appended to the log in sequential order, determining that the replica should not yet append the received log record to the log, but should cache the received log record for potential future use.

12. The method of claim 6, wherein the received log record is received from a replica acting as master replica for the replica group.

13. The method of claim 6, wherein sequence numbers assigned by a given replica to log records are strictly increasing, and wherein said comparing comprises comparing the sequence number in the received log record to the sequence number in the log record that was previously appended to the log.

14. The method of claim 6, wherein the master reign identifier comprises a lock generation identifier that was fixed by the particular master replica that generated the log record at a time when the particular master owned an external lock for the replica group, and wherein said comparing comprises comparing the lock generation identifier in the received log record to a lock generation identifier in the log record that was previously appended to the log.

15. The method of claim 6, wherein the master reign identifier comprises an epoch identifier that indicates that the log record was produced during a particular time period when the particular master replica was acting as master replica for the replica group, and wherein said comparing comprises comparing the epoch identifier in the received log record to an epoch identifier in the log record that was previously appended to the log.

16. The method of claim 6, wherein the metadata for the received log includes an indication of an epoch change, and wherein said comparing further comprises comparing a previous lock generation identifier associated with the received log record to a previous lock generation identifier associated with the log record that was previously appended to the log in response to determining that the indication indicates an epoch change.

17. The method of claim 6, wherein comparing the metadata comprises determining whether a component of the metadata in the received log record is equal to, less than, one greater than, or more than one greater than a corresponding component of the metadata in the log record that was previously appended to the log.

18. A non-transitory computer-readable storage medium storing program instructions that if executed on one or more computers cause the one or more computers to perform:

receiving, at replica in a replica group that comprises two or more replicas, a log record to be appended to a log maintained by the replica, wherein the log comprises a plurality of log records, wherein each log record comprises metadata associated with an update to be applied in the replica group, wherein the two or more replicas maintain data on respective computing nodes in a data store, wherein at most one of the replicas in the replica group can act as a master replica for the replica group at a time, and wherein replicas in the replica group that are not acting as the master replica act as slave replicas in the replica group;

comparing at least one element of the metadata for the received log record to a corresponding element of the metadata for a log record that was previously appended to the log, wherein the comparing determines whether a conflict in master reign exists between the received log record and one or more log records that were previously appended to the log, and wherein the metadata comprises a master reign identifier indicating a reign of a particular master replica over the replica group when the log record was generated and a sequence number that was assigned to the log record when the log record was generated;

determining an action to be taken in response to receiving the log record dependent on results of the comparison, wherein the action resolves any determined conflict; and taking the determined action.

19. The non-transitory computer-readable storage medium of claim 18, wherein the log record that was previously appended to the log comprises a log record that was most recently appended to the log.

20. The non-transitory computer-readable storage medium of claim 18, wherein the received log record is received from a replica acting as master replica for the replica group.

* * * * *